US010240937B2

(12) United States Patent
Chung et al.

(10) Patent No.: US 10,240,937 B2
(45) Date of Patent: Mar. 26, 2019

(54) DISPLAY APPARATUS FOR VEHICLE AND VEHICLE

(71) Applicant: LG ELECTRONICS INC., Seoul (KR)

(72) Inventors: Bumhee Chung, Seoul (KR); Hyunsun Lyu, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 15/166,455

(22) Filed: May 27, 2016

(65) Prior Publication Data

US 2016/0349066 A1 Dec. 1, 2016

(30) Foreign Application Priority Data

May 28, 2015 (KR) .................. 10-2015-0075204

(51) Int. Cl.
*G06T 19/00* (2011.01)
*G01C 21/34* (2006.01)
*G09G 5/00* (2006.01)
*G09G 5/02* (2006.01)
*B60K 35/00* (2006.01)
*G01C 21/36* (2006.01)
*G06K 9/00* (2006.01)

(52) U.S. Cl.
CPC .......... *G01C 21/3415* (2013.01); *B60K 35/00* (2013.01); *G01C 21/3602* (2013.01); *G01C 21/365* (2013.01); *G01C 21/3658* (2013.01); *G06K 9/00798* (2013.01); *G06K 9/00818* (2013.01); *G09G 5/003* (2013.01); *G09G 5/02* (2013.01); *G09G 2320/068* (2013.01); *G09G 2320/0666* (2013.01); *G09G 2320/0686* (2013.01); *G09G 2340/045* (2013.01)

(58) Field of Classification Search
USPC .................................. 701/400–533
See application file for complete search history.

(56) References Cited

U.S. PATENT DOCUMENTS 5,839,086 A * 11/1998 Hirano ............... G01C 21/26
701/420
6,243,646 B1 * 6/2001 Ozaki ............... G01C 21/3632
701/437
6,415,224 B1 * 7/2002 Wako ............... G01C 21/3611
340/903

(Continued)

FOREIGN PATENT DOCUMENTS

EP 2863181 4/2015
JP 4683380 5/2011

(Continued)

OTHER PUBLICATIONS

Extended European Search Report issued in European Application No. 16171290.6 dated Oct. 27, 2016, 9 pages.

(Continued)

*Primary Examiner* — Jonathan L Sample
(74) *Attorney, Agent, or Firm* — Fish & Richardson P.C.

(57) ABSTRACT

The present invention relates to a display apparatus for a vehicle, which includes a display and a processor configured to control the display to display a TBT image at a point on a route on a map displayed on the display, which corresponds to a lane in which the vehicle is being driven, by matching the TBT image to the point.

23 Claims, 50 Drawing Sheets

(56) References Cited

U.S. PATENT DOCUMENTS

| | | | | |
|---|---|---|---|---|
| 6,694,255 | B1* | 2/2004 | Kainuma | G01C 21/3647 701/428 |
| 7,755,508 | B2* | 7/2010 | Watanabe | B60Q 1/2665 180/167 |
| 8,972,175 | B2* | 3/2015 | Annapureddy | G01C 21/3453 701/423 |
| 2004/0012505 | A1* | 1/2004 | Yokota | G08G 1/0969 340/995.1 |
| 2005/0154505 | A1* | 7/2005 | Nakamura | G01C 21/365 701/1 |
| 2006/0195257 | A1* | 8/2006 | Nakamura | G01C 21/3632 701/437 |
| 2007/0005609 | A1* | 1/2007 | Breed | B60N 2/2863 |
| 2007/0021915 | A1* | 1/2007 | Breed | B60N 2/2863 701/301 |
| 2007/0030133 | A1* | 2/2007 | Campbell | B60K 35/00 340/438 |
| 2008/0015772 | A1* | 1/2008 | Sanma | B60K 35/00 701/408 |
| 2008/0189035 | A1* | 8/2008 | Tsurumi | G01C 21/367 701/437 |
| 2009/0112452 | A1* | 4/2009 | Buck | G08G 1/096716 701/117 |
| 2010/0131190 | A1* | 5/2010 | Terauchi | G01C 21/3629 701/533 |
| 2010/0138146 | A1* | 6/2010 | Vogt | G01C 21/3626 701/533 |
| 2010/0169007 | A1* | 7/2010 | Kaushik | G01C 21/26 701/532 |
| 2010/0253539 | A1* | 10/2010 | Seder | G01S 13/723 340/903 |
| 2011/0288766 | A1* | 11/2011 | Nagasawa | G01C 21/3632 701/533 |
| 2012/0083960 | A1* | 4/2012 | Zhu | G06T 7/223 701/23 |
| 2012/0259546 | A1* | 10/2012 | Kim | G02B 27/01 701/527 |
| 2013/0006518 | A1* | 1/2013 | Ozaki | G01C 21/3644 701/411 |
| 2013/0066549 | A1* | 3/2013 | Wu | G01C 21/3658 701/425 |
| 2013/0151145 | A1* | 6/2013 | Ishikawa | G01C 21/3667 701/428 |
| 2013/0158864 | A1* | 6/2013 | Kim | G01C 21/3632 701/428 |
| 2013/0173159 | A1* | 7/2013 | Trum | G01C 21/3626 701/533 |
| 2013/0345980 | A1* | 12/2013 | van Os | G01C 21/3626 701/538 |
| 2014/0032098 | A1* | 1/2014 | Anderson | B60N 2/002 701/428 |
| 2014/0180537 | A1* | 6/2014 | Ng | G06T 13/00 701/36 |
| 2014/0218509 | A1* | 8/2014 | Kondo | G01C 21/3647 348/118 |
| 2014/0379249 | A1* | 12/2014 | Ozturk | G01C 21/3632 701/408 |

FOREIGN PATENT DOCUMENTS

| | | |
|---|---|---|
| JP | 5397887 | 1/2014 |
| JP | 2014-037979 | 2/2014 |
| JP | 2014-083924 | 5/2014 |
| KR | 10-2001-0001839 | 1/2005 |
| KR | 10-2007-0016796 | 2/2007 |
| KR | 10-0815153 | 3/2008 |
| KR | 10-1479773 | 1/2015 |
| KR | 10-2015-0054022 | 5/2015 |
| KR | 10-2015-0056323 | 5/2015 |
| WO | 2014129017 | 8/2014 |
| WO | 2015/052312 | 4/2015 |

OTHER PUBLICATIONS

Office Action issued in Korean Application No. 10-2015-0075204 dated Oct. 27, 2016, 10 pages.

Extended European Search Report in European Application No. 16171290.6, dated Apr. 12, 2017, 18 pages (with English translation).

* cited by examiner

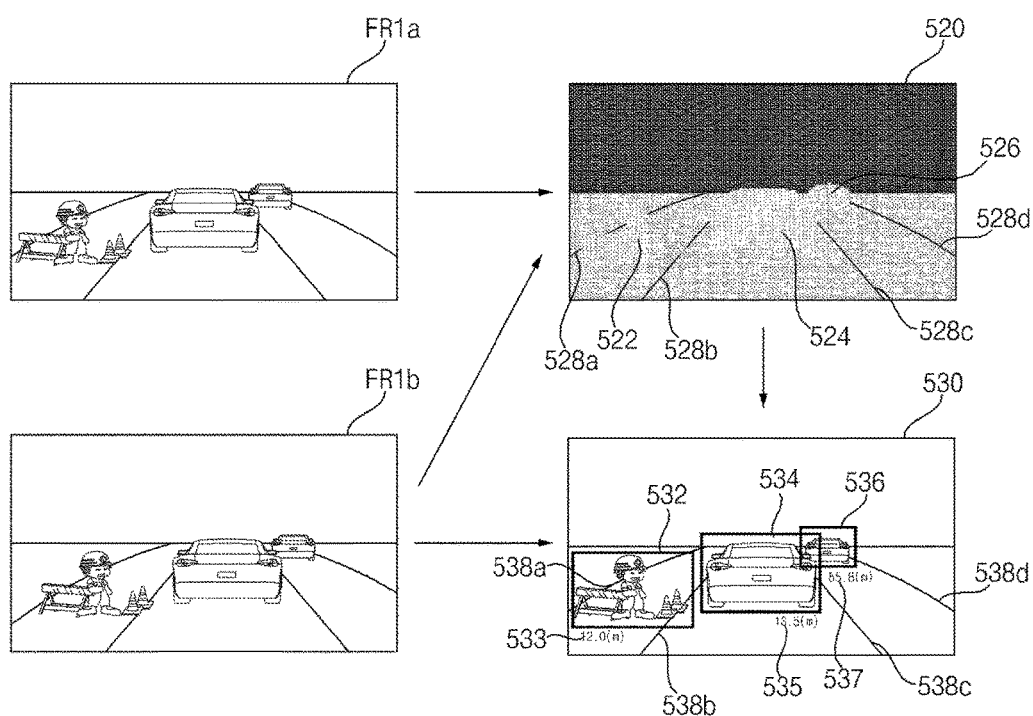

US 10,240,937 B2

DISPLAY APPARATUS FOR VEHICLE AND VEHICLE

CROSS-REFERENCE TO RELATED APPLICATION

This application claims the priority benefit of Korean Patent Application No. 10-2015-0075204, filed on May 28, 2015 in the Korean Intellectual Property Office, the disclosure of which is incorporated herein by reference.

BACKGROUND OF THE INVENTION

1. Field of the Invention

The present invention relates to a display apparatus for a vehicle and a vehicle including the same.

2. Description of the Related Art

A vehicle is a machine used for transporting people or goods. An example of a vehicle is a car.

A vehicle may include one or more display apparatuses. A navigation function can be provided through a display apparatus equipped in the vehicle.

A driver can drive the vehicle to a destination conveniently and safely using the navigation function provided through the display apparatus. However, a navigation function provided through a conventional display apparatus provides information on the basis of data stored in a memory or data received through communication. Accordingly, a current state of the vehicle cannot be correctly reflected in the navigation function.

Therefore, to overcome such problems, there is a need for research and development on a display apparatus for a vehicle, having a navigation function to which information acquired through various sensors included in the vehicle is applied in real time while the vehicle is being driven.

SUMMARY OF THE INVENTION

Therefore, the present invention has been made in view of the above problems, and it is an object of the present invention to provide a display apparatus for a vehicle, which matches a TBT image to a point corresponding to a lane in which the vehicle is being driven on a route on a map and displays the TBT image thereon.

Technical tasks obtainable from the present invention are not limited to the above-mentioned technical task. In addition, other unmentioned technical tasks can be clearly understood from the following description by those having ordinary skill in the technical field to which the present invention pertains.

To accomplish the object of the present invention, an embodiment of the present invention provides a display apparatus for a vehicle, including: a display; and a processor configured to control the display to display a TBT image at a point on a route on a map displayed on the display by matching the TBT image to the point, the point corresponding to a lane in which the vehicle is being driven.

To accomplish the object of the present invention, an embodiment of the present invention provides a vehicle including the display apparatus.

To accomplish the object of the present invention, an embodiment of the present invention provides a vehicle including the display apparatus for a vehicle.

Details of other embodiments are included in the detailed description and drawings.

The present invention has the following advantages.

Firstly, it is possible to provide more accurate and correct information by displaying a TBT image by matching a lane in which the corresponding vehicle is being driven to a route on the map.

Secondly, it is possible to efficiently provide information without dispersing the gaze of a user by displaying an image corresponding to information in a windshield region corresponding to a lane in which the corresponding vehicle is being driven.

Thirdly, it is possible to enable the user to correctly recognize a route by differently displaying windshield regions respectively corresponding to a lane in which the vehicle is being driven, a lane to be changed to and a lane on the route.

Fourthly, it is possible to attract the attention of the user to improve visibility of an image corresponding to information by adding animation effects to the image.

Fifthly, it is possible to improve transmission of important information by displaying an image corresponding to the important information differently from other images.

Sixthly, it is possible to reduce a travel time to a destination by changing a route on the basis of traffic information acquired through TSR or information received from other vehicles and providing the changed route to the user. Seventhly, it is possible to improve information transmission to the user by adding an effect to a TBT image in response to a situation change or displaying the TBT image in three dimensions.

The effects of the present invention are not limited to the above-described effects and other effects which are not described herein will become apparent to those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which:

FIGS. 5A and 5B are views for explaining operation of a processor 170 shown in FIG. 4A on the basis of stereo images respectively acquired in first and second frame intervals.

DETAILED DESCRIPTION OF THE PREFERRED EMBODIMENTS

The present invention will now be described in more detail with reference to the attached drawings. The terms "module" and "unit" used to signify components are used herein to aid in understanding of the components and thus they should not be considered as having specific meanings or roles. Accordingly, the terms "module" and "unit" may be used interchangeably. In the following description of the present invention, a detailed description of known functions and configurations incorporated herein will be omitted when it may obscure the subject matter of the present invention. The accompanying drawings illustrate exemplary embodiments of the present invention and provide a more detailed description of the present invention. However, the scope of the present invention should not be limited thereto. It should be understood that there is no intent to limit the invention to the particular forms disclosed. On the contrary, the invention is to cover all modifications, equivalents, and alternatives falling within the spirit and scope of the invention as defined by the claims.

Although terms including an ordinal number, such as first or second, may be used to describe a variety of constituent elements, the constituent elements are not limited to the terms, and the terms are used only for the purpose of discriminating one constituent element from other constituent elements.

It will be understood that when an element is "connected" or "coupled" to another element in the following description, it can be directly connected or coupled to the other element or intervening elements may be present therebetween. In contrast, when an element is "directly connected" or "directly coupled" to another element, there are no intervening elements present.

The singular forms are intended to include the plural forms as well, unless context clearly indicates otherwise.

It will be further understood that the terms "include" or "have" when used in this specification, specify the presence of stated features, regions, integers, steps, operations, elements, and/or components, but do not preclude the presence or addition of one or more other features, regions, integers, steps, operations, elements, components, and/or groups thereof.

A vehicle described in the specification may include a car and a motorcycle. The car is described as the vehicle in the following.

The vehicle described in the specification may include an internal combustion engine vehicle having an engine as a power source, a hybrid vehicle having an engine and an electric motor as a power source and an electric vehicle having an electric motor as a power source.

In the following description, the left side of a vehicle means the left side of a driving direction of the vehicle and the right side of the vehicle means the right side of the driving direction of the vehicle.

The following description is based on left hand drive (LHD) vehicles unless otherwise mentioned.

Figure 1:
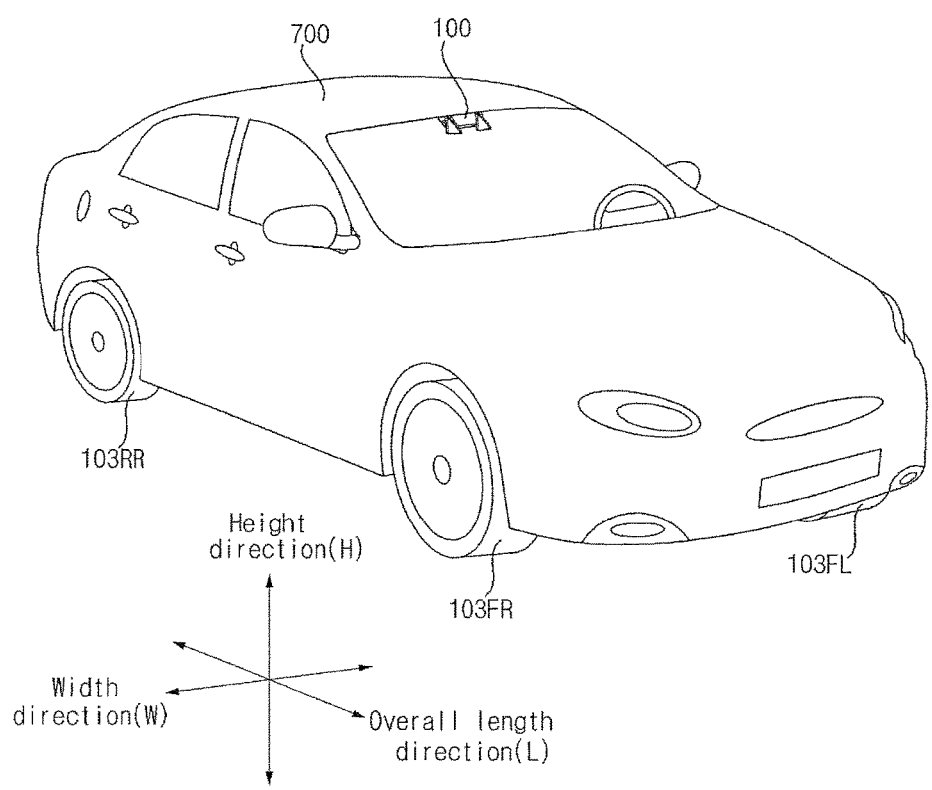
FIG. 1 shows the exterior of a vehicle including a display apparatus for a vehicle according to an embodiment of the present invention.

FIG. 1 shows the exterior of a vehicle including a display apparatus for a vehicle according to an embodiment of the present invention.

As shown, a vehicle 700 may include wheels 103FR, 103FL and 103RR rotating by a power source, a steering unit for steering the vehicle 700 and a driver assistance apparatus 100 for the vehicle, provided to the inside of the vehicle 700.

The driver assistance apparatus 100 may include at least one camera and an image acquired by the at least one camera may be processed into a signal in a processor.

FIG. 1 shows that the driver assistance apparatus 100 includes two cameras.

The overall length means the length between the front part and the rear part of the vehicle 700, width means the width of the vehicle 700 and height means the distance between the lower part of the wheel and the roof of the vehicle. In the following description, an overall length direction L may refer to a direction in which the overall length of the vehicle 700 is measured, a width direction W may refer to a direction in which the width of the vehicle 700 is measured, and a height direction H may refer to a direction in which the height of the vehicle 700 is measured.

Figure 2A:
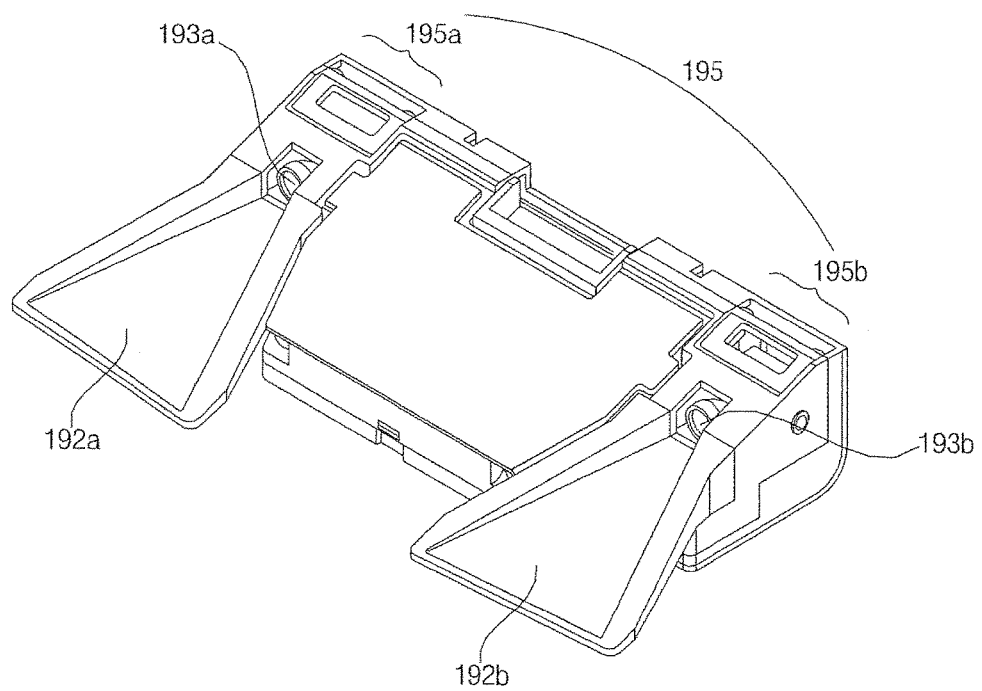
FIGS. 2A to 2C are views for explaining a driver assistance apparatus included in the vehicle shown in FIG. 1 according to embodiments of the present invention.
Figure 2B:
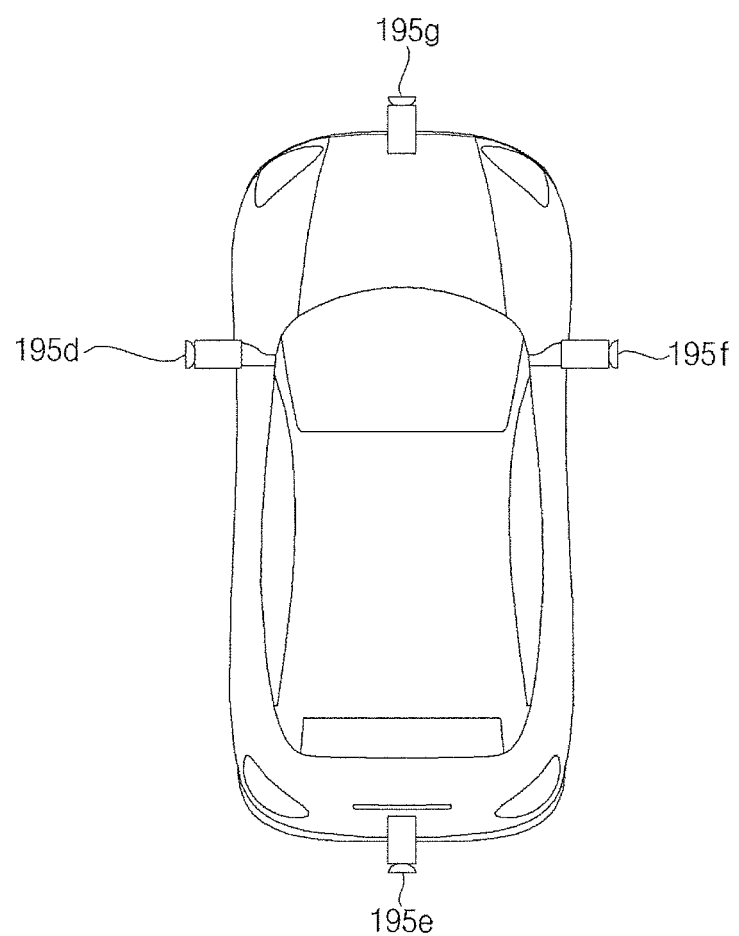
Figure 2C:
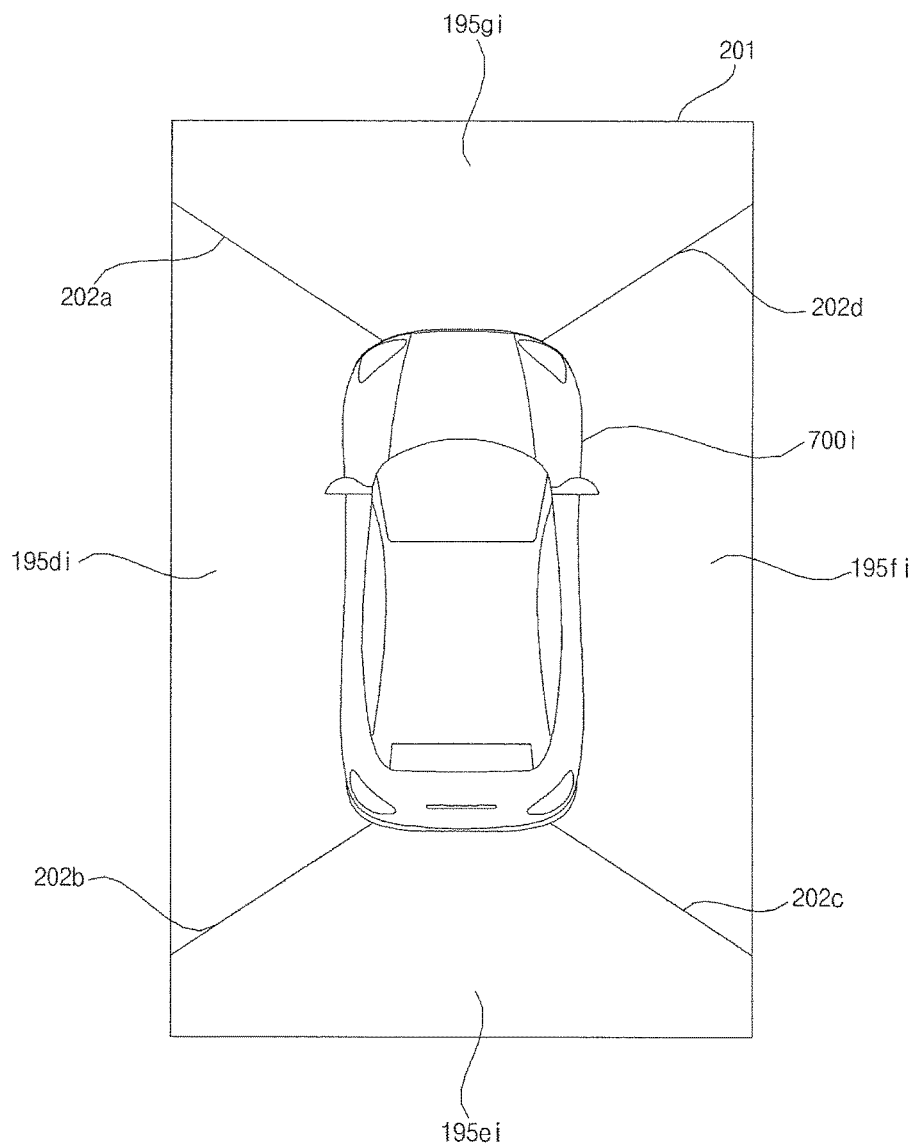

FIGS. 2A, 2B and 2C are views for explaining the driver assistance apparatus included in the vehicle shown in FIG. 1 according to an embodiment of the present invention.

A description will be given of a driving assistance device including cameras 195a and 195b for acquiring a front view image of the vehicle.

While FIG. 2A shows that the driver assistance apparatus 100 includes two cameras, the number of cameras is not limited thereto.

As shown, the driver assistance apparatus 100 may include a first camera 195a having a first lens 193a and a second camera 195b having a second lens 193b. In this case, the camera 195 may be called a stereo camera.

In addition, the driver assistance apparatus 100 may include a first light shield 192a and a second light shield 192b for respectively shielding light input to the first lens 193a and the second lens 193b.

The driver assistance apparatus 100 may have a structure that can be attached/detached to/from the ceiling or windshield of the vehicle 700.

The driver assistance apparatus 100 can acquire stereo images of the area in front of the vehicle from the first and second cameras 195a and 195b, perform disparity detection on the basis of the stereo images, detect an object with respect to at least one stereo image on the basis of disparity information and continuously track movement of the object after detection of the object.

A description will be given of a driving assistance device including cameras 195d, 195e, 195f and 195g for acquiring an around view image of the vehicle with reference to FIGS. 2B and 2C.

While FIGS. 2B and 2C show that the driver assistance apparatus 100 includes four cameras, the number of cameras is not limited thereto.

As shown, the driver assistance apparatus 100 may include a plurality of cameras 195d, 195e, 195f and 195g. In this case, the camera 195 may be called an around view camera.

The plurality of cameras 195d, 195e, 195f and 195g may be arranged at the left, back, right and front of the vehicle. The left camera 195d may be provided to the inside of a case of a left side-view mirror. Otherwise, the left camera 195d may be provided to the outside of the case of the left side-view mirror. Alternatively, the left camera 195d may be provided to the left front door, the left rear door or a region of the outside of the left fender.

The right camera 195f may be provided to the inside of a case of a right side-view mirror. Otherwise, the right camera 195f may be provided to the outside of the case of the right side-view mirror. Alternatively, the right camera 195f may be provided to the right front door, the right rear door or a region of the outside of the right fender.

The rear camera 195e may be provided to the rear license plate or near the trunk switch of the vehicle. The front camera 195g may be positioned near the emblem or the radiator grill of the vehicle.

Images photographed by the plurality of cameras 195d, 195e, 195f and 195g are transmitted to a processor 170. The processor 170 can generate an around view image of the vehicle by combining the respective images.

FIG. 2C shows an exemplary around view image of the vehicle. The around view image 201 of the vehicle may include a first image region 195di captured by the left camera 195d, a second image region 195ei captured by the rear camera 195e, a third image region 195fi captured by the right camera 195f and a fourth image region 195gi captured by the front camera 195g.

The around view image 201 may be displayed as a top view image or a bird's eye image.

When the around view image is generated from the plurality of cameras, a boundary between image regions is generated. The boundary may be smoothly displayed through image blending.

In addition, boundary lines 202a, 202b, 202c and 202d may be displayed on the boundaries of the plurality of images.

The around view image 201 of the vehicle may include a vehicle image 700i. The vehicle image 700i may be an image generated by the processor 170.

The around view image 201 of the vehicle may be displayed through a display 741 of the vehicle or a display 180 of the driver assistance apparatus 100.

Figure 3A:
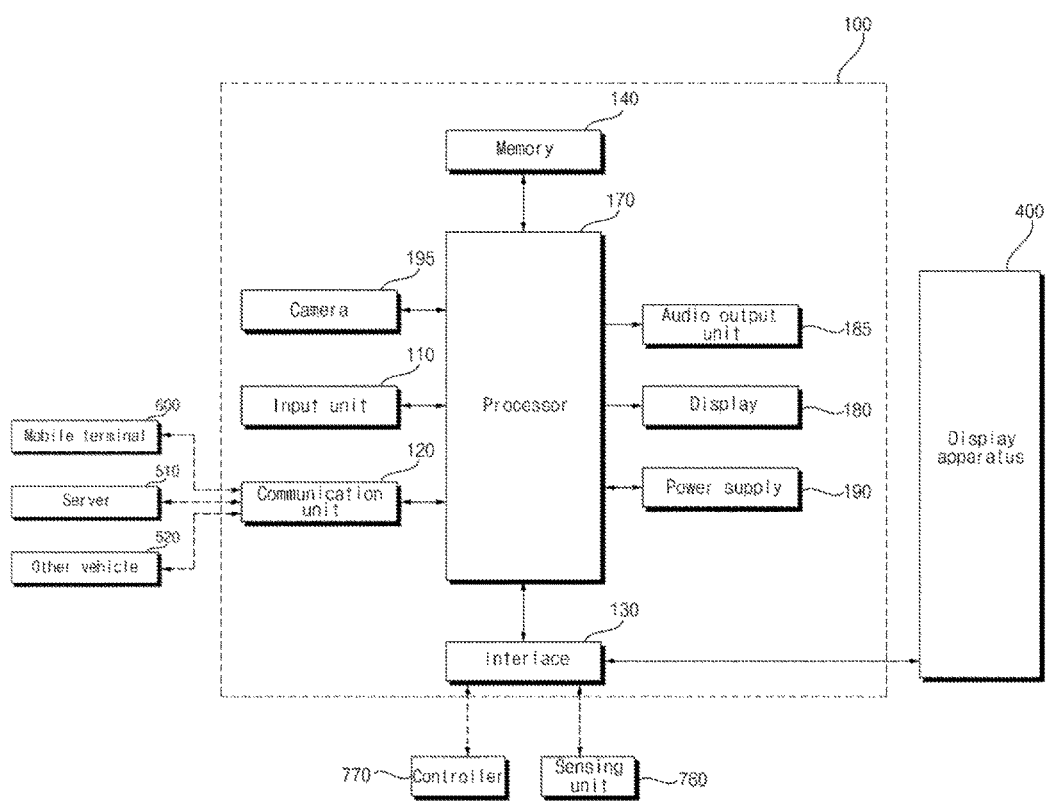
FIGS. 3A to 3C are block diagrams of the driver assistance apparatus according to various embodiments of the present invention.
Figure 3B:
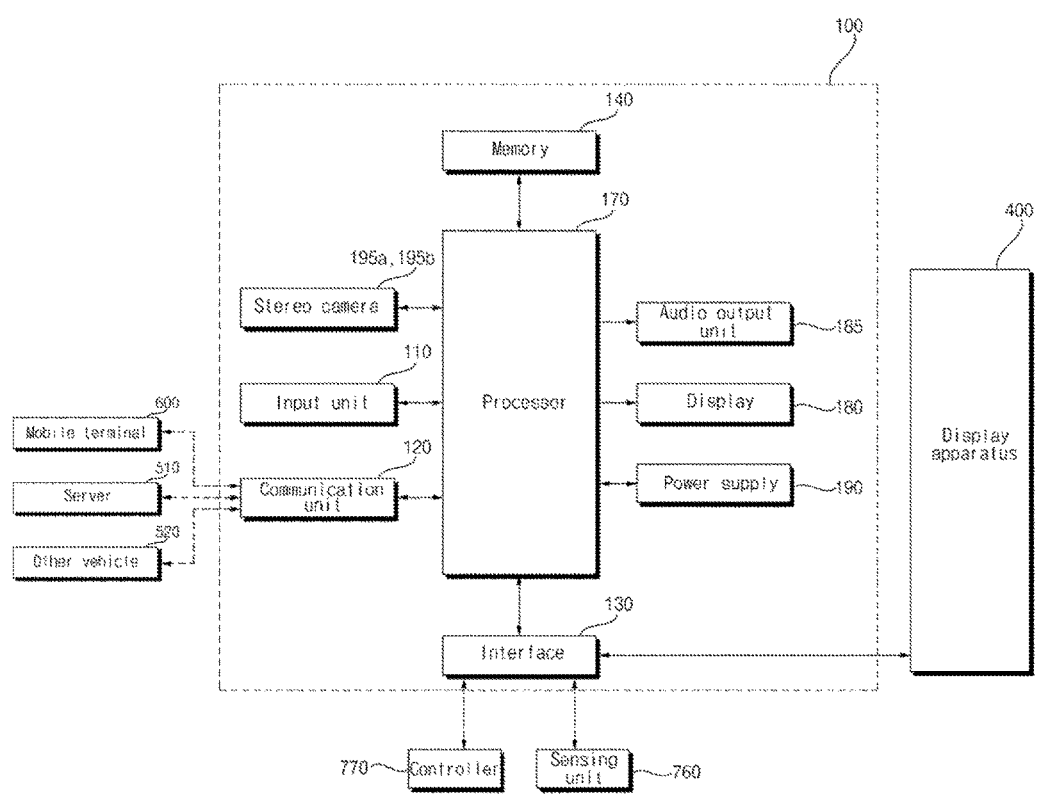
Figure 3C:
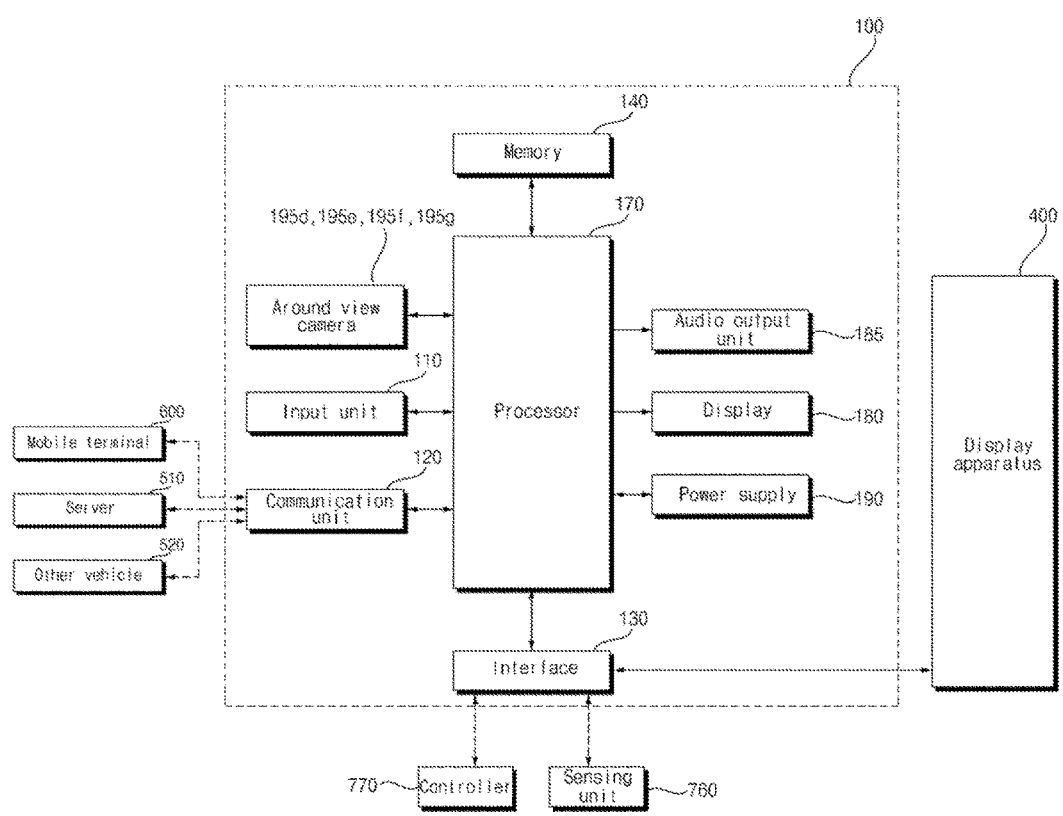

FIGS. 3A, 3B and 3C are block diagrams of the driver assistance apparatus according to various embodiments of the present invention.

The driver assistance apparatus 100 shown in FIGS. 3A and 3B may process an image received from the camera 195 on the basis of computer vision so as to generate vehicle related information. Here, the vehicle related information may include vehicle control information for direct control of the vehicle or vehicle driving assistance information for providing driving guidance to a vehicle driver.

Here, the camera 195 may be a mono camera. Otherwise, the camera 197 may be the stereo cameras 195a and 195b for photographing a front view image of the vehicle. Alternatively, the camera 195 may be around view cameras 195d, 195e, 195f and 195g for photographing an around view image of the vehicle.

FIG. 3A is a block diagram of the driver assistance apparatus 100 according to an embodiment of the present invention.

Referring to FIG. 3A, the driver assistance apparatus 100 may include an input unit 110, a communication unit 120, an interface 130, a memory 140, the processor 170, a power supply 190, the camera 195, the display 180 and an audio output unit 185.

The input unit 110 may include a plurality of buttons or a touchscreen attached to the driver assistance apparatus 100, particularly, the camera 195. It is possible to turn on and operate the driver assistance apparatus 100 through the plurality of buttons or the touchscreen. In addition, various input operations may be performed through the buttons or the touchscreen.

The communication unit 120 may exchange data with a mobile terminal 600 or a server 500 in a wireless manner. Particularly, the communication unit 120 may wirelessly exchange data with a mobile terminal of the vehicle driver. Various data communication schemes such as Bluetooth, Wi-Fi Direct, Wi-Fi, APiX and NFC may be employed as a wireless data communication scheme.

The communication unit 120 may receive weather information and traffic information, for example, TPEG (Transport Protocol Expert Group) information from the mobile terminal 600 or the server 500. The driver assistance apparatus 100 may transmit acquired real-time information to the mobile terminal 600 of the server 500.

When a user enters the vehicle, the mobile terminal 600 of the user and the driver assistance apparatus 100 may be paired automatically or according to execution of an application by the user.

The communication unit 120 may receive information on traffic light change from an external server 510. Here, the external server 510 may be a server located at a traffic control center.

The interface 130 may receive vehicle related data and transmit signals processed or generated in the processor 170 to the outside. To this end, the interface 130 may perform data communication with a controller 770 provided to the inside of the vehicle, a display apparatus 400 for the vehicle and a sensing unit 760 of the vehicle through a wired or wireless communication scheme.

The interface 130 may receive navigation information through data communication with the controller 770, the display apparatus 400 for the vehicle or a separate navigation system. The navigation information may include information on a set destination, route information depending on the destination, map information related to driving of the vehicle, and information on the current position of the vehicle. In addition, the navigation information may include information on the position of the vehicle on a road.

The interface 130 may receive sensor information from the controller 770 or the sensing unit 760. Here, the sensor information may include at least one of vehicle direction information, vehicle position information (GPS information), vehicle heading information, vehicle speed information, vehicle acceleration information, vehicle inclination information, information on forward/reverse movement of the vehicle, battery information, fuel information, tire information, vehicle lamp information, vehicle internal temperature information and vehicle internal humidity information.

Such sensor information may be acquired from a heading sensor, a yaw sensor, a gyro sensor, a position module, a vehicle front/rear sensor, a wheel sensor, a speed sensor, a car body tilting sensor, a battery sensor, a fuel sensor, a tire sensor, a steering sensor, a vehicle internal temperature sensor, a vehicle internal humidity sensor and the like. The position module may include a GPS module for receiving GPS information.

From among the sensor information, the vehicle direction information, vehicle position information, vehicle heading information, vehicle speed information and vehicle inclination information, which are related to driving of the vehicle, may be called vehicle driving information.

The memory 140 may store various types of data for overall operation of the driver assistance apparatus 100, such as a program for processing or control of the processor 170.

The memory 140 may store data for object identification. For example, when a predetermined object is detected from an image acquired through the camera 195, the memory can store data for identifying the object according to a predetermined algorithm.

The memory 140 may store data regarding traffic information. For example, when predetermined traffic information is detected from an image acquired through the camera 195, the memory 140 can store data for identifying the traffic information according to a predetermined algorithm.

The memory 140 may be a storage device such as a ROM, a RAM, an EPROM, a flash drive and a hard drive.

The processor 170 controls overall operation of each unit of the driver assistance apparatus 100.

The processor 170 may process a front view image or an around view image of the vehicle, acquired by the camera 195. Particularly, the processor 170 performs computer vision based signal processing. Accordingly, the processor 170 can acquire a front view image or an around view image of the vehicle from the camera 195 and perform object detection and object tracking on the basis of the acquired image. Particularly, the processor 170 can perform lane detection (LD), vehicle detection (VD), a pedestrian detection (PD), bright spot detection (BD), traffic sign recognition (TSR), road surface detection and the like during object detection.

A traffic sign may refer to predetermined information that can be transmitted to the driver of the vehicle 700. The traffic sign can be transmitted to the driver through a traffic light, a road sign or a road surface. For example, the traffic sign can be a "go" or "stop" sign for vehicles or pedestrians, output from a traffic light. The traffic sign may be a symbol or text indicated on a road sign. For example, the traffic sign can be a symbol or text indicated on the surface of a road.

The processor 170 may detect information from the front view image or the around view image of the vehicle, acquired through the camera 195. The information may be information on vehicle driving situations. For example, the information can include information on a road on which the vehicle travels, traffic rules, information on neighboring vehicles, information on a traffic light for vehicles or pedestrians, information on construction, traffic condition information, parking information, lane information and the like.

The information may be traffic information. The processor 170 may detect traffic information from one of a traffic light, a road sign, a traffic electronic signboard and a road surface, which are included in an image acquired by the camera 195. For example, the processor 170 can detect a "go" or "stop" signal for vehicles or pedestrians from a traffic light included in the image. The processor 170 can detect a symbol or text from a road sign included in the image. The processor 170 can detect a symbol or text from a road surface included in the image. The processor 170 can detect road condition information, accident information or road construction information with respect to the road on which the vehicle is driven from a road sign image included in the image captured by the camera 195.

The processor 170 may compare the detected information with information stored in the memory 140 to identify the information. For example, the processor 170 can detect presence or absence of a lane from an object included in the acquired image. Here, the object may be the surface of a road.

The processor 170 may check the type of the detected lane on the basis of the color or shape of the detected lane. For example, the processor 170 can check whether the detected lane is a center lane on the basis of whether the detected lane is white or yellow. The processor 170 can check whether the detected lane is a changeable lane on the basis of whether the detected lane is a solid line or a dashed line.

In addition, the processor 170 may control zoom of the camera 195. For example, the processor 170 can control zoom of the camera 195 depending on an object detection result. When a road sign is detected but the sign thereon is not detected, the processor 170 can control the camera 195 to zoom in.

Furthermore, the processor 170 may receive weather information and traffic condition information on roads, for example, TPEG (Transport Protocol Expert Group) information through the communication unit 120.

The processor 170 may recognize information on traffic conditions around the vehicle, detected by the driver assistance apparatus 100 on the basis of an image.

The processor 170 may receive navigation information and the like from the display apparatus 400 for the vehicle or a separate navigation system (not shown) through the interface 130.

The processor 170 may receive sensor information from the controller 770 or the sensing unit 760 through the interface 130. Here, the sensor information may include at least one of vehicle direction information, vehicle location information (GPS information), vehicle heading information, vehicle speed information, vehicle acceleration information, vehicle inclination information, vehicle advance/reverse movement information, battery information, fuel information, tire information, vehicle lamp information, vehicle internal temperature information, vehicle internal humidity information and steering wheel rotation information.

The processor 170 may receive navigation information from the controller 770, the display apparatus 400 for the vehicle or a separate navigation system (not shown) through the interface 130.

The processor 170 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and other electrical units for executing the corresponding functions.

The processor 170 may be controlled by the controller 770.

The display 180 may display information processed by the processor 170. The display 180 may display images related to operation of the driver assistance apparatus 100. For such image display, the display 180 may include a cluster or an HUD (Head Up Display) provided to the front part of the inside of the vehicle. When the display 180 is an HUD, a projection module for projecting images may be provided to the windshield glass of the vehicle 700.

The audio output unit 185 may output sound on the basis of an audio signal processed by the processor 170. To this end, the audio output unit 185 may include at least one speaker.

An audio input unit (not shown) may receive user voice. To this end, the audio input unit may include a microphone. The received voice may be converted into an electrical signal and transmitted to the processor 170.

The power supply 190 may supply power necessary for operations of the components under control of the processor 170. The power supply 190 may be provided with power from a battery of the vehicle.

The camera 195 acquires a front view image or an around view image of the vehicle. The camera 195 may be a mono camera or stereo cameras 195a and 195b for photographing a front view image of the vehicle. The camera 195 may be around view cameras 195d, 195e, 195f and 195g for photographing an around view image of the vehicle.

The camera 195 may include an image sensor (e.g., CMOS or CCD) and an image processing module. The camera 195 may process a still image or video acquired by the image sensor. The image processing module may process the still image or video acquired through the image sensor. The image processing module may be configured separately from the processor 170 or integrated with the processor 170 according to embodiments.

The camera 195 may capture an image of at least one of a traffic light, a road sign, a traffic electronic signboard and a road surface.

A zoom of the camera 195 may be set under the control of the processor 170. For example, a zoom barrel (not shown) included in the camera 195 is moved to set a zoom under the control of the processor 170.

A focus of the camera 195 may be set under the control of the processor 170. For example, a focus barrel (not shown) included in the camera 195 is moved to set a focus under the control of the processor 170. A focus may be automatically set on the basis of zoom setting. The processor 170 may automatically control focus in response to zoom control of the camera 195.

FIG. 3B is a block diagram of the driver assistance apparatus 100 according to another embodiment of the present invention.

Referring to FIG. 3B, the driver assistance apparatus 100 differs from the driver assistance apparatus 100 of FIG. 3a in that the former includes the stereo cameras 195a and 195b. The following description is based on such difference.

The driver assistance apparatus 100 may include the first and second cameras 195a and 195b. Here, the first and second cameras 195a and 195b can be called stereo cameras.

The stereo cameras 195a and 195b may be attached/detached to/from the ceiling or windshield of the vehicle 700. The stereo cameras 195a and 195b may include a first lens 193a and a second lens 193b.

In addition, the stereo cameras 195a and 195b may include a first light shield 192a and a second light shield 192b for respectively shielding light input to the first lens 193a and the second lens 193b.

The first camera 195a acquires a first front view image of the vehicle and the second camera 195b acquires a second front view image of the vehicle. The second camera 195b is spaced apart from the first camera 195a by a predetermined distance. Since the first and second cameras 195a and 195b are spaced apart from each other, a disparity is generated and thus distances between the first and second cameras 195a and 195b and an object according to the disparity can be detected.

When the driver assistance apparatus 100 includes the stereo cameras 195a and 195b, the processor 170 performs computer vision based signal processing. Accordingly, the processor 170 can acquire stereo images of the front view of the vehicle from the stereo cameras 195a and 195b, calculate a disparity with respect to the front view of the vehicle on the basis of the stereo images, perform object detection for at least one of the stereo images on the basis of the calculated disparity, detect an object and continuously track movement of the detected object. Here, the stereo images are based on the first image received from the first camera 195a and the second image received from the second camera 195b.

Particularly, the processor 170 may perform lane detection (LD), vehicle detection (VD), pedestrian detection (PD), bright spot detection (BD), traffic sign recognition (TSR), road surface detection and the like during object detection.

In addition, the processor 170 may perform calculation of a distance to a detected neighboring vehicle, calculation of the speed of the detected vehicle, calculation of a speed difference between the corresponding vehicle 700 and the detected vehicle and the like.

The processor 170 may individually control zoom of the first and second cameras 195a and 195b. The processor 170 may periodically change the zoom ratio of the second camera 195b while fixing the zoom of the first camera 195a. The processor 170 may periodically change the zoom ratio of the first camera 195a while fixing the zoom of the second camera 195b.

The processor 170 may control the first or second camera 195a or 195b to periodically zoom in or zoom out.

The processor 170 may set the zoom of the first camera 195a to high magnification for object detection at a long distance. In addition, the processor 170 may set the zoom of the second camera 195b to low magnification for object detection at a short distance. Here, the processor 170 may control the first camera 195a to zoom in and control the second camera 195b to zoom out.

Conversely, the processor 170 may set the zoom of the first camera 195a to low magnification for object detection at a short distance. In addition, the processor 170 may set the zoom of the second camera 195b to high magnification for object detection at a long distance. Here, the processor 170 may control the first camera 195a to zoom out and control the second camera 195b to zoom in.

For example, the processor 170 can control the zoom of the first camera 195a or the second camera 195b depending on an object detection result. When a road sign is detected but the sign thereon is not detected, the processor 170 can control the first camera 195a or the second camera 195b to zoom in.

The processor 170 may automatically control focus in response to zoom control of the camera 195.

FIG. 3C is a block diagram of the driver assistance apparatus 100 according to another embodiment of the present invention.

Referring to FIG. 3C, the driver assistance apparatus 100 differs from the vehicle driving assistance device 100 of FIG. 3A in that the former includes around view cameras 195d, 195e, 195f and 195g. The following description is based on such difference.

The driver assistance apparatus 100 may include the around view cameras 195d, 195e, 195f and 195g. The around view cameras 195d, 195e, 195f and 195g may respectively include lenses and light shields for shielding light input to the lenses. The around view cameras 195d, 195e, 195f and 195g may include a left camera 195d, a rear camera 195e, a right camera 195f and a front camera 195g. The left camera 195d acquires a left-side view image of the vehicle and the rear camera 195e acquires a rear view image of the vehicle. The right camera 195f acquires a right-side view image of the vehicle and the front camera 195g acquires a front view image of the vehicle.

The images acquired through the around view cameras 195d, 195e, 195f and 195g are transmitted to the processor 170. The processor 170 may generate an around view image of the vehicle by combining the left-side view image, rear view image, right-side view image and front view image of the vehicle. Here, the around view image of the vehicle may be a top view image or a bird's eye view image. The processor 170 may generate the around view image by respectively receiving the left-side view image, rear view image, right-side view image and front view image of the vehicle, combining the received images and converting the combined images into a top view image.

The processor 170 may detect an object on the basis of the around view image of the vehicle. Particularly, the processor 170 may perform lane detection (LD), vehicle detection (VD), pedestrian detection (PD), bright spot detection (BD), traffic sign recognition (TSR), road surface detection and the like during object detection.

Furthermore, the processor 170 may individually control zoom of the around view cameras 195d, 195e, 195f and 195g. Zoom control of the processor 170 may be performed in the same manner as that with respect to the stereo cameras, described with reference to FIG. 3B.

Figure 4A:
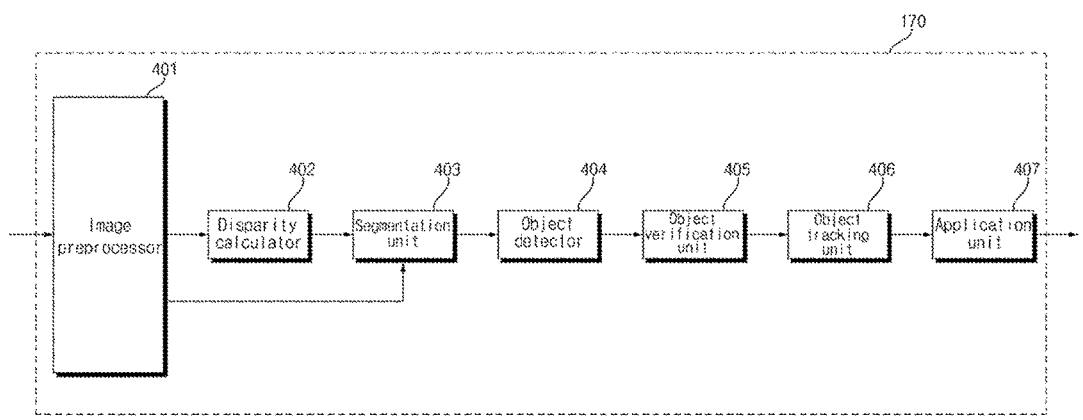
FIGS. 4A and 4B are block diagrams of processors shown in FIGS. 3A to 3C.
Figure 4B:
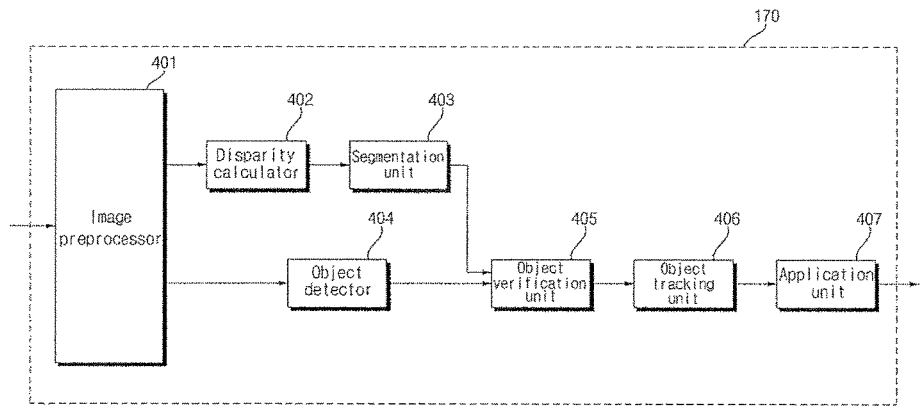

FIGS. 4A and 4B are block diagrams of the processor shown in FIGS. 3A, 3B and 3C and FIGS. 5A and 5B are views for explaining operation of the processor shown in FIGS. 4A and 4B.

Referring to FIG. 4A, the processor 170 included in the driver assistance apparatus 100 may include an image preprocessor 401, a disparity calculator 402, an object detector 404, an object tracking unit 406, and an application unit 407.

The image preprocessor 401 may receive an image from the camera 195 and preprocess the image. Specifically, the image preprocessor 401 may perform noise reduction, rectification, calibration, color enhancement, color space conversion (CSC), interpolation, camera gain control and the like on an image. Accordingly, a clearer image than stereo images photographed by the camera 195 can be acquired.

The disparity calculator 402 may receive the image processed by the image preprocessor 401, perform stereo matching on the received image and acquire a disparity map according to stereo matching. That is, the disparity calculator 4030 can acquire disparity information about stereo images of the front view of the vehicle.

Here, stereo matching can be performed per pixel of the stereo images or on a block by block basis. The disparity map refers to a map that represents binocular parallax information of stereo images, that is, left and right images, as numerical values.

A segmentation unit 403 may perform segmentation and clustering on at least one image on the basis of the disparity information from the disparity calculator 402. Specifically, the segmentation unit 403 may separate a background and a foreground from at least one of the stereo images on the basis of the disparity information.

For example, the segmentation unit 403 can calculate a region corresponding to disparity information less than a predetermined value in the disparity map as a background and remove the corresponding region. Accordingly, a foreground can be relatively separated.

Alternatively, the segmentation unit 403 can calculate a region corresponding to disparity information that exceeds the predetermined value in the disparity map as a foreground and extract the corresponding region, thereby separating the foreground.

When the foreground and the background are separated on the basis of the disparity information extracted based on the stereo images, a signal processing speed can be increased and the quantity of processed signals can be reduced during object detection.

The object detector 404 may detect an object on the basis of image segmentation of the segmentation unit 403. That is, the object detector 404 may detect an object from at least one image on the basis of the disparity information.

Specifically, the object detector 404 may detect an object from at least one image. For example, the object detector 404 can detect an object from a foreground separated according to image segmentation.

An object verification unit 405 may classify and verify the detected object. To this end, the object verification unit 405 may use an identification method using a neural network, a support vector machine (SVM) method, an identification method according to AdaBoost using Haar-like characteristics, histograms of oriented gradients (HOG) or the like.

The object verification unit 405 may verify the detected object by comparing the detected object with objects stored in the memory 140. For example, the object verification unit 405 can verify vehicles, lanes, road surfaces, road signs, danger areas, tunnels and the like, located around the corresponding vehicle.

The object tracking unit 406 may track the verified object. For example, the object tracking unit 406 can verify an object included in sequentially acquired stereo images, calculate motion or a motion vector of the verified object and track movement of the object on the basis of the calculated motion or motion vector. Accordingly, the object tracking unit 406 can track vehicles, lanes, road surfaces, road signs, danger zones, tunnels and like around the corresponding vehicle.

The application unit 407 may calculate a degree of car accident risk of the vehicle 700 on the basis of various objects around the vehicle, for example, other vehicles, lanes, road surfaces, road signs and the like. In addition, the application unit 407 may calculate possibility of rear-end collision, slip of the vehicle and the like.

Furthermore, the application unit 407 may output messages for informing the user of the information on the calculated hazard, rear-end collision possibility or vehicle slip as vehicle driving assistance information on the basis of the calculated hazard, rear-end collision possibility or vehicle slip. In addition, the application unit 407 may generate a control signal for attitude control or driving control of the vehicle 700 as vehicle control information.

Figure 7:
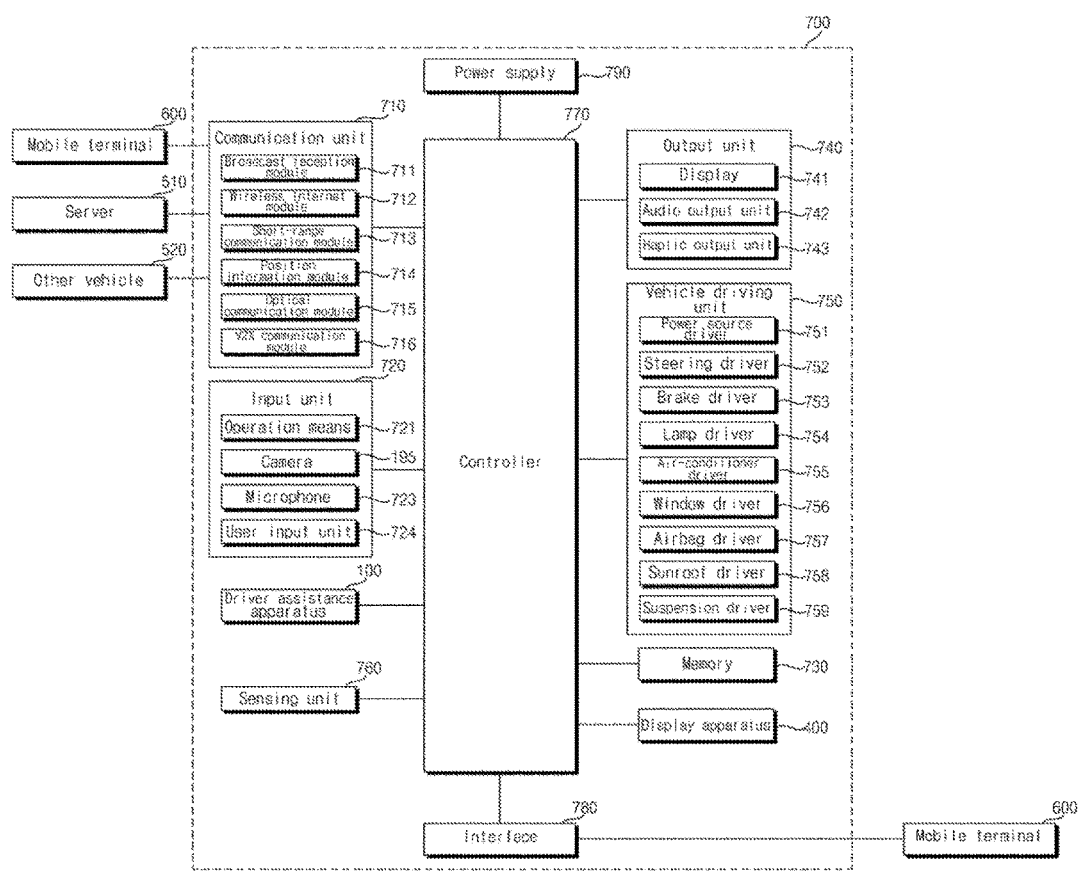
FIG. 7 is an internal block diagram of the vehicle shown in FIG. 1.

The image preprocessor 401, the disparity calculator 402, the segmentation unit 403, the object detector 404, the object verification unit 405, the object tracking unit 406 and the application unit 407 may be internal components of an image processor 810 in the processor 170 in FIG. 7 and the following figures.

The processor 170 may include part of the image preprocessor 401, the disparity calculator 402, the segmentation unit 403, the object detector 404, the object verification unit 405, the object tracking unit 406 and the application unit 407 according to an embodiment. When the camera 195 is configured as a mono camera or around view cameras, the disparity calculator 402 may be excluded according to an embodiment. Furthermore, the segmentation unit 403 may be excluded according to an embodiment.

FIG. 4B is a block diagram of the processor according to another embodiment of the present invention.

As shown, the processor 170 of FIG. 4B has the same internal component units as the processor 170 of FIG. 4A but differs from the processor 170 of FIG. 4A with respect to signal processing order. Only such difference is described in the following.

The object detector 404 receives stereo images and detects an object from at least one stereo image. Distinguished from the processor 170 shown in FIG. 4A, the object detector 404 may directly detect an object from a stereo image instead of detecting the object from segmented images on the basis of disparity information.

The object verification unit 405 classifies and verifies detected and separated objects on the basis of image segments from the segmentation unit 403 and objects detected by the object detector 404.

To this end, the object verification unit 405 may use an identification method using a neural network, a support vector machine (SVM) method, an identification method according to AdaBoost using Haar-like characteristics or histograms of oriented gradients (HOG).

Figure 5B:
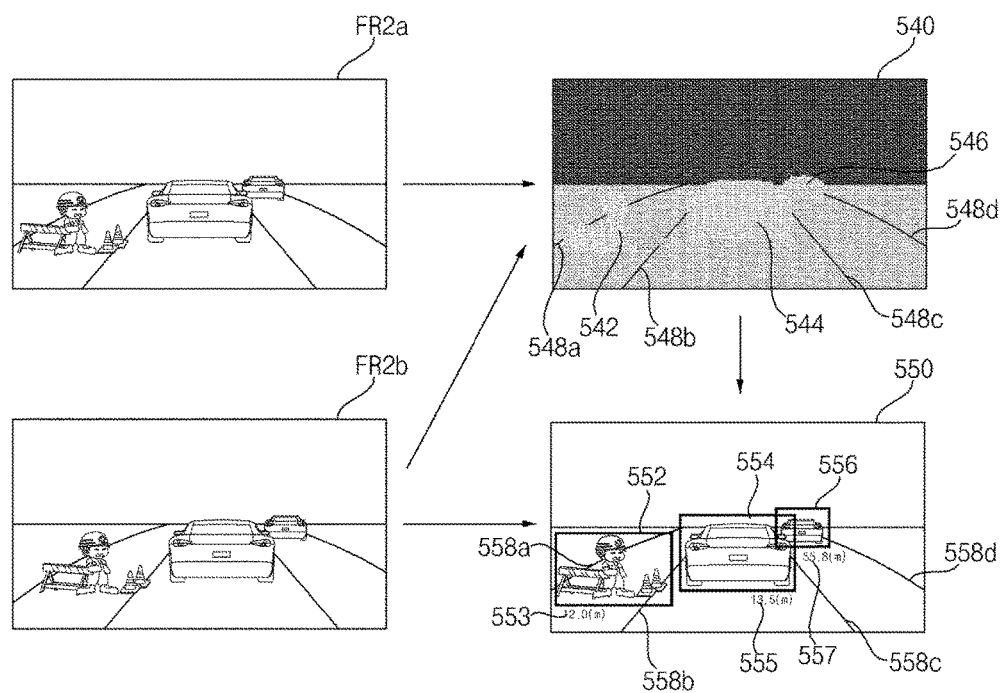

FIGS. 5A and 5B are views for explaining operation of the processor 170 shown in FIG. 4A on the basis of stereo images respectively acquired in first and second frame intervals.

Referring to FIG. 5A, the stereo camera 195 acquires stereo images in the first frame interval. The disparity calculator 420 included in the processor 170 receives stereo images FR1a and FR1b, which are processed into signals by the image preprocessor 410, and performs stereo matching on the received stereo images FR1a and FR1b so as to acquire a disparity map 520.

The disparity map 520 represents levels of disparity between the stereo images FR1a and FR1b. A distance to the vehicle is recognized to be shorter as the disparity level increases and is recognized to be longer as the disparity level decreases.

When the disparity map is displayed, a higher disparity level may be represented as higher brightness and a lower disparity level may be represented as lower brightness.

In FIG. 5A, first to fourth lanes 528a, 528b, 528c and 528d respectively have disparity levels corresponding thereto and a construction zone 522, a first preceding vehicle 524 and a second preceding vehicle 526 respectively have disparity levels corresponding thereto in the disparity map 520.

The segmentation unit 432, the object detector 434 and the object verification unit 436 respectively perform segmentation, object detection and object verification on at least one of the stereo images FR1a and FR1b on the basis of the disparity map 520.

FIG. 5A illustrates that object detection and verification are performed on the second stereo image FR1b using the disparity map 520. That is, the first to fourth lanes 538a, 538b, 538c and 538d, the construction zone 532, the first preceding vehicle 534 and the second preceding vehicle 536 in an image 530 can be detected and verified.

Referring to FIG. 5B, the stereo camera 195 acquires stereo images in the second frame interval. The disparity calculator 420 included in the processor 170 receives stereo images FR2a and FR2b, which are processed into signals by the image preprocessor 410, and performs stereo matching on the received stereo images FR2a and FR2b so as to acquire a disparity map 540.

In FIG. 5B, first to fourth lanes 548a, 548b, 548c and 548d respectively have disparity levels corresponding thereto and a construction zone 542, a first preceding vehicle 544 and a second preceding vehicle 546 respectively have disparity levels corresponding thereto in the disparity map 540.

The segmentation unit 432, the object detector 434 and the object verification unit 436 respectively perform segmentation, object detection and object verification on at least one of the stereo images FR2a and FR2b on the basis of the disparity map 540.

FIG. 5B illustrates that object detection and verification are performed on the second stereo image FR2b using the disparity map 540. That is, the first to fourth lanes 548a, 548b, 548c and 548d, the construction zone 542, the first preceding vehicle 544 and the second preceding vehicle 546 in an image 550 can be detected and verified.

The object tracking unit 440 tracks the verified objects by comparing FIG. 5A and FIG. 5B. Specifically, the object tracking unit 440 may track movement of the objects verified in FIGS. 5A and 5B on the basis of motions or motion vectors of the objects. Accordingly, the object tracking unit 440 can track the lanes, the construction zone, the first preceding vehicle and the second preceding vehicle, which are located around the corresponding vehicle.

Figure 6A:
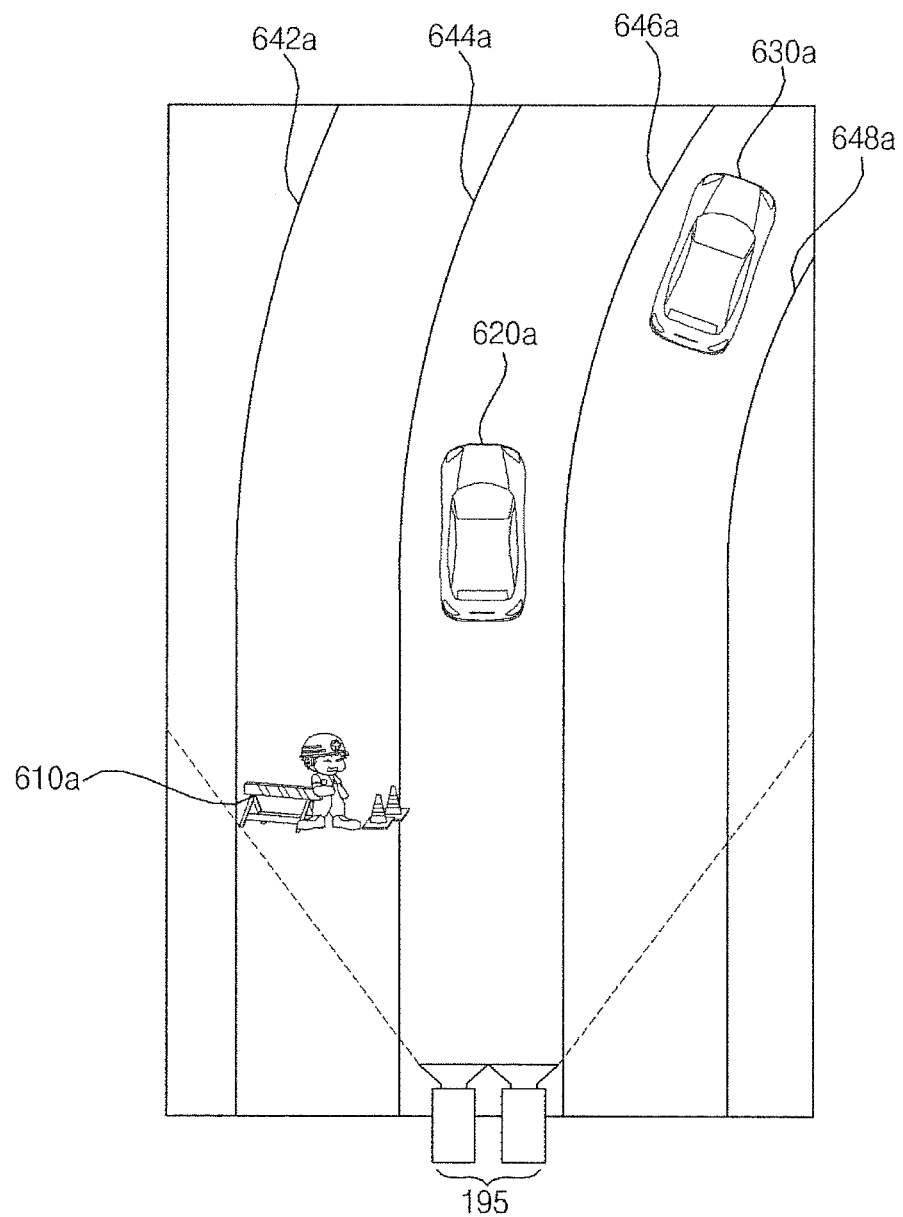
FIGS. 6A and 6B are views for explaining operation of the driver assistance apparatus shown in FIGS. 3A to 3C.
Figure 6B:
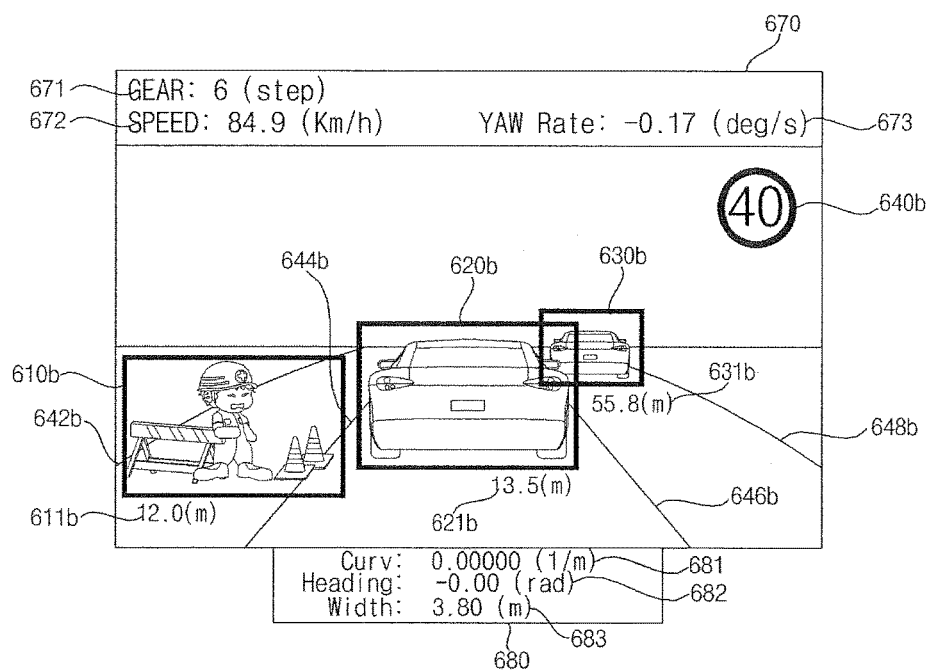

FIGS. 6A and 6B are views for explaining operation of the driver assistance apparatus shown in FIGS. 3A, 3B and 3C.

FIG. 6A illustrates a front view image of the vehicle, photographed by the stereo camera 195 included in the vehicle. Particularly, the front view image is displayed as a bird's eye view image.

Referring to FIG. 6A, first, second, third and fourth lanes 642a, 644a, 646a and 648a are present from left to right, a construction zone 610a is located between the first lane 642a and the second lane 644a, a first preceding vehicle 620a is positioned between the second lane 644a and the third lane 646a, and a second preceding vehicle 630a is positioned between the third lane 646a and the fourth lane 648a.

FIG. 6B illustrates display of situations in front of the vehicle, recognized by the driver assistance apparatus, along with various types of information. Particularly, the image shown in FIG. 6B may be displayed on the display 180 of the driver assistance apparatus, the display apparatus 400 for the vehicle or the display 741.

FIG. 6B illustrates display of information on the basis of an image captured by the stereo camera 185, distinguished from FIG. 6A.

Referring to FIG. 6B, first, second, third and fourth lanes 642*b*, 644*b*, 646*b* and 648*b* are present from left to right, a construction zone 610*b* is located between the first lane 642*b* and the second lane 644*b*, a first preceding vehicle 620*b* is positioned between the second lane 644*b* and the third lane 646*b*, and a second preceding vehicle 630*b* is positioned between the third lane 646*b* and the fourth lane 648*b*.

The driver assistance apparatus 100 may verify objects with respect to the construction zone 610*b*, the first preceding vehicle 620*b* and the second preceding vehicle 630*b* by processing stereo images acquired by the stereo cameras 195*a* and 195*b* into signals.

FIG. 6B shows that the borders of the construction zone 610*b*, the first preceding vehicle 620*b* and the second preceding vehicle 630*b* are highlighted in order to indicate object verification with respect to the construction zone 610*b*, the first preceding vehicle 620*b* and the second preceding vehicle 630*b*.

The driver assistance apparatus 100 may calculate distances between the corresponding vehicle and the construction zone 610*b*, the first preceding vehicle 620*b* and the second preceding vehicle 630*b* on the basis of the stereo images acquired by the stereo camera 195. FIG. 6B illustrates display of first distance information 611*b*, second distance information 621*b* and third distance information 631*b* respectively corresponding to the construction zone 610*b*, the first preceding vehicle 620*b* and the second preceding vehicle 630*b*.

The driver assistance apparatus 100 may receive sensor information about the vehicle from the controller 770 or the sensing unit 760. Particularly, the driver assistance apparatus 100 may receive a vehicle speed, gear information, a yaw rate that indicates a rotation angle (yaw angle) of the vehicle, and vehicle heading information and display the received information.

Referring to FIG. 6B, while a vehicle speed 672, gear information 671 and a yaw rate 673 are displayed on the upper part 670 of the front view image of the vehicle, and heading information 682 is displayed on the lower part 680 of the front view image of the vehicle, various other examples are possible. In addition, the width 683 of the vehicle and road curvature information 681 may be displayed along with the heading information 682.

The driver assistance apparatus 100 may receive information on a speed limit with respect to the road in which the vehicle is being driven through the communication unit 120 or the interface 130. FIG. 6B shows display of information on speed limit 640*b*.

While the driver assistance apparatus 100 can display the information shown in FIG. 6B through the display 180, the driver assistance apparatus 100 may store the information without displaying the same. In addition, the driver assistance apparatus 100 may use the information for various applications.

FIG. 7 is an internal block diagram of the vehicle shown in FIG. 1.

The vehicle 700 may include a communication unit 710, an input unit 720, a sensing unit 760, an output unit 740, a vehicle driving unit 750, a memory 730, an interface 780, a controller 770, a power supply 790, the driver assistance apparatus 100 and the display apparatus 400 for the vehicle.

The communication unit 710 may include one or more modules for enabling wireless communication between the vehicle 700 and the mobile terminal 600, between the vehicle 700 and the external server 510 or between the vehicle 700 and another vehicle 520. In addition, the communication unit 710 may include one or more modules for linking the vehicle to one or more networks.

The communication unit 710 may include a broadcast reception module 711, a wireless Internet module 712, a short-range communication module 713, a position information module 714, an optical communication module 715 and a V2X communication module 716.

The broadcast reception module 711 receives broadcast signals or broadcast related information from an external broadcast management server through broadcast channels. Here, broadcast includes radio broadcast and TV broadcast.

The wireless Internet module 712 refers to a module for wireless Internet access and may be embedded in the vehicle 700 or provided to the outside of the vehicle 700. The wireless Internet module 712 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 712 transmits and receives data according to at least one of wireless Internet technologies including those not above-mentioned. For example, the wireless Internet module 712 can wirelessly exchange data with the external server 510. The wireless Internet module 712 can receive weather information and traffic information (e.g., TPEG (Transport Protocol Expert Group) information) from the external server 510.

The short-range communication module 713 is a module for short-range communication and can support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 713 can perform short range communication between the vehicle 700 and at least one external device by establishing wireless area networks. For example, the short-range communication module 713 can exchange data with the mobile terminal 600. The short-range communication module 713 can receive weather information and traffic information (e.g., TPEG information) from the mobile terminal 600. When the user gets in the vehicle 700, the mobile terminal 600 of the user and the vehicle 700 can be paired automatically or according to execution of an application by the user.

The position information module 714 is a module for acquiring the location of the vehicle 700 and a typical example thereof is a GPS (Global Positioning System) module. For example, the vehicle can acquire the location thereof using signals sent from a GPS satellite using the GPS module.

The optical communication module 715 may include a light transmission unit and a light receiving unit. The light receiving unit converts a light signal into an electrical signal so as to receive information. The light receiving unit may include a photodiode (PD) for receiving light. The photodiode converts light into an electrical signal. For example, the light receiving unit can receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit can emit a light signal through flickering of the light-emitting element, which corresponds to a predetermined frequency. According to an embodiment, the light transmission unit may include a plurality of light-emitting element arrays. According to an embodiment, the light transmission unit may be integrated with a lamp provided to the vehicle 700. For example, the light transmission unit can be at least one of a headlight, a taillight, a brake lamp, a turn signal lamp and a sidelight. For example, the optical transmission module 715 can exchange data with the other vehicle 520 through optical communication.

The V2X communication module 716 is a module for wireless communication between the vehicle 700 and the external server 510 or the other vehicle 520. The V2X module 716 includes a module in which a vehicle-to-vehicle communication (V2V) or vehicle-to-infrastructure communication (V2I) protocol can be implemented. The vehicle 700 can perform wireless communication with the external server 510 or the other vehicle 520 through the V2X communication module 716.

The input unit 720 may include an operation unit 721, the camera 195, a microphone 723 and a user input unit 724. The operation unit 721 receives user input for driving the vehicle 700. The operation unit 721 may include a steering input unit, a shift input unit, an acceleration input unit and a brake input unit 721*d*.

The user applies steering input to the steering input unit. The steering input unit is preferably configured in the form of a wheel such that steering input can be applied according to rotation. According to an embodiment, the steering input unit may be configured as a touchscreen, a touch pad or a button.

The user applies inputs with respect to parking P, driving (D), neutral (N), reverse (R) of the vehicle 700 through the shift input unit. The shift input unit is preferably configured in the form of a lever. According to an embodiment, the shift input unit may be configured in the form of a touchscreen, a touch pad or a button.

The user applies input with respect to acceleration of the vehicle 700 through the acceleration input unit. The user applies input with respect to reduction of the speed of the vehicle 700 to the brake input unit. The acceleration input unit and the brake input unit are preferably configured in the form of a pedal. According to an embodiment, the acceleration input unit or the brake input unit may be configured in the form of a touchscreen, a touch pad or a button.

The camera 195 may include an image sensor and an image processing module. The camera 195 may process still images or video acquired through the image sensor (e.g., CMOS or CCD). The image processing module may process still images or video acquired through the image sensor to extract necessary information and transmit the extracted information to the controller 770. The vehicle 700 may include the camera 195 for photographing a front view image or an around view image of the vehicle and an internal camera 195*c* for photographing the inside of the vehicle.

The internal camera 195*c* may acquire an image of a person who enters the vehicle. The internal camera 195*c* may acquire an image for biometrics of the person. In addition, the internal camera 195*c* may detect the number of people getting in the vehicle by acquiring an image of the people.

While FIG. 7 shows that the camera 195 is included in the input unit 720, the camera 195 may be included in the driver assistance apparatus 100 as described above with reference to FIGS. 2 to 6.

The microphone 723 may process an external audio signal into electrical data. The processed data may be used in various manners according to functions executed in the vehicle 700. The microphone 723 may convert a voice command of the user into electrical data. The converted electrical data may be transmitted to the controller 770.

According to an embodiment, the camera 195 or the microphone 723 may be included in the sensing unit 760 instead of the input unit 720.

The user input unit 724 is used to receive information from the user. Upon input of information through the user input unit 724, the controller 770 may control operation of the vehicle 700 to respond to the input information. The user input unit 724 may include a touch type input unit or a mechanical input unit. According to an embodiment, the user input unit 724 may be provided to a region of the steering wheel of the vehicle. In this case, the driver can operate the user input unit 724 with a finger while gripping the steering wheel.

The sensing unit 760 senses signals related to driving of the vehicle 700 and the like. To this end, the sensing unit 760 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an ultrasonic sensor, radar, lidar and the like.

Accordingly, the sensing unit 760 may acquire sensing signals with respect to vehicle collision information, vehicle position information (GPS information), heading information, speed information, acceleration information, vehicle inclination information, driving/reversing information, battery information, fuel information, tire information, vehicle lamp information, vehicle internal temperature information, vehicle internal humidity information, steering wheel rotation angle information and the like.

In addition, the sensing unit 760 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

Furthermore, the sensor unit 760 may include a biometric information sensor. The biometric information sensor senses and acquires biometric information of a person getting in the car. The biometric information may include fingerprint information, iris-scan information, retina-scan information, hand geometry information, facial recognition information and voice recognition information. The biometric information sensor may include a sensor for sensing biometric information of the person getting in the vehicle. Here, the internal camera 195*c* and the microphone 723 can operate as a sensor. The biometric information sensor can acquire information on a hand shape and face recognition information through the internal camera 195*c*.

The output unit 740 outputs information processed in the controller 770 and may include the display, an audio output unit 742 and a haptic output unit 743. The display 741 may display information processed in the controller 770. For example, the display 741 can display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display 741 may include at least one of a liquid crystal display (LCD), a thin film transistor-liquid crystal display (TFT LCD), an organic light-emitting diode (OLED), a flexible display, a 3D display and an e-ink display.

The display 741 may implement a touchscreen by forming a layered structure with a touch sensor or by being integrated with the touch sensor. Such touchscreen can function as the user input unit 724 that provides an input interface between the vehicle 700 and the user and, simultaneously, provide an output interface between the vehicle 700 and the user. In this case, the display 741 may include a touch sensor for sensing touch applied to the display 741 such that a control command is input to the display 741 through touch. When touch is applied to the display 741, the touch sensor can sense the touch and the controller 770 can generate a control command corresponding to the touch on the basis of the sensed touch. Input applied through touch may be text, figures or menu items that can be indicated or designated in various modes.

The display 741 may include a cluster to enable the driver to drive the vehicle and, simultaneously, to check vehicle state information or vehicle driving information. The cluster may be provided on the dashboard. In this case, the driver can check information displayed on the cluster while looking forward.

According to an embodiment, the display 741 may be implemented as an HUD (Head Up Display). When the display 741 is implemented as an HUD, information can be output through a transparent display provided to the windshield of the vehicle. Alternatively, the display 741 may include a projection module so as to output information through an image projected to the windshield.

The audio output unit 742 outputs an electrical signal from the controller 770 into an audio signal and outputs the audio signal. To this end, the audio output unit 742 may include a speaker. The audio output unit 742 can output sound corresponding to operation of the user input unit 724.

The haptic output unit 743 generates haptic output. For example, the haptic output unit 743 can vibrate the steering wheel, a safety belt or a seat to enable the user to recognize haptic output.

The vehicle driving unit 750 may control operations of various devices of the vehicle. The vehicle driving unit 750 may include a power source driver 751, a steering driver 752, a brake driver 753, a lamp driver 754, an air-conditioner driver 755, a window driver 756, an airbag driver 757, a sunroof driver 758 and a suspension driver 759.

The power source driver 751 can perform electronic control of a power source of the vehicle 700. For example, when the power source is a fossil fuel based engine (not shown), the power source driver 751 can perform electronic control of the engine so as to control the output torque of the engine. When the power source driver 751 is an engine, the speed of the vehicle can be limited by restricting an engine output torque under the control of the controller 770.

Alternatively, when an electric motor (not shown) is a power source, the power source driver 751 can control the motor. Accordingly, revolutions per minute (RPM), torque and the like of the motor can be controlled.

The steering driver 752 may electronically control a steering apparatus of the vehicle 700 so as to steer the vehicle 700.

The brake driver 753 may electronically control a brake apparatus (not shown) of the vehicle 700. For example, the brake driver 753 can reduce the speed of the vehicle 700 by controlling the operation of a brake provided to the wheels. As another example, the brake driver 753 can adjust the direction of the vehicle 700 to the left or right by differently operating brakes respectively provided to the left and right wheels.

The lamp driver 754 may turn on/turn off lamps provided to the inside and outside of the vehicle 700. In addition, the lamp driver 754 may control illuminance, directions and the like of the lamps. For example, the lamp driver 754 can control the turn signal, brake lamp and the like.

The air-conditioner driver 755 may electronically control an air conditioner (not shown) of the vehicle 700. For example, the air-conditioner driver 755 can control the air conditioner to supply chilly air to the inside of the vehicle 700 when the internal temperature of the vehicle is high.

The window driver 756 may electronically control a window apparatus of the vehicle 700. For example, the window driver 756 can control opening or closing of left and right windows provided to the side of the vehicle.

The airbag driver 757 may electronically control an airbag apparatus provided to the inside of the vehicle 700. For example, the airbag driver 757 can control the airbag apparatus to operate in a dangerous situation.

The sunroof driver 758 may electronically control a sunroof apparatus (not shown) of the vehicle 700. For example, the sunroof driver 758 can control opening or closing of a sunroof.

The suspension driver 759 may electronically control a suspension apparatus (not shown) of the vehicle 700. For example, the suspension driver 759 can reduce vibration of the vehicle 700 by controlling the suspension apparatus when the surface of the road is rough.

The memory 730 is electrically connected to the controller 770. The memory 730 may store fundamental data about the units, control data for operation control of the units and input/output data. The memory 730 may be various types of storage devices such as a ROM, a RAM, an EPROM, a flash drive and a hard drive. The memory 730 may store various types of data for the overall operation of the vehicle 700, such as programs for processing or control.

The interface 780 may function as a passage to various external devices connected to the vehicle 700. For example, the interface 780 can include a port that can be connected to the mobile terminal 600 and be connected to the mobile terminal 600 via the port. In this case, the interface 780 can exchange data with the mobile terminal 600.

In addition, the interface 780 may serve as a passage through which electric energy is supplied to the mobile terminal 600 connected thereto. When the mobile terminal 600 is electrically connected to the interface 780, the interface 780 provides electric energy supplied from the power supply 790 to the mobile terminal 600 under the control of the controller 770.

The controller 770 may control operations of the respective units of the vehicle 700. The controller 770 may be called an ECU (Electronic Control Unit).

The controller 770 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors) and other electrical units for executing the corresponding functions.

The power supply 790 may supply power necessary for operations of the respective components under the control of the controller 770. Particularly, the power supply 790 may be provided with power from a battery (not shown) inside the vehicle 700.

The driver assistance apparatus 100 may exchange data with the controller 770. A control signal generated in the driver assistance apparatus 100 may be output to the controller 770. The driver assistance apparatus 100 may be the driver assistance apparatus described above with reference to FIGS. 1 to 6B.

The display apparatus 400 for the vehicle may exchange data with the controller 770. The controller 770 may receive navigation information from the display apparatus 400 or a separate navigation system (not shown). Here, the navigation information may include information on a set destination, route information depending on the destination, map information regarding vehicle driving and vehicle location information.

Figure 8A:
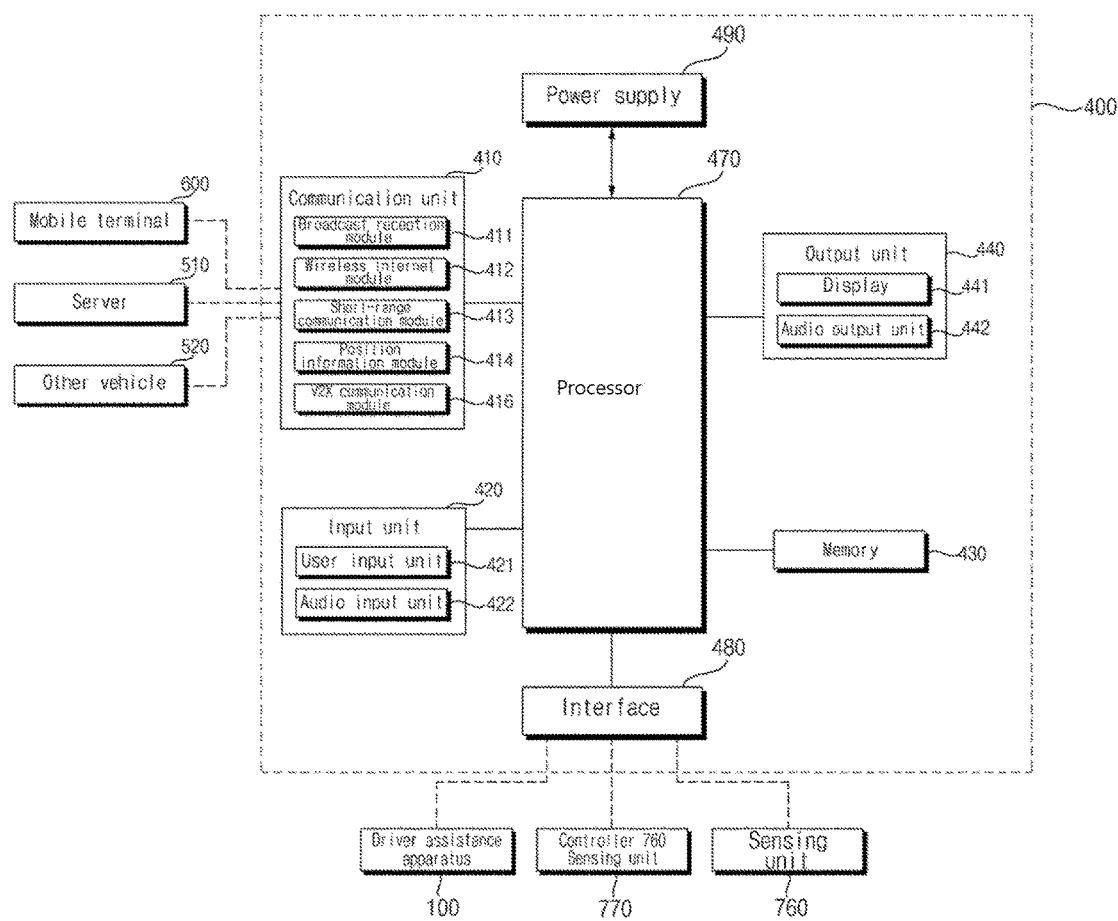
FIG. 8A is a block diagram of a display apparatus for a vehicle according to an embodiment of the present invention.

FIG. 8A is a block diagram of the display apparatus for the vehicle according to an embodiment of the present invention.

The display apparatus 400 for the vehicle may be used as an interface (human machine interface (HMI)) between the user and the vehicle 700.

The display apparatus 400 for the vehicle may provide a function of outputting audio and video content. In addition, the display apparatus 400 for the vehicle may provide a navigation function.

The display apparatus 400 for the vehicle may receive user input. The display apparatus 400 for the vehicle may include a plurality of units for executing the HMI function.

Referring to FIG. 8A, the display apparatus 400 for the vehicle may include a communication unit 410, an input unit 420, a memory 430, an output unit 440, an interface 480 and a power supply 490.

The vehicle 700 may include a communication unit 710, an input unit 720, a sensing unit 760, an output unit 740, a vehicle driving unit 750, a memory 730, an interface 780, a controller 770, a power supply 790, the driver assistance apparatus 100 and the display apparatus 400 for the vehicle.

The communication unit 410 may include one or more modules for enabling wireless communication between the vehicle 700 and the mobile terminal 600, between the vehicle 700 and the external server 510 or between the vehicle 700 and another vehicle 520. In addition, the communication unit 410 may include one or more modules for linking the vehicle to one or more networks.

The communication unit 410 may include a broadcast reception module 411, a wireless Internet module 412, a short-range communication module 413, a position information module 414, and a V2X communication module 416.

The broadcast reception module 411 receives broadcast signals or broadcast related information from an external broadcast management server through broadcast channels. Here, broadcast includes radio broadcast and TV broadcast.

The wireless Internet module 412 refers to a module for wireless Internet access and may be embedded in the vehicle 700 or provided outside the vehicle 700. The wireless Internet module 412 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 412 transmits and receives data according to at least one of wireless Internet technologies including those not mentioned above. For example, the wireless Internet module 412 can wirelessly exchange data with the external server 510. The wireless Internet module 412 can receive weather information and traffic information of roads (e.g., TPEG information) from the external server 510.

The short-range communication module 413 is a module for short range communication and can support short range communication using at least one of Bluetooth™, RFID (Radio Frequency Identification), Infrared Data Association (IrDA), UWB (Ultra Wideband), ZigBee, NEC (Near Field Communication), Wi-Fi (Wireless-Fidelity), Wi-Fi Direct and Wireless USB (Wireless Universal Serial Bus).

The short-range communication module 413 may perform short range communication between the vehicle 700 and at least one external device by establishing wireless area networks. For example, the short-range communication module 413 can exchange data with the mobile terminal 600. The short-range communication module 413 can receive weather information and traffic information of roads (e.g., TPEG information) from the mobile terminal 600. When the user enters the vehicle 700, the mobile terminal 600 of the user and the vehicle 700 can be paired automatically or according to execution of an application by the user.

The position information module 414 is a module for acquiring the location of the vehicle 700 and a typical example thereof is a GPS module. For example, the vehicle can acquire the location thereof using signals sent from a GPS satellite by using the GPS module.

The V2X communication module 416 is a module for wireless communication between the vehicle 700 and the external server 510 or the other vehicle 520. The V2X module 416 includes a module in which a vehicle-to-vehicle communication (V2V) or vehicle-to-infrastructure communication (V2I) protocol can be implemented. The vehicle 700 may perform wireless communication with the external server 510 or the other vehicle 520 through the V2X communication module 416.

The input unit 420 may include a user input unit 421 and an audio input unit 422.

The user input unit 421 receives information from the user. Upon input of information through the user input unit 424, a processor 470 may control operation of the display apparatus 400 for the vehicle in response to the input information. The user input unit 424 may include a touch-type input unit or a mechanical input unit.

The audio input unit 422 may process an external audio signal into electrical data. The processed data may be used in various manners according to a function being executed in the display apparatus 400 for the vehicle. The audio input unit 422 may convert a voice command of the user into electrical data. The electrical data may be transmitted to the processor 470.

The memory 430 is electrically connected to the processor 470. The memory 430 may store fundamental data about the units, control data for operation control of the units and input/output data. The memory 430 may be various types of storage devices such as a ROM, a RAM, an EPROM, a flash drive and a hard drive. The memory 430 may store various types of data for the overall operation of the vehicle 700, such as programs for processing or control of the processor 470.

The memory 430 may store map data for implementing the navigation function. Here, the map data may be pre-stored during production of the vehicle 700. Alternatively, the map data may be received from an external device through the communication unit 410 or the interface 480.

The output unit 440 outputs information processed by the processor 470 and may include a display 441 and an audio output unit 442.

The display 441 may display information processed by the processor 470. For example, the display 441 can display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display 441 may include at least one of a liquid crystal display (LCD), a thin film transistor-liquid crystal display (TFT LCD), an organic light-emitting diode (OLED), a flexible display, a 3D display and an e-ink display.

The display 441 may implement a touchscreen by forming a layered structure with a touch sensor or by being integrated with the touch sensor. Such touchscreen may function as the user input unit 424 that provides an input interface between the display apparatus 400 for the vehicle and the user and, simultaneously, provide an output interface between the display apparatus 400 for the vehicle and the user. In this case, the display 441 may include a touch sensor for sensing touch applied to the display 441 such that a control command is input to the display 441 through touch. When touch is applied to the display 441, the touch sensor can sense the touch and the processor 470 can generate a control command corresponding to the touch on the basis of the sensed touch. Input applied through touch may be text, figures or menu items that can be indicated or designated in various modes.

The display 441 may be implemented such that an image is displayed on a region of the windshield of the vehicle.

The display 441 may include a transparent display. In this case, the transparent display can be attached to the windshield. Accordingly, the display apparatus 400 for the vehicle can output information through the transparent display.

The transparent display may display a predetermined screen with predetermined transparency. For transparency, the transparent display may include at least one of a transparent TFEL (Thin Film Electroluminescent) display, a transparent OLED (Organic Light-Emitting Diode) display, a transparent LCD (Liquid Crystal Display), a transmission type transparent display and a transparent LED (Light Emitting Diode) display. The transparency of the transparent display may be controlled by the processor 470.

The display 441 may include a projection module. In this case, the display apparatus 400 can output information through an image projected to the windshield.

The projection module projects a beam to the windshield. The projection module may include a light source and a projection lens. The projection module may generate an image corresponding to information processed by the processor 470. That is, the projection module may generate an image using light generated from the light source and project the image onto the windshield. Here, the light source preferably uses an LED, laser and the like.

The audio output unit 442 converts an electrical signal from the processor 470 into an audio signal and outputs the audio signal. To this end, the audio output unit 442 may include a speaker. The audio output unit 442 may output a sound corresponding to operation of the user input unit 421.

The interface 480 may receive data or transmit a signal processed or generated in the processor 470 to the outside. To this end, the interface 480 may perform data communication with the controller 770 of the vehicle, the driver assistance apparatus 100 and the sensing unit 760 according to a radio communication scheme.

The interface 480 may receive sensor information from the controller 770 or the sensing unit 760. Here, the sensor information may include at least one of vehicle direction information, vehicle position information (GPS information), vehicle heading information, vehicle speed information, vehicle acceleration information, vehicle inclination information, information on forward/reverse movement of the vehicle, battery information, fuel information, tire information, vehicle lamp information, vehicle internal temperature information and vehicle internal humidity information.

Such sensor information may be acquired from a heading sensor, a yaw sensor, a gyro sensor, a position module, a vehicle front/rear sensor, a wheel sensor, a speed sensor, a car body tilting sensor, a battery sensor, a fuel sensor, a tire sensor, a steering sensor, a vehicle internal temperature sensor, a vehicle internal humidity sensor and the like. The position module may include a GPS module for receiving GPS information.

From among the sensor information, the vehicle direction information, vehicle position information, vehicle heading information, vehicle speed information and vehicle inclination information, which are related to driving of the vehicle, may be called vehicle driving information.

The interface 480 may receive information or data from the driver assistance apparatus 100. The interface 480 may receive front view image data or around view image data of the vehicle, which is acquired through the camera 195 included in the driver assistance apparatus 100.

The interface 480 may receive information or data obtained by processing a front view image or an around view image of the vehicle by the processor 170 of the driver assistance apparatus 100. The interface 480 may receive lane information detected from a front view image or an around view image of the vehicle. For example, the interface 480 can receive information about a lane in which the vehicle 700 is being driven, from among a plurality of lanes of a road.

When the vehicle 700 is being driven on a road, the driver assistance apparatus 100 may detect information on a lane in which the vehicle is being driven from among a plurality of lanes of the road. The interface 480 may receive the information on the lane in which the vehicle is being driven.

The driver assistance apparatus 100 may detect information on a neighboring lane of the lane in which the vehicle is being driven. The interface 480 may receive the information on the neighboring lane.

The interface 480 may receive information on passengers, acquired through the internal camera 195*c*. Here, the passenger information may include information on the number of passengers.

The processor 470 controls overall operation of each unit of the display apparatus 400.

The processor 470 may control the output unit 440 to output information or data received through the communication unit 410, the input unit 420 or the interface 480. The processor 470 may control the output unit 440 to output information or data stored in the memory 430. The processor 470 may directly output received information or data or process the information or data and then output the processed information or data. The processor 470 may visually output information or data through the display 441. The processor 470 may acoustically output information or data through the audio output unit 442.

The processor 470 may generate new information on the basis of information or data received through the interface 480. The processor 470 may control the display 441 to display the generated information or an image corresponding to the generated information.

The processor 470 may control the display 441 to display a map. The map may be a map for implementing the navigation function. The processor 470 may display a route to a set destination through the map.

The processor 470 may control the display 441 to display the map in the form of a top view. The processor 470 may control the display 441 to display the current position of the vehicle 700 on the map on the basis of GPS information.

The processor 470 may control the display 441 to match a TBT (Turn By Turn) image to a point corresponding to a lane in which the vehicle is being driven on a route on the map and to display the TBT image thereon.

The processor 470 may receive information on the lane in which the vehicle is being driven from the driver assistance apparatus 100 through the interface 480. The information on the lane in which the vehicle is being driven may be information about the lane which the vehicle 700 is currently in. The processor 470 may match the information on the lane in which the vehicle 700 is being driven to a route on the map.

When the vehicle 700 is being driven in the first lane of a three-lane road, the driver assistance apparatus 100 may detect driving of the vehicle in the first lane. The processor 470 may receive information on driving of the vehicle in the first lane through the interface 480 and match the information to the route on the map. In this case, the lane in which the vehicle 700 is being driven may be correctly displayed on the route on the map.

A TBT image may be an arrow image indicating a lane in which the vehicle is being driven. For example, the TBT image may be an arrow image indicating left turn, right turn, go straight or U turn at a crossroads or an intersection. The TBT image can be displayed when the vehicle 700 is located within a predetermined distance from a crossroad or an intersection.

The display 441 may be implemented such that a screen is displayed in a region of the windshield through a transparent display or a projection module. In the following description, the display 441 is implemented such that a screen is displayed in a region of the windshield.

The processor 470 may control the display 441 to display an image of the lane in which the vehicle is being driven and a TBT image in a region of the windshield.

The processor 470 may generate the image of the lane in which the vehicle is being driven on the basis of information on the lane in which the vehicle is being driven, received from the driver assistance apparatus 100. The processor 470 may display a TBT image representing a driving route on the image of the lane in which the vehicle is being driven.

The processor 470 may control the display 441 to display the TBT image in a region of the windshield corresponding to the lane in which the vehicle is being driven. For example, the processor 470 can control the display 441 to display the TBT image in a region of the windshield, which meets a line connecting the eyes of the user and the lane in which the vehicle is being driven.

The processor 470 may display a TBT image on the basis of whether the lane in which the vehicle is being driven needs to be changed to a neighboring lane. For example, when lane change on the route is necessary, the processor 470 can display a TBT image corresponding to lane change in a region of the windshield, which corresponds to the lane in which the vehicle is being driven.

The processor 470 may control the display 441 to display a first region of the windshield, which corresponds to the lane in which the vehicle is being driven, and a second region of the windshield, which corresponds to a lane other than the lane in which the vehicle is being driven, in different colors. Here, the first region may be a region of the windshield, which meets a line connecting the eyes of the user and the lane in which the vehicle is being driven. The second region may be a region of the windshield, which meets a line connecting the eyes of the user and a lane other than the lane in which the vehicle is being driven.

When the lane in which the vehicle is being driven meets a plurality of forks, the processor 470 may control the display 441 to display the first region and the second region of the windshield in different colors. Here, the first region of the windshield may correspond to a first fork matched to the route on the map, from among the plurality of forks, and the second region of the windshield may correspond to a fork other than the first fork from among the plurality of forks.

Furthermore, the processor 470 may control the display 441 to further display an image corresponding to information. Here, the information may be traffic information. The information may be received from the communication unit 410 or the input unit 420.

The information may be received from the driver assistance apparatus 100, the controller 770 or the sensing unit 760 through the interface 480.

For example, the processor 470 can receive information, which is generated by processing an image acquired from the camera 195 of the driver assistance apparatus 100, through the interface 480. Specifically, the processor 170 of the driver assistance apparatus 100 can detect traffic information from a traffic light, a road sign, a traffic electronic signboard or a road surface included in an image acquired through the camera 195. The processor 470 can receive the detected traffic information through the interface 480 and control the display 441 to display an image corresponding to the received traffic information.

The information may be information pre-stored in the memory 430. The information may include information on speed limits of roads, compass information, lane information, school zone information, object detection information, object speed information, information on a distance to an object, information on whether a lane can be changed, virtual lane information, lane departure information, parking guide information and matrix head lamp information. Operation of displaying an image corresponding to the information will be described later with reference to FIG. 13.

When images corresponding to information are displayed, the processor 470 may control the display 441 to display a first image and a second image in different shapes or different colors. Here, the first image may be an image displayed in the first region of the windshield, which corresponds to the lane in which the vehicle is being driven. The second image may be an image displayed in the second region of the windshield, which corresponds to a lane other than the lane in which the vehicle is being driven. The first region may be a region of the windshield, which meets a line connecting the eyes of the user and the lane in which the vehicle is being driven, and the second region may be a region of the windshield, which meets a line connecting the eyes of the user and a lane other than the lane in which the vehicle is being driven.

The first image may be an image corresponding to first information and the second image may be an image corresponding to second information different from the first information.

When a destination is preset, the processor 470 may control the display 441 to display the first image and the second images in different shapes or different colors. The processor 470 may control the display 441 to display the first image at a predetermined angle to the plane including the lane in which the vehicle is being driven.

The processor 470 may control the display 441 to change the predetermined angle between the first image and the plane including the lane in which the vehicle is being driven over time.

The processor 470 may control the display 441 to display the second image on a plane including a lane other than the lane in which the vehicle is being driven. The processor 470 may control the display 441 to display the first or second image at a predetermined angle to the plane including the lane in which the vehicle is being driven or the plane including the other lane according to importance.

When the images corresponding to information are displayed, the processor 470 may control the display 441 to display the first image and the second image in different shapes or different colors. Here, the first image may be an image displayed in the first region of the windshield, which corresponds to a lane to be changed to. The second image may be an image displayed in the second region of the windshield, which corresponds to a lane other than the lane to be changed to. The first region may be a region of the windshield, which meets a line connecting the eyes of the user and the lane to be changed to, and the second region may be a region of the windshield, which meets a line connecting the eyes of the user and a lane other than the lane to be changed to.

The processor 470 may change a route on the map on the basis of traffic information detected from an image of a traffic light, a road sign, a traffic electronic signboard or a road surface. The processor 470 may control the display 441 to match a TBT image to a point corresponding to a lane in which the vehicle is being driven on the changed route and to display the TBT image thereon. Here, the lane in which the vehicle is being driven is based on information on the lane in which the vehicle is being driven, which is received from the driver assistance apparatus 100 through the interface 480.

When the route on the map is changed, the processor 470 may control the display 441 to display a route change event.

Traffic information may include traffic accident information, construction information, road congestion information and extra lane information.

The processor 470 may receive traffic information from the mobile terminal 600, the external server 510 or the other vehicle 520 through the communication unit. The processor 470 may change the route on the map on the basis of the received traffic information. The processor 470 may control the display 441 to display a TBT image matched to a point corresponding to a lane in which the vehicle is being driven on the changed route. Here, the lane in which the vehicle is being driven is based on information on the lane in which the vehicle is being driven, which is received from the driver assistance apparatus 100 through the interface 480.

The processor 470 may display a plurality of TBT images. The processor 470 may control the display 441 to display a first TBT image from among the plurality of TBT images at a change point closest to the current location of the vehicle on the route on the map. Here, the change point may refer to a point at which the driving route of the vehicle can be changed, such as a crossroads or a junction. The TBT image can be displayed when the vehicle 700 is located within a predetermined distance from the change point.

The processor 470 may control the display 441 to change the size, color or transparency of the first TBT image as the vehicle approaches the change point.

The processor 470 may control the display 441 to display whether the vehicle can enter a high occupancy vehicle lane on the basis of information on passengers, received through the interface 480. The high occupancy vehicle lane can be detected from an image acquired by the camera 195 of the driver assistance apparatus 100.

The processor 470 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and other electronic units for executing the corresponding functions.

The power supply 490 may supply power necessary for operations of the respective components under the control of the processor 470. Particularly, the power supply 490 may be provided with power from the battery of the vehicle 700.

Figure 8B:
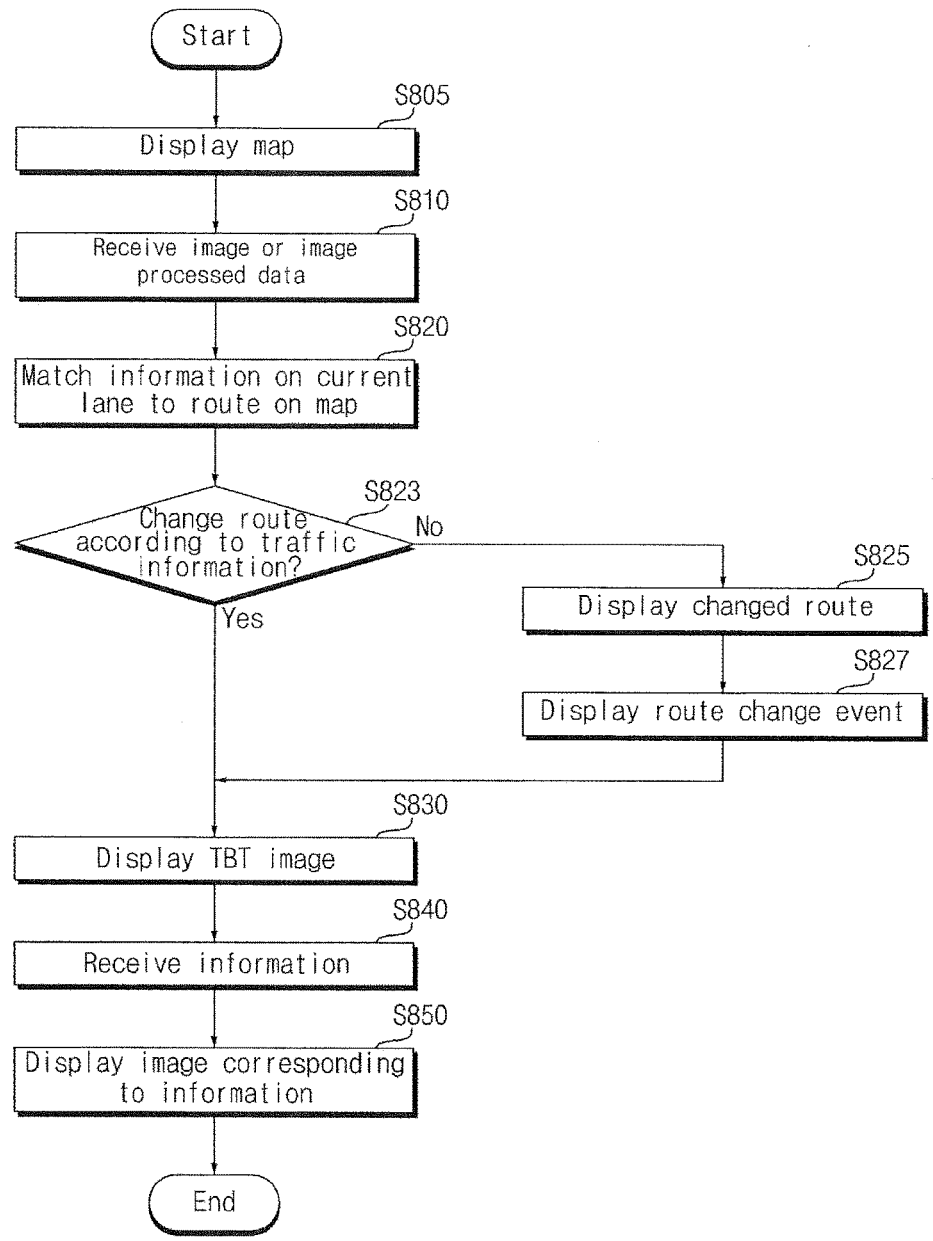
FIG. 8B is a flowchart illustrating operation of the display apparatus for a vehicle according to an embodiment of the present invention.

FIG. 8B is a flowchart illustrating operation of the display apparatus for the vehicle according to an embodiment of the present invention.

Referring to FIG. 8B, the processor 470 may control the display 441 to display a map (S805).

The map may be a map for implementing the navigation function. The processor 470 may display a route to a set destination on the map. The map may be pre-stored in the memory 430. The map may be received through the communication unit 410.

The processor 470 may control the display 441 to display the map in the form of a top view. The processor 470 may display the position of the vehicle 700 based on GPS information on the map.

The processor 470 may receive an image, or information or data generated by processing the image (S810).

The processor 470 may receive information or data from the driver assistance apparatus 100 through the interface 480. Specifically, the processor 470 may receive a front view image or an around view image of the vehicle. Otherwise, the processor 470 may receive information or data generated on the basis of the front view image or the around view image of the vehicle from the driver assistance apparatus 100.

The processor 470 may receive information on a lane in which the vehicle 700 is being driven. The driver assistance apparatus 100 may detect the lane in which the vehicle 700 is being driven from the front view image or the around view image of the vehicle 700 and generate information on the lane. The processor 470 may receive the information on the lane from the driver assistance apparatus 100.

The processor 470 may receive information on a lane other than the lane in which the vehicle 700 is being driven. The driver assistance apparatus 100 may detect a lane other than the lane in which the vehicle 700 is being driven from the front view image or the around view image of the vehicle 700 and generate information on the other lane. The processor 470 may receive the information on the other lane from the driver assistance apparatus 100.

The processor 470 may match the information on the lane in which the vehicle 700 is being driven to the route on the map (S820).

The processor 470 may match the information on the lane in which the vehicle 700 is being driven to the route on the map, to which information on the position of the vehicle 700, acquired through GPS, has been applied. A conventional navigation map provides information on lanes of roads but cannot provide information on the lane in which a vehicle is currently traveling due to GPS error. The display apparatus for the vehicle according to an embodiment of the present invention can provide accurate driving situation information by reflecting even information on the lane in which the vehicle is being driven in the driving situation information.

When the vehicle 700 is being driven in the first lane of a three-lane road, the driver assistance apparatus 100 can detect whether the vehicle 700 is being driven in the first lane. The processor 470 may receive the information on whether the vehicle 700 is being driven in the first lane and match the information to the route on the map. In this case, the lane in which the vehicle 700 is being driven can be accurately displayed on the route on the map.

If the route is changed according to traffic information (S823), the processor 470 may control the display 441 to display the changed route (S825). Then, the processor 470 may control the display 441 to display a route change event (S827).

Here, the traffic information may be TSR information received through the interface 480. The TSR information may be traffic information detected from the front view image or the around view image of the vehicle.

For example, the driver assistance apparatus 100 can acquire the front view image or the around view image of the vehicle through the camera 195. Here, the front view image or the around view image of the vehicle may include an image of a traffic light, a road sign, a traffic electronic signboard or a road surface.

The processor 170 of the driver assistance apparatus 100 may detect traffic information on the basis of the image of a traffic light, a road sign, a traffic electronic signboard or a road surface.

The traffic information may be received from the mobile terminal 600, the external server 510 or the other vehicle 520 through the communication unit 410. Here, the traffic information may include traffic accident information, construction information, road congestion information and extra lane information.

The processor 470 may change the route on the basis of the received traffic information. For example, the processor 470 can change the route to a route that takes a minimum time on the basis of traffic accident information, construction information, road congestion information or extra lane information.

When the route is changed, the processor 470 may display the changed route and control the display 441 to display a route change event.

Then, the processor 470 may match a TBT image to a point corresponding to the information on the lane in which the vehicle 700 is being driven on the route on the map and display the TBT image thereon (S830).

The processor 470 may control the display 441 to display an image of the lane in which the vehicle 700 is being driven and the TBT image in a region of the windshield. For example, the processor 470 can display the image of the lane in which the vehicle is being driven and display the TBT image on the image of the lane.

The processor 470 may control the display 441 to display the TBT image in a region of the windshield, which corresponds to the lane in which the vehicle is being driven. For example, the processor 470 can control the display 441 to display the TBT image in a region of the windshield, which meets a line connecting the eyes of the user and the lane in which the vehicle is being driven.

The processor 470 may display the TBT image on the basis of whether the lane in which the vehicle is being driven needs to be changed to a neighboring lane. For example, when the lane in which the vehicle is being driven needs to be changed, the processor 470 may display a TBT image corresponding to lane change in a region of the windshield, which corresponds to the lane in which the vehicle is being driven.

A plurality of TBT images may be displayed. The processor 470 may control the display 441 to display a plurality of TBT images in a region of the windshield, which corresponds to the lane in which the vehicle is being driven. For example, the processor 470 can control the display 441 to display a predetermined number of TBT images at change points close to the current position of the vehicle on the route on the map.

The processor 470 may control the display 441 to match a first TBT image from among the plurality of TBT images to a change point closest to the current position of the vehicle and to display the first TBT image thereon on the route on the map. In this case, the processor 470 may control the display 441 to change the size, color or transparency of the first TBT image as the vehicle approaches the change point.

When the route is not changed according to traffic information in step S823, the processor 470 may control the display 441 to match a TBT image to a point corresponding to the information on the lane in which the vehicle is being driven and to display the TBT image thereon on the route on the map (S830).

The processor may receive information (S840). The information may be received from the communication unit 410 or the input unit 420. The information may be received from the driver assistance apparatus 100, the controller 770 or the sensing unit 760 through the interface 480.

For example, the processor 470 can receive information, generated by processing an image acquired by the camera 195 of the driver assistance apparatus 100, through the interface 480. Specifically, the processor 170 of the driver assistance apparatus 100 may detect traffic information from an image of a traffic light, a road sign, a traffic electronic signboard or a road surface. The processor 470 may receive the detected traffic information through the interface 480 and control the display 441 to display an image corresponding to the received traffic information.

The information may include information on speed limits of roads, compass information, lane information, school zone information, object detection information, object speed information, information on a distance to an object, information on lane change, virtual lane information, lane departure information, parking guide information and matrix head lamp information. Operation of displaying an image corresponding to information will be described in detail later with reference to FIG. 13.

The processor 470 may control the display 441 to display an image corresponding to the information (S850).

The processor 470 may control the display 441 to display the first image and the second image in different shapes or different colors when images corresponding to information are displayed. Here, the first image may be an image displayed in a first region of the windshield, which corresponds to the lane in which the vehicle is being driven. The second image may be an image displayed in a second region of the windshield, which corresponds to a lane other than the lane in which the vehicle is being driven. The first region may be a region of the windshield, which meets a line connecting the eyes of the user and a lane other than the lane to be changed to. The second region may be a region of the windshield, which meets a line connecting the eyes of the user and the other lane.

The first image may be an image corresponding to first information and the second image may be an image corresponding to second image different from the first information.

When a destination is preset, the processor 470 may control the display 441 to display the first image and the second image in different shapes or different colors.

The processor 470 may control the display 441 to display the first image at a predetermined angle to the plane including the lane in which the vehicle is being driven.

The processor 470 may control the display 441 to change the predetermined angle between the first image and the plane including the lane in which the vehicle is being driven over time.

The processor 470 may control the display 441 to display the second image on the plane including the lane other than the lane in which the vehicle is being driven.

The processor 470 may control the display 441 to display the first or second image at a predetermined angle to the plane including the lane in which the vehicle is being driven or the plane including a lane other than the lane in which the vehicle is being driven, according to importance.

When images corresponding to information are displayed, the processor 470 may control the display 441 to display the first image and the second image in different shapes or different colors. Here, the first image may be an image displayed in a first region of the windshield, which corresponds to a lane to be changed to. The second image may be an image displayed in a second region of the windshield, which corresponds to a lane other than the lane to be changed to. The first region may be a region of the windshield, which meets a line connecting the eyes of the user and the lane to be changed to. The second region may be a region of the windshield, which meets a line connecting the eyes of the user and a lane other than the lane to be changed to.

Figure 9:
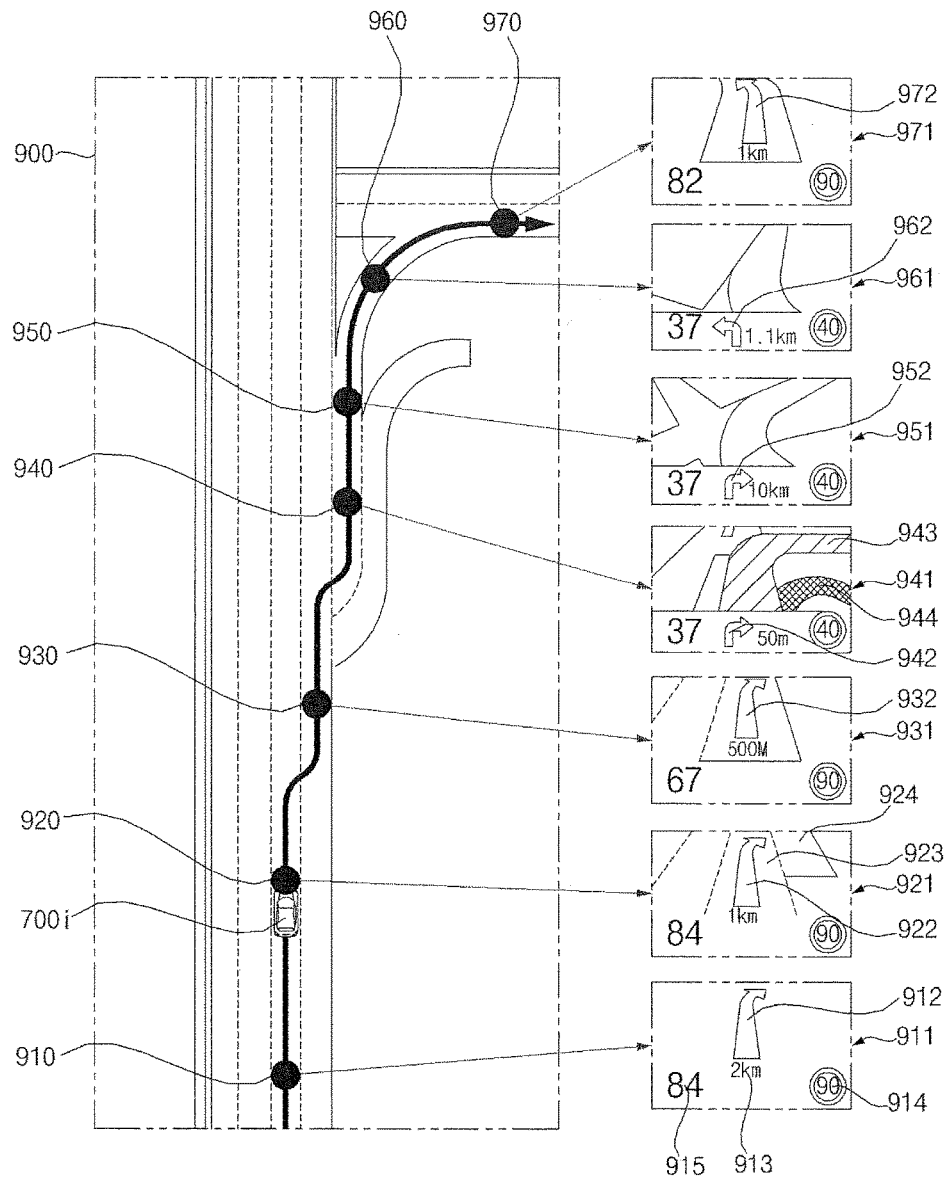
FIG. 9 is a view for explaining operation of matching and displaying a TBT image to/on a point corresponding to a lane in which the corresponding vehicle is being driven according to an embodiment of the present invention.

FIG. 9 is a view for explaining operation of matching a TBT image to a point corresponding to a lane in which the vehicle is being driven and displaying the TBT image thereon according to an embodiment of the present invention.

Referring to FIG. 9, the processor 470 may control the display 441 to display a map 900. While FIG. 9 shows that the map 900 is displayed in the form of a top view, the present invention is not limited thereto and the processor 470 may display the map in various manners.

The display 441 may be implemented to display an image in a region of the windshield. In this case, the processor 470 may control the display 441 to display the map in a region of the windshield.

The processor 470 may control the display 441 to display the current position of the vehicle 700 on the map 900. The processor 470 may display the current position of the vehicle 700 on the basis of GPS information. The processor 470 may display an image 700*i* corresponding to the vehicle 700 at a point 920 on the map 900, which corresponds to the position of the vehicle 700.

Reference numerals 910, 920, 930, 940, 950, 960 and 970 indicate points on the map 900, which correspond to positions of the vehicle. Reference numerals 911, 921, 931, 941, 951, 961 and 971 represent screens which are displayed when the vehicle is located at the points 910, 920, 930, 940, 950, 960 and 970 on the map 900, respectively. The processor 470 may control the display 441 to display each screen in a region of the windshield.

If the vehicle 700 is located at a first position on the corresponding road, the processor 470 can control the display 441 to display the vehicle image 700*i* at the first point 910 corresponding to the first position. Here, the processor 470 may control the display 441 to display the first screen 911 on the windshield.

The processor 470 may display a TBT image 912, a distance 913 to a change point, a speed limit 914 and a vehicle speed 915 on the first screen 911.

If the vehicle 700 is located at a second position on the road, the processor 470 can control the display 441 to display the vehicle image 700*i* at the second point 920 corresponding to the second position. Here, the processor 470 can control the display 441 to display the second screen 921 on the windshield.

The processor 470 may display a TBT image 922 on the second screen 921. The processor 470 may control the display 441 to display the TBT image 922 in a first region 923 corresponding to the lane in which the vehicle is being driven. The processor 470 may control the display 441 to display the first region 923 and a second region 924 in different colors. Here, the first region 923 may be a region corresponding to the lane in which the vehicle 700 is being driven and the second region 924 may be a region corresponding to a lane other than the lane in which the vehicle 700 is being driven. For example, the second region 924 can be a region corresponding to a lane that the vehicle 700 will enter.

The processor 470 may control the display 441 to give perspective to the TBT image 922 displayed thereon. For example, the processor 470 can give perspective to the TBT image 922 by varying the width of the displayed TBT image 922 in the length direction.

For example, when the vehicle 700 is located at a third position on the road, the processor 470 can control the display 441 to display the vehicle image 700*i* at the third point 930 corresponding to the third position. Here, the processor 470 can control the display 441 to display the third screen 931 on the windshield.

For example, when the vehicle 700 is located at a fourth position on the road, the processor 470 can control the display 441 to display the vehicle image 700*i* at the fourth point 940 corresponding to the fourth position. Here, the processor 470 can control the display 441 to display the fourth screen 941 on the windshield.

The processor 470 may control the display 441 to display a TBT image 943 in a region which does not correspond to the lane in which the vehicle is being driven. For example, when the vehicle 700 is located at a fifth position on the road, the processor 470 can control the display 441 to display the vehicle image 700*i* at the fifth point 950 corresponding to the fifth position. Here, the processor 470 may control the display 441 to display the fifth screen 951 on the windshield.

If the vehicle 700 is located at a sixth position on the road, the processor 470 can control the display 441 to display the vehicle image 700i at the sixth point 960 corresponding to the sixth position. Here, the processor 470 may control the display 441 to display the sixth screen 961 on the windshield.

If the vehicle 700 is located at a seventh position on the road, the processor 470 can control the display 441 to display the vehicle image 700i at the seventh point 970 corresponding to the seventh position. Here, the processor 470 may control the display 441 to display the seventh screen 971 on the windshield.

Figure 10A:
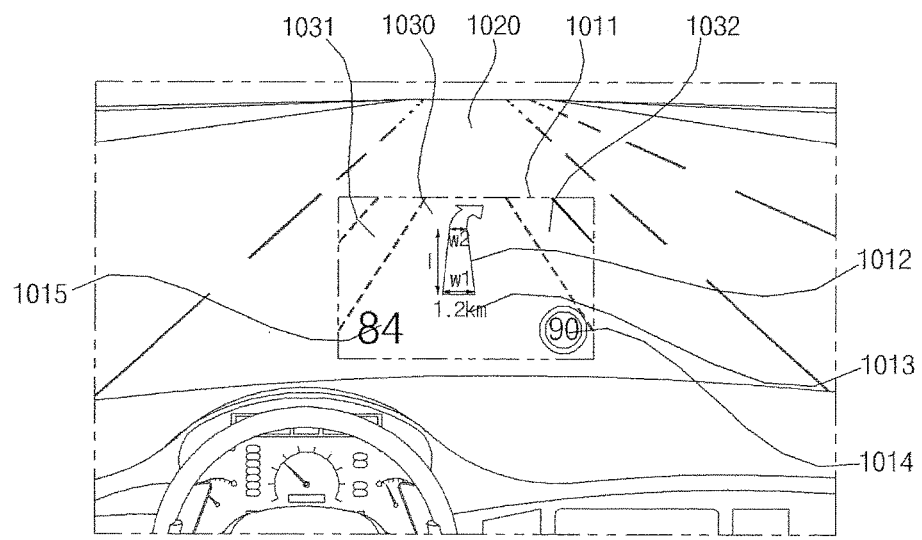
FIGS. 10A and 10B are views for explaining a screen implemented in a region of the windshield according to an embodiment of the present invention.
Figure 10B:
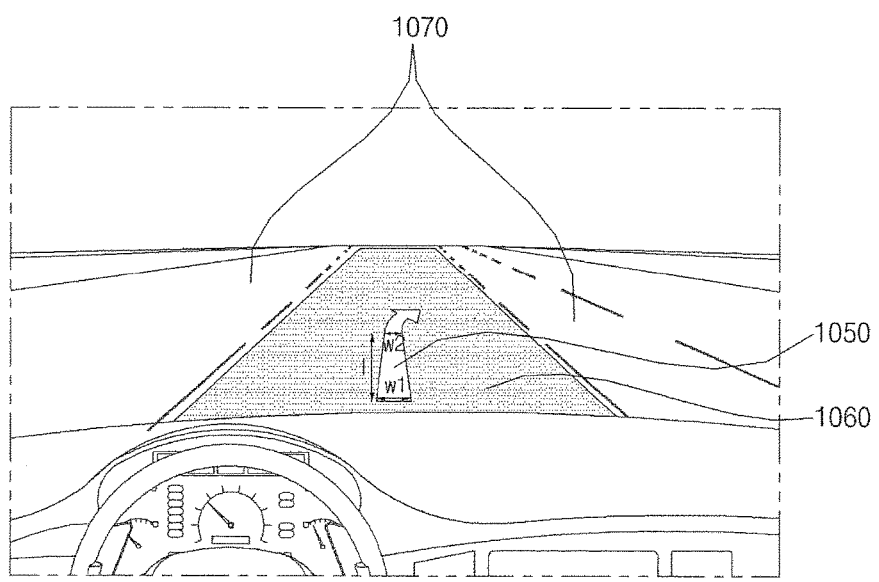

FIGS. 10A and 10B are views for explaining images displayed in a region of the windshield according to embodiments of the present invention.

Referring to FIG. 10A, the processor 470 may receive information on a lane 1020 in which the vehicle is being driven, from the driver assistance apparatus 100 through the interface 480.

The processor 470 may control the display 441 to display a screen 1011 in a region of the windshield. The processor 470 may display the screen 1011 in a first region. Here, the first region may be a region corresponding to the lane 1020 in which the vehicle is being driven. For example, the first region can correspond to a point of the windshield, which meets a line connecting the eyes of the user and the lane 1020 when the user looks at the lane 1020 in which the vehicle is being driven.

The processor 470 may control the display 441 to display the screen 1011 translucently. The display 441 includes a transparent display or a projection module and the processor 470 may control the transparent display or the projection module to display the screen 1011 translucently. According to an embodiment, the processor 470 may control the display 441 to adjust the transparency of the screen 1011. The display 441 includes a transparent display or a projection module and the processor 470 can control the transparent display or the projection module to adjust transparency.

The processor 470 may control the display 441 to display a lane image 1030 corresponding to the lane in which the vehicle is being driven. In this case, the processor 470 may display the lane image 1030 along with images 1031 and 1032 corresponding to lanes other than the lane in which the vehicle is being driven.

The processor 470 may display a TBT image 1012 on the lane image 1030. The processor 470 may control the display 441 to display the TBT image on the screen 1011. The processor 470 may control the display 441 to give perspective to the TBT image 1012 displayed thereon. For example, the processor 470 can give perspective to the TBT image 1012 by displaying the TBT image 1012 in different widths w1 and w2 in the length direction 1. The processor 470 may give perspective to the TBT image 1012 by displaying the TBT image 1012 in such a manner that the width w1 thereof, closer to the user, is greater than the width w2 thereof at a distance from the user.

The processor 470 may control the display 441 to display information 1013 on a distance to a change point on the screen 1011. The processor 470 may control the display 441 to display speed limit information 1014 or vehicle speed information 1015 on the screen 1011.

Referring to FIG. 10B, the processor 470 may receive information on the lane in which the vehicle is being driven from the driver assistance apparatus 100 through the interface 480.

The processor 470 may control the display 441 to display a TBT image 1050 in a first region 1060 of the windshield.

Here, the first region 1060 corresponds to the lane in which the vehicle is being driven. That is, the first region 1060 may be a region of the windshield, which meets a line connecting the eyes of the user and the road when the user looks at the road through the windshield.

The processor 470 may control the display 441 to display the first region 1060 of the windshield, which corresponds to the lane in which the vehicle is being driven, and a second region 1070 of the windshield, which corresponds to a lane other than the lane, in different colors.

As described above with reference to FIG. 10A, the processor 470 can control the display 441 to give perspective to the displayed TBT image 1050.

Figure 11A:
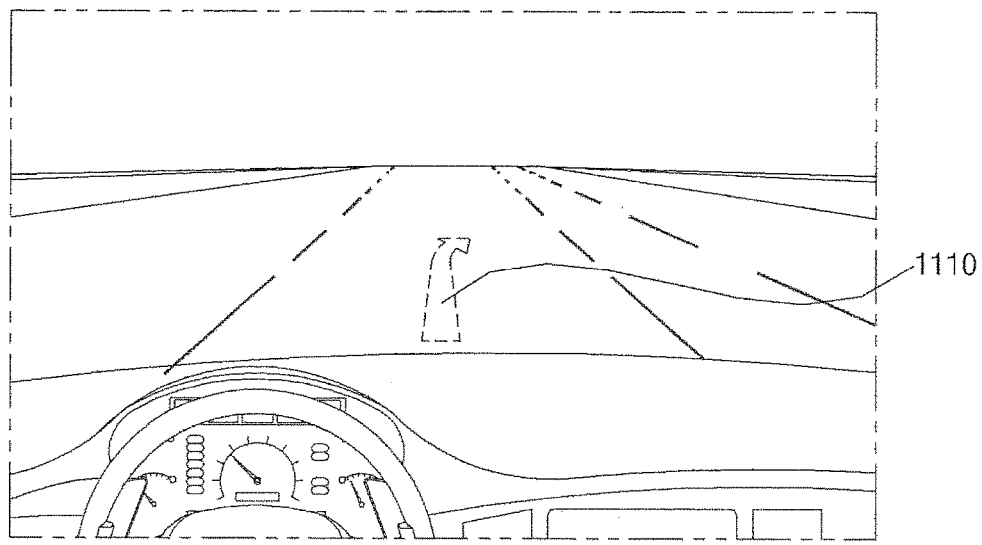
FIGS. 11A and 11B are views for explaining operation of displaying an image corresponding to lane change according to an embodiment of the present invention.
Figure 11B:
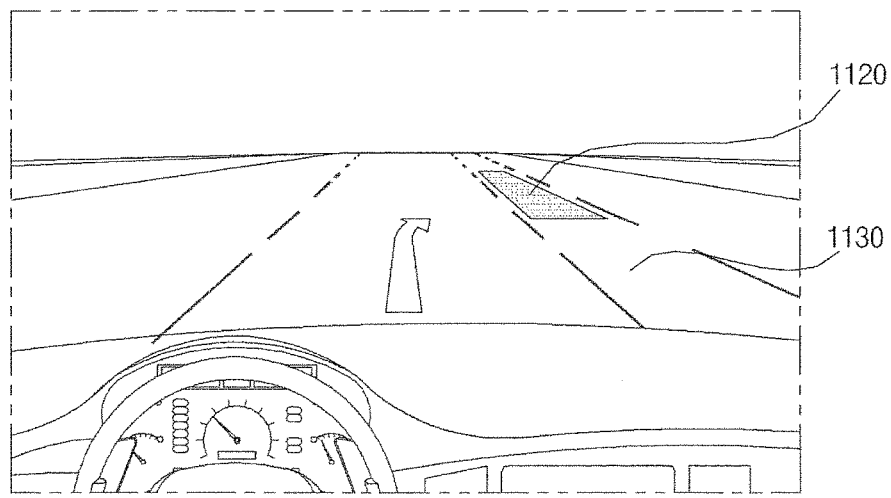

FIGS. 11A and 11B are views for explaining operation of displaying a TBT image corresponding to lane change according to an embodiment of the present invention.

When it is necessary to change the lane in which the vehicle is being driven to a neighboring lane, the processor 470 may control the display 441 to display a TBT image corresponding to lane change.

Referring to FIG. 11A, the processor 470 may control the display 441 to display a TBT image corresponding to lane change. Here, lane change may be performed on the route as necessary when the vehicle needs to enter, exit or change roads.

The TBT image corresponding to lane change may be displayed differently from a TBT image corresponding to direction change. The TBT image corresponding to lane change may be displayed in a shape, color, transparency or line shape different from the TBT image corresponding to direction change. As shown in FIG. 11A, the TBT image corresponding to lane change may be displayed using a dotted line.

Referring to FIG. 11B, when a lane change point 1130 is determined, the processor 470 may control the display 441 to display an indicator 1120 that indicates the lane change point 1130. Here, the lane change point 1130 can be determined on the basis of the vehicles that are being driven on neighboring lanes and a distance to a change point. The vehicles that are being driven on the neighboring lanes may be detected by the driver assistance apparatus 100. The distance to the change point may be checked on the basis of the map and GPS information.

The processor 470 may display the indicator 1120 in a color different from other regions, from the lane change point on the lane 1130 to be changed from the current lane.

Figure 12:
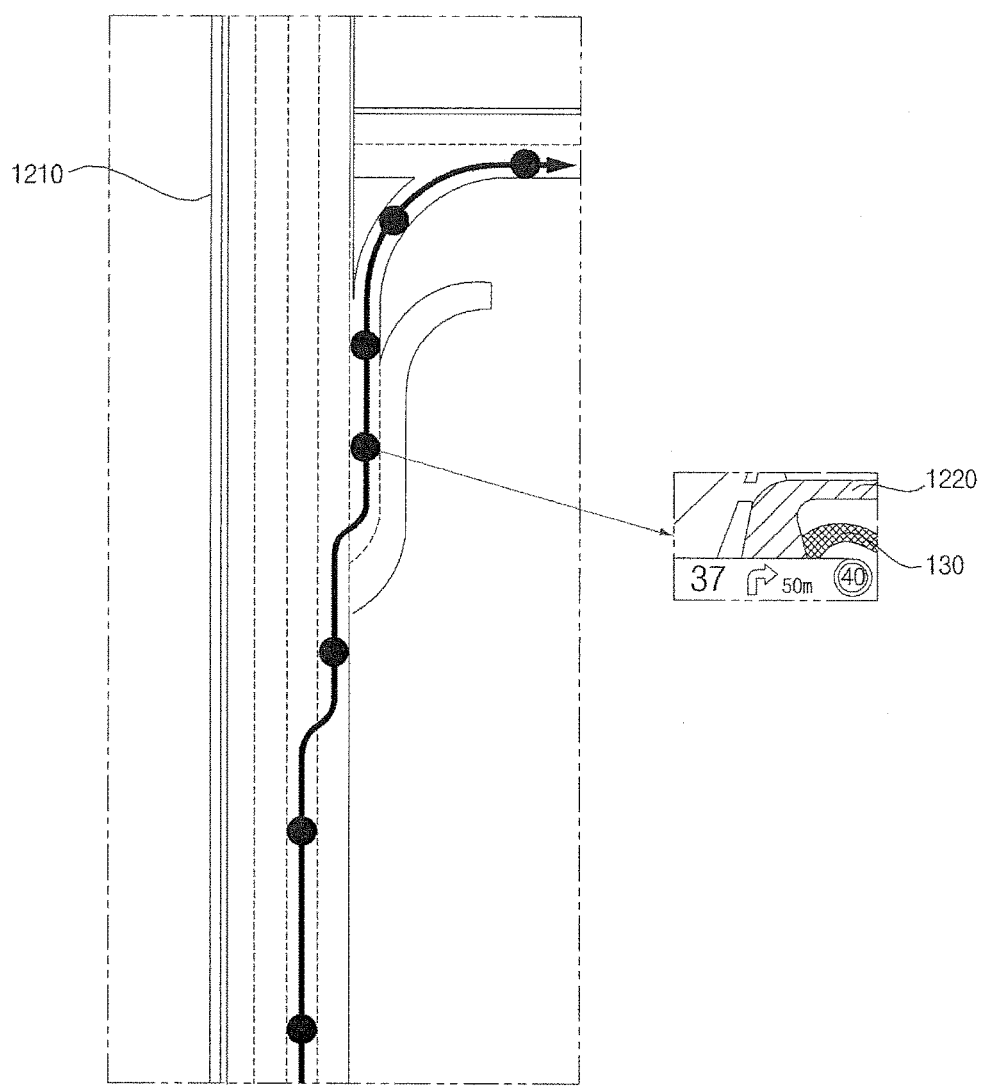
FIG. 12 is a view for explaining operation of displaying an area corresponding to a plurality of forks according to an embodiment of the present invention.

FIG. 12 is a view for explaining operation of displaying regions corresponding to a plurality of forks according to an embodiment of the present invention.

Referring to FIG. 12, when the lane in which the vehicle is being driven meets a plurality of forks, the processor 470 may control the display 441 to display a first region 1220 of the windshield, which corresponds to a first fork, and a second region 1230 of the windshield, which corresponds to a second fork, in different colors. Here, the first fork may be a road matched to the route on the map, from among the plurality of forks, and the second fork may be a road other than the first fork from among the plurality of forks.

FIGS. 13A to 13l are views for explaining operation of displaying an image corresponding to information according to an embodiment of the present invention.

The processor 470 may control the display 441 to display an image corresponding to information. The processor 470 may receive information through the communication unit 410 or the input unit 420. Furthermore, the processor 470 may receive information from the driver assistance apparatus 100, the sensing unit 760 or the controller 770 through the interface 480.

Figure 13A:
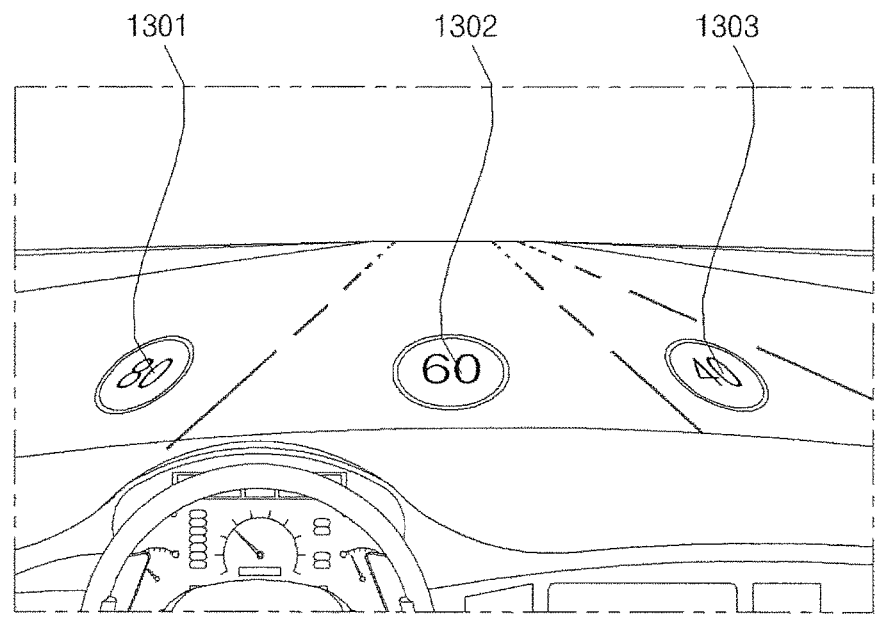
FIGS. 13A to 13L are views for explaining operation of displaying an image corresponding to information according to embodiments of the present invention.

As shown in FIG. 13A, the processor 470 may control the display 441 to display images 1301, 1302 and 1303 corresponding to speed limits of a road.

The driver assistance apparatus 100 may detect information on speed limits of roads by recognizing road signs. The processor 470 may receive the information on speed limits from the driver assistance apparatus 100 through the interface 480.

When a road has a plurality of lanes, the respective lanes may have different speed limits. For example, speed limits of first, second and third lanes may be 80 km, 60 km and 40 km, respectively. In this case, the processor 470 may display the images 1301, 1302 and 1303 respectively corresponding to the speed limits of the lanes in regions of the windshield, which respectively correspond to the lanes. Here, the processor 470 may control the display 441 to display the images 1301, 1302 and 1303 on the same plane as that formed by the surface of the road. Accordingly, the user can intuitively recognize the speed limits of the respective lanes.

Figure 13B:
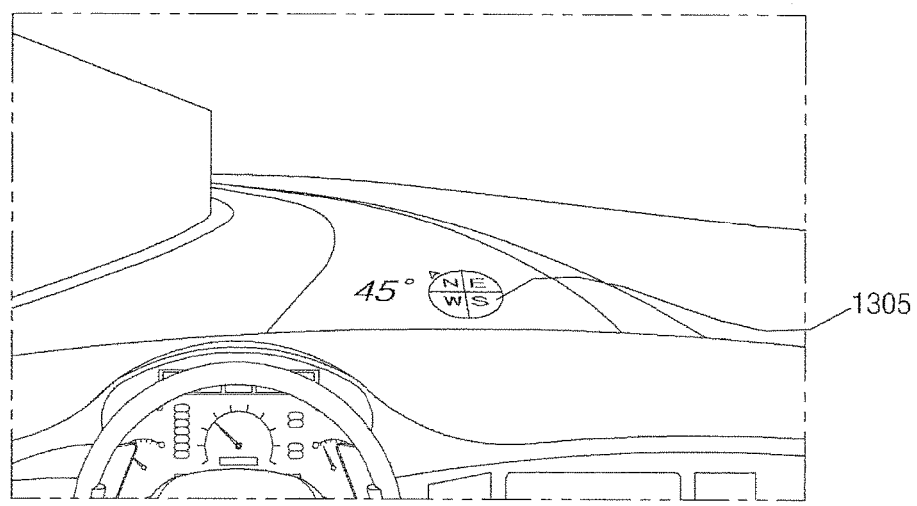

Referring to FIG. 13B, the processor 470 may control the display 441 to display an image 1305 corresponding to a heading of the vehicle 700. Here, the image 1305 may be a compass image.

The processor 470 may receive information on the heading of the vehicle from the sensing unit 760 through the interface 480. Here, the information on the direction of the vehicle may be information sensed by a heading sensor.

The processor 470 may display north, south, east or west to which the vehicle is driven.

When the direction of the vehicle is changed, the processor 470 may naturally change the image 1305 in the changed direction by applying animation effects to the image 1305.

Figure 13C:
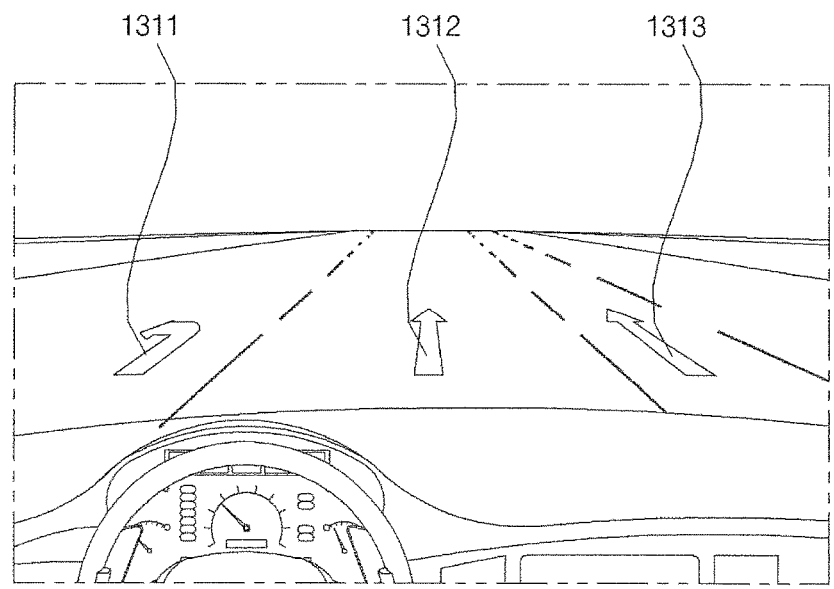

Referring to FIG. 13C, the processor 470 may control the display 441 to display images 1311, 1312 and 1313 corresponding to lane information. The processor 470 may receive the lane information from the driver assistance apparatus 100 through the interface 480.

The driver assistance apparatus 100 may detect the lane information on the basis of images of road sings or an image of the surface of the corresponding road. Here, the lane information may be information indicating a normal lane, a left-turn lane, a right-turn lane and a U-turn lane at a change point.

The processor 470 may display one of a normal image, a left-turn image, a right-turn image and a U-turn image respectively corresponding to the lane information. In this case, the processor 470 may display each image in a region of the windshield, which corresponds to each lane.

Figure 13D:
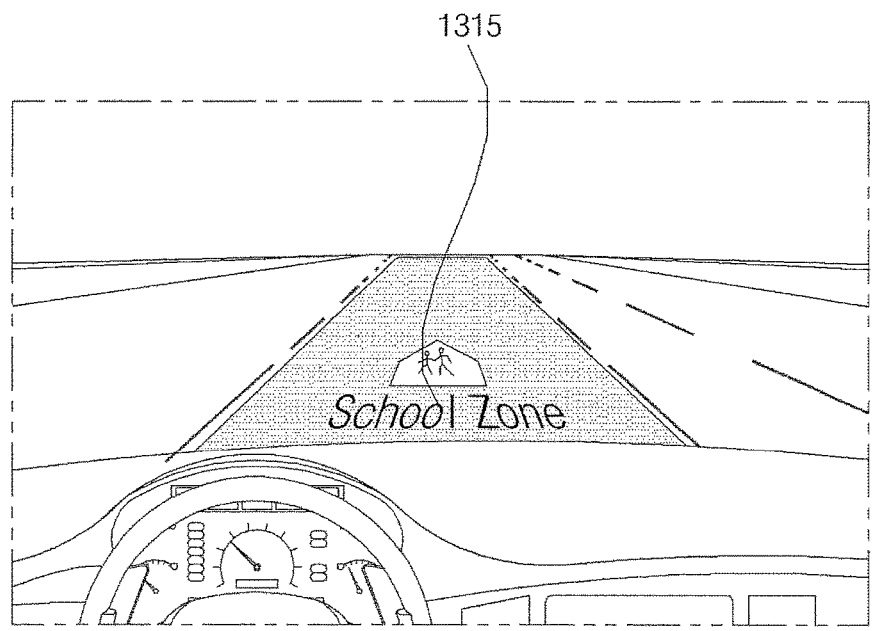

Referring to FIG. 13D, the processor 470 may control the display 441 to display an image 1315 corresponding to lane information. The processor 470 may receive the lane information from the driver assistance apparatus 100 through the interface 480.

The driver assistance apparatus 100 may detect the lane information on the basis of images of road signs or an image of the surface of the corresponding road. Here, the lane information may be information on a school zone lane or a high occupancy vehicle lane.

The processor 470 may control the display 441 to display the image 1315 corresponding to the information on the school zone lane or high occupancy vehicle lane in a region of the windshield, which corresponds to the school zone lane or high occupancy vehicle lane.

Figure 13E:
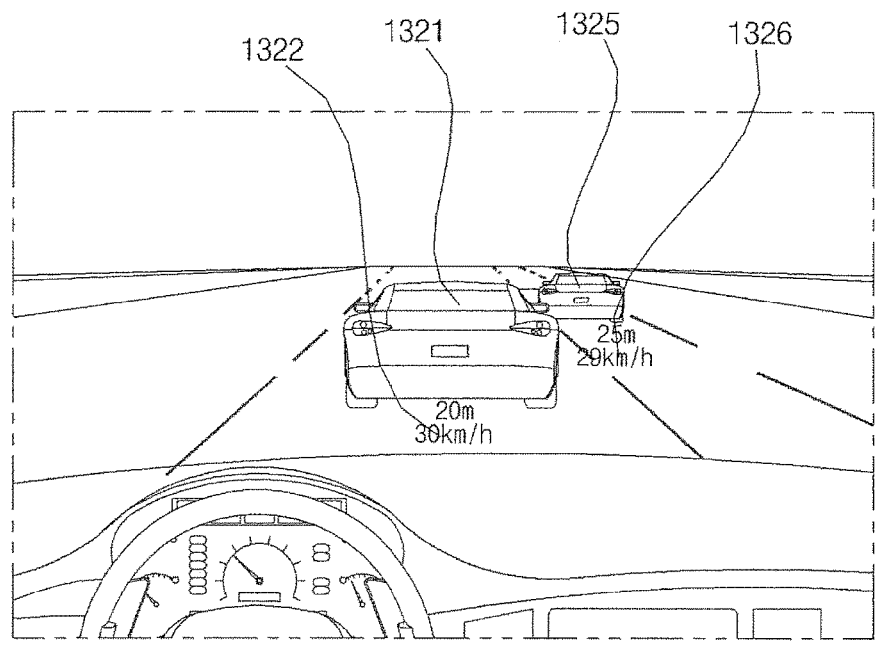

Referring to FIG. 13E, the processor 470 may control the display 441 to display an image 1322 corresponding to distances to objects 1321 and 1325 or speed information. The processor 470 may receive object information from the driver assistance apparatus 100 through the interface 480.

The driver assistance apparatus 100 may detect an object and generate object information. Here, the object information may include presence or absence of the object, a distance to the object and the speed of the object. In addition, the driver assistance apparatus 100 may calculate the distance to the object and the speed of the object on the basis of disparity calculation of stereo cameras or a variation in object size with time, acquired through a mono camera.

The processor 470 may control the display 441 to display the object information. The processor 470 may control the display 441 to display the object information differently depending on the distance to the object.

For example, the processor 470 can control the display 441 to display the image 1322 corresponding to the object information in different transparencies, colors and sizes in response to the distance to the object.

Figure 13F:
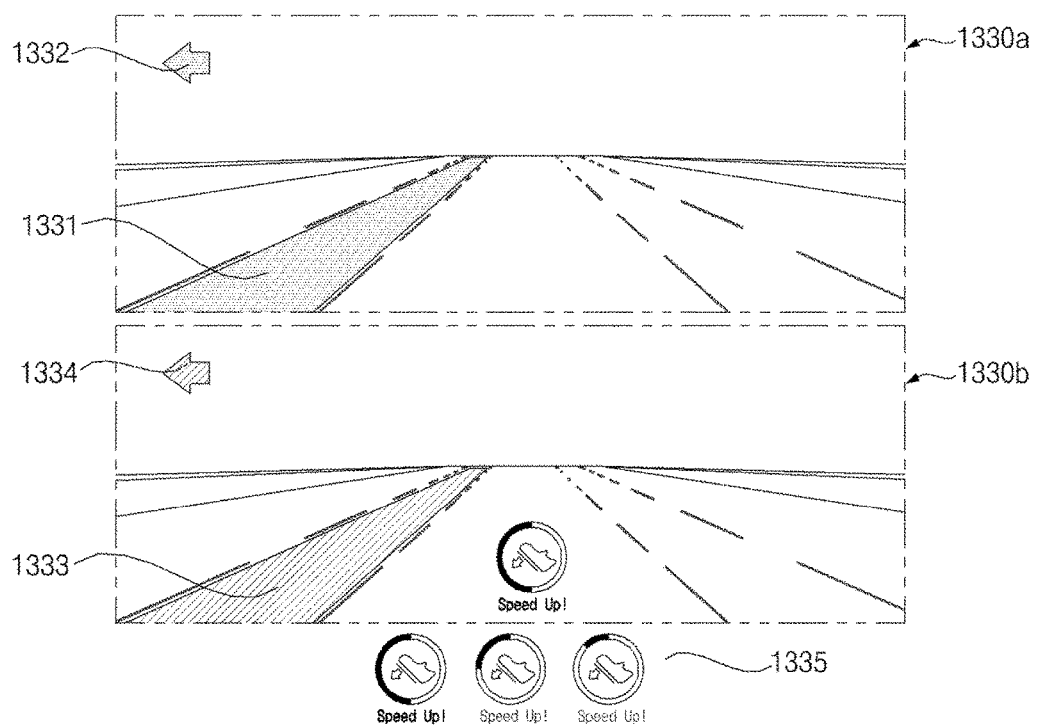
Figure 13G:
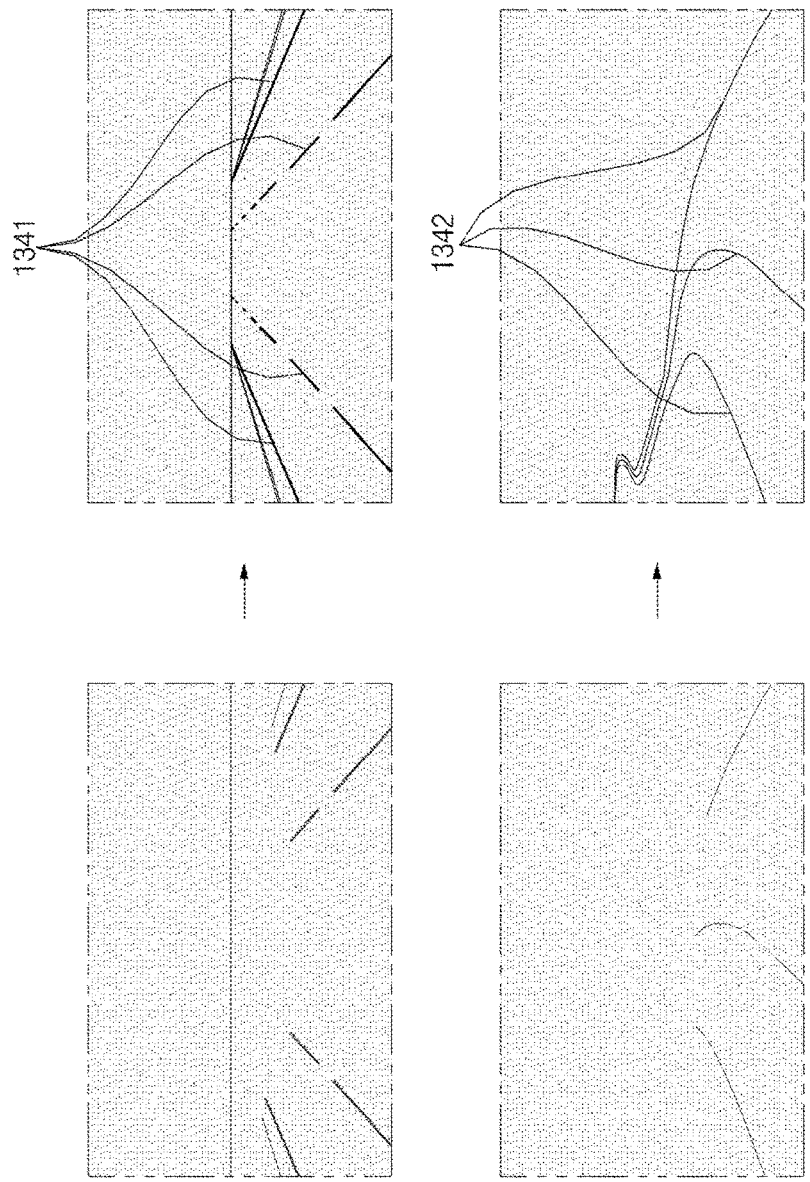

Referring to FIG. 13F, the processor 470 may control the display 441 to display an image corresponding to lane change information.

When the user inputs turn signal information for lane change during driving, the processor 470 may receive the turn signal information from the controller 770 through the interface 480. The processor 470 may recognize user's intention of changing lanes through the turn signal information.

The processor 470 may receive object information regarding a lane to be changed to from the driver assistance apparatus 100 through the interface 480.

The driver assistance apparatus 100 may detect an object from the lane to be changed to on the basis of an around view image. The processor 470 may control the display 441 to display an image corresponding to lane change information.

When an object is not detected from the lane to be changed to within a predetermined distance while a turn signal has been input, as indicated by reference numeral 1330a, the processor 470 may control the display 441 to display a region 1331 of the windshield, which corresponds to the lane to be changed to, in a first color. Here, the first color may be a color by which the user can intuitively recognize that the lane can be changed. For example, the first color is green.

When an object is not detected from the lane to be changed to within a predetermined distance while a turn signal has been input, the processor 470 may control the display 441 to display an arrow image 1332 in the first color. Here, the first color may be a color by which the user can intuitively recognize that the lane can be changed. For example, the first color is green.

When a turn signal is input, as indicated by reference numeral 1330b, and an object is detected from the lane to be changed to within a predetermined distance, the processor 470 may control the display 441 to display a region 1333 of the windshield, which corresponds to the lane to be changed to, in a second color. Here, the second color may be a color by which the user can intuitively recognize that there is concern of traffic accident when the lane is changed. For example, the first color can be red.

When a turn signal is input and an object is detected from the lane to be changed to within a predetermined distance, the processor 470 may control the display 441 to display an arrow image 1334 in the second color. Here, the second color may be a color by which the user can intuitively recognize that there is concern of traffic accident when the lane is changed. For example, the first color can be red.

When an object is detected in the lane to be changed to within a predetermined distance, the processor 470 may control the display 441 to display an icon 1335 indicating that acceleration is required. Here, the icon may be an accelerator pedal image. The processor 470 may display a rim around the accelerator pedal image and change the color of the rim according to acquired acceleration degree.

Referring to FIG. r13G, the processor 470 may control the display 441 to display images 1341 and 1342 corresponding to lane information. The processor 470 may receive the lane information from the driver assistance apparatus 100 through the interface 480.

The driver assistance apparatus 100 may detect a lane. At night, particularly, the driver assistance apparatus 100 can detect a lane even in a dark environment by adjusting exposure of the camera and generate lane information.

The processor 470 may control the display 441 to display images 1341 and 1342 in a region corresponding to the lanes.

The processor 470 may recognize whether the front road is an uphill road or a downhill road through map data stored in the memory 430. In this case, the processor 470 may display the image 1342 in three dimensions by indicating an uphill or downhill road.

Figure 13H:
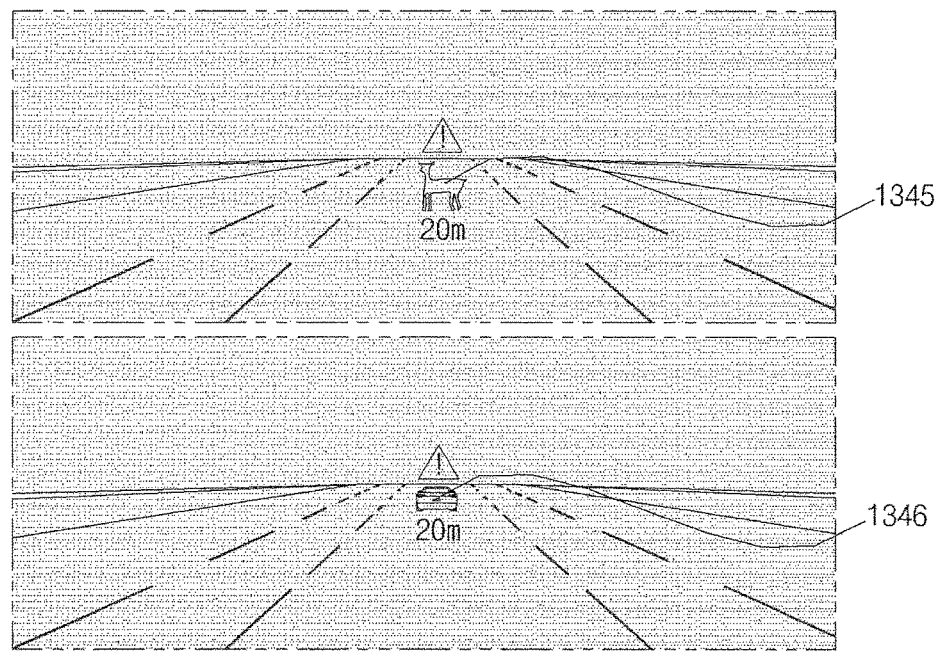

Referring to FIG. 13H, the processor 470 may control the display 441 to display images 1345 and 1346 corresponding to object information.

The vehicle 700 may further include a night vision device (not shown). The night vision device (not shown) can sense an object using a thermal imaging camera. Here, the object may be a person or animal that radiates heat.

The processor 470 may receive object information from the night vision device (not shown) through the interface 480. The processor 470 may display the image 1345 corresponding to the received object information in a region of the windshield, which corresponds to a region in which the object is located, during night driving.

The vehicle 700 may further include a radar system (not shown) or a lidar system (not shown). The radar system (not shown) can sense an object using radio waves. The lidar system (not shown) can sense an object using infrared lasers.

The processor 470 may receive object information from the radar system (not shown) or the lidar system (not shown) through the interface 480. The processor 470 may display the image 1346 corresponding to the received object information in a region of the windshield, which corresponds to a region in which the corresponding object is located, during driving in bad weather.

Figure 13I:
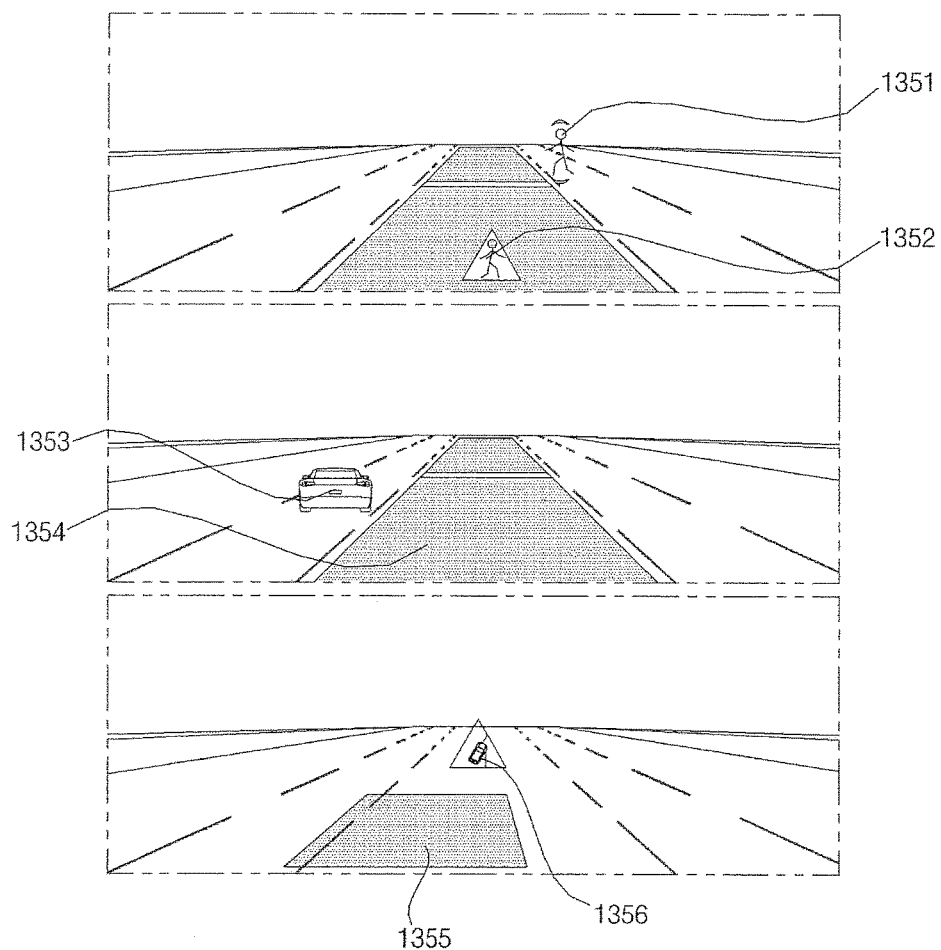

Referring to FIG. 13I, the processor 470 may control the display 441 to display an image corresponding to object information. The processor 470 may receive the object information from the driver assistance apparatus 100 through the interface 480.

The driver assistance apparatus 100 may detect an object on the basis of a front view image or an around view image of the vehicle. Here, the object may be a pedestrian, another vehicle or a lane.

Upon reception of information on detection of a pedestrian, the processor 470 may display a pedestrian caution image 1352 corresponding to the received information in a region of the windshield.

Upon reception of information on lane change of a neighboring vehicle 1353 to the lane in which the vehicle 700 is being driven, the processor 470 may display a collision caution image 1354 corresponding to the received information in a region of the windshield.

Upon reception of information on lane departure of the vehicle 700, the processor 470 may display a lane departure caution image 1355 corresponding to the received information in a region of the windshield.

Figure 13J:
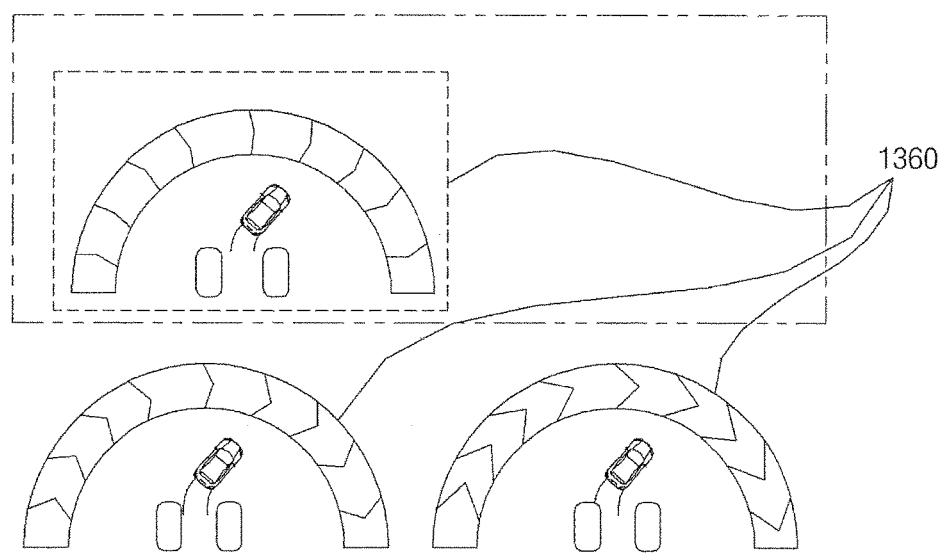

Referring to FIG. 13J, the processor 470 may control the display 441 to display an image 1360 corresponding to information on steering wheel rotation during parking. The processor 470 may receive the information on steering wheel rotation from the sensing unit 760 through the interface 480.

The processor 470 may receive information on neighboring objects from the driver assistance apparatus 100 through the interface 480.

The processor 470 may display the image 1360 corresponding to the position of the vehicle 700 during parking and the information on steering wheel rotation, on the basis of the information on neighboring objects and the information on steering wheel rotation. Specifically, the processor 470 can display the steering wheel image 1360 in different colors according to possibility that the vehicle 700 collides with a neighboring vehicle depending on a degree of steering wheel rotation.

For example, when collision with a neighboring vehicle is anticipated according to steering wheel rotation degree, the processor 470 can display the steering wheel image 1360 in a first color. If collision with a neighboring vehicle is not anticipated according to steering wheel rotation degree, the processor 470 can display the steering wheel image 1360 in a second color.

When the possibility that the vehicle 700 collides with a neighboring vehicle is expected to be within a predetermined range according to steering wheel rotation degree, the processor 470 may display the steering wheel image 1360 in a third color.

Figure 13K:
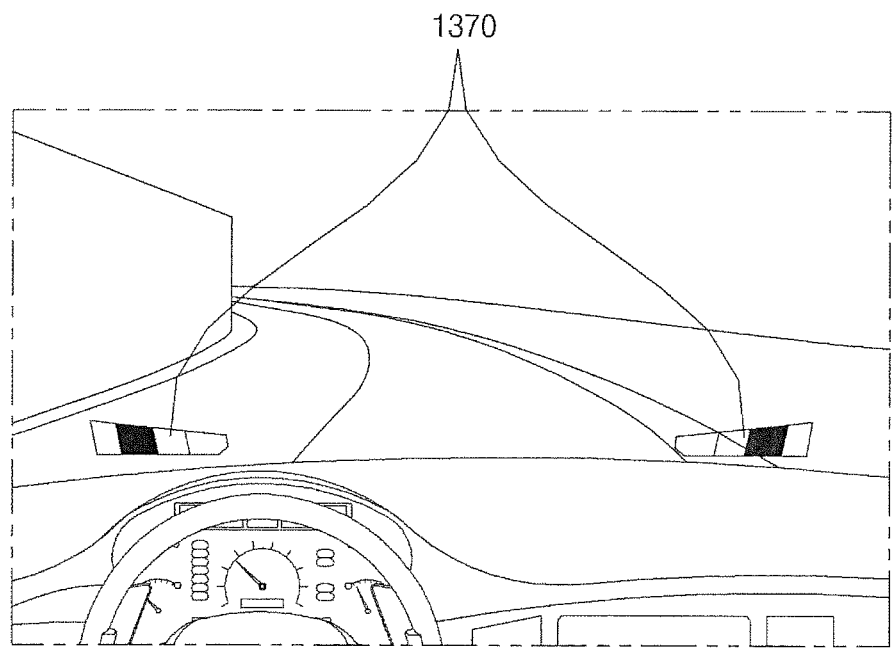
Figure 13L:
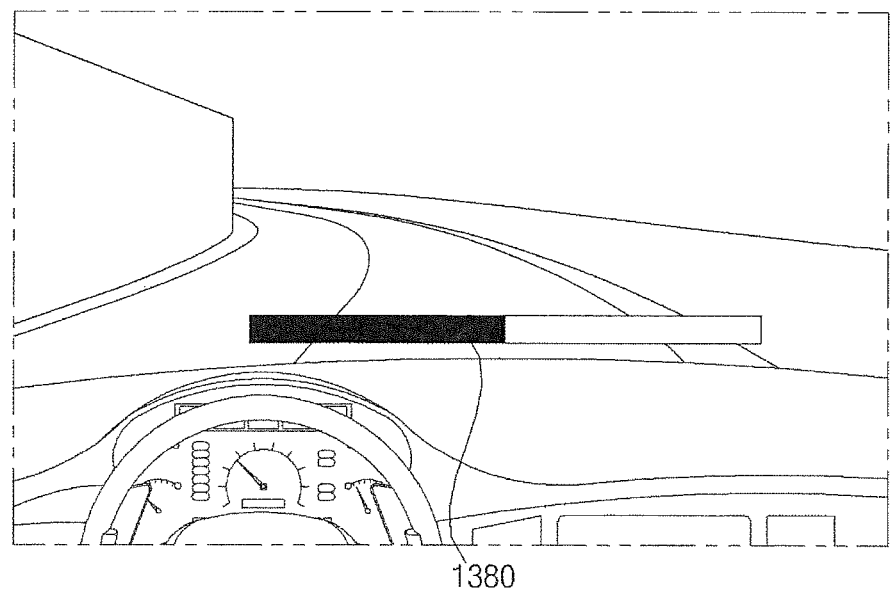

Referring to FIG. 13K, the processor 470 may control the display 441 to display an image 1370 corresponding to information on operation of the headlamp. The processor 470 may receive the information on operation of the headlamp from the controller 770 through the interface 480. When the headlamp is composed of a plurality of lamp modules, the information on operation of the headlamp may be on/off information of each lamp module according to the location of a vehicle on the opposite lane or a preceding vehicle.

The processor 470 may display the image 1370 corresponding to information on a turn-on lamp module and a turn-off lamp module from among the plurality of lamp modules in a region of the windshield.

Referring to FIG. 13I, the processor may control the display 441 to display an image 1380 corresponding to information on a distance to a destination. The processor 470 may display a bar in a first color, which corresponds to a route from a departure point to a destination, and control the bar to be changed to a second color as the vehicle 700 approaches the destination. In this case, a region of the bar, displayed in the first color, can correspond to a remaining distance and a region of the bar, displayed in the second color, can correspond to a distance traveled.

Figure 14A:
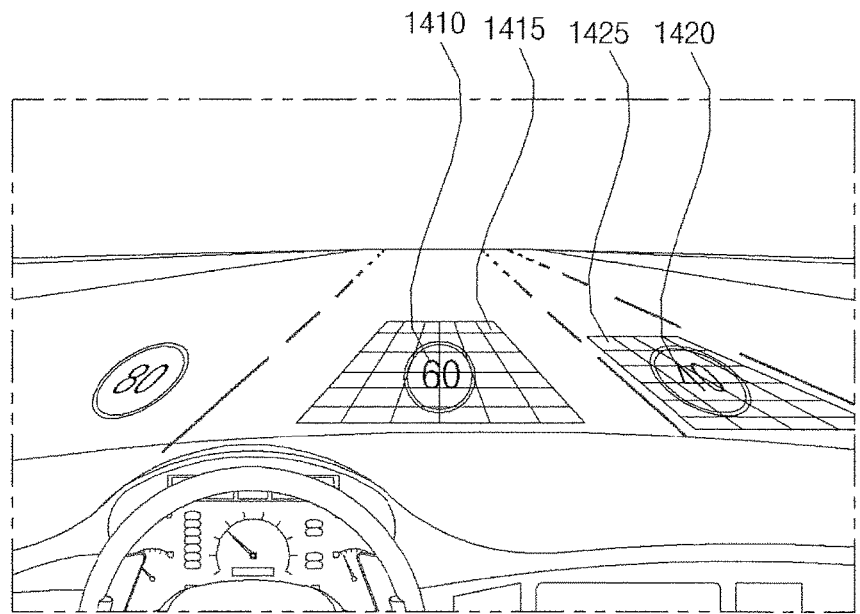
FIGS. 14A and 14B are views for explaining operation of displaying information according to an embodiment of the present invention.
Figure 14B:
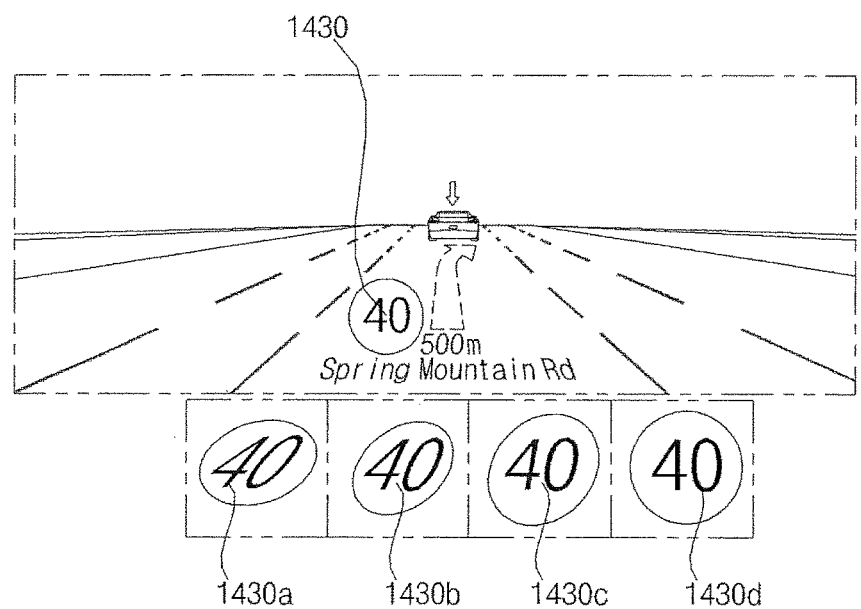

FIGS. 14A and 14B are views for explaining information display operation according to an embodiment of the present invention.

Referring to FIG. 14A, the processor 470 may control the display 441 to display a first image 1410 in a first region of the windshield, which corresponds to the lane in which the vehicle is being driven. The processor 470 may control the display 441 to display second images 1420 and 1430 in a second region of the windshield, which corresponds to lanes other than the lane in which the vehicle is being driven. The processor 470 may display the first image and the second image in different shapes or different colors.

For example, the processor 470 can control the display 441 to display the first image 1410 at a predetermined angle to the plane 1415 including the lane in which the vehicle is being driven. In this case, the processor 470 can control the display 441 to display the second image 1420 on the same plane 1425 as that including a lane other than the lane in which the vehicle is being driven.

When an image displayed corresponding to the lane in which the vehicle is being driven and an image displayed corresponding to a lane other than the lane in which the vehicle is being driven are displayed differently, the user can clearly recognize the image displayed corresponding to the lane in which the vehicle is being driven.

The first image may correspond to first information and the second image may correspond to second information different from the first information. That is, the processor 470 can display different pieces of information in the first region and the second region. For example, the processor 470 can display speed limit information in the first region and display information on a high occupancy vehicle lane operation time in the second region.

Referring to FIG. 14B, the processor 470 may control the display 441 to display a first image 1430 in the first region of the windshield, which corresponds to the lane in which the vehicle is being driven. The processor 470 may control the display 441 to display the first image 1430 at a predetermined angle to the plane 1415 including the lane in which the vehicle is being driven.

The processor 470 may change and display the predetermined angle by applying animation effects thereto. The processor 470 can change the predetermined angle over time. For example, the processor 470 can gradually increase the predetermined angle over time.

The processor 470 may change the predetermined angle depending on a distance between the vehicle and a predetermined point. For example, when the vehicle 700 is being driven on a road along which speed cameras are set, the processor 470 can gradually increase the predetermined angle as the vehicle 700 approaches a speed camera.

When the predetermined angle between the first image 1410 and the plane 1415 is changed, concentration of the user on the first image 1410 is increased and thus important information can be successfully transmitted to the user.

In addition, the processor 470 may control the display 441 to display the first image or the second image at a predetermined angle to the plane including the lane in which the vehicle is being driven or the plane including a lane other than the lane, according to importance.

The importance may be predetermined. For example, when the vehicle 700 is driven on an expressway, importance of speed limit information can be set to a highest level. When the vehicle 700 is driven on a city street, importance of school zone information can be set to a highest level.

Figure 15A:
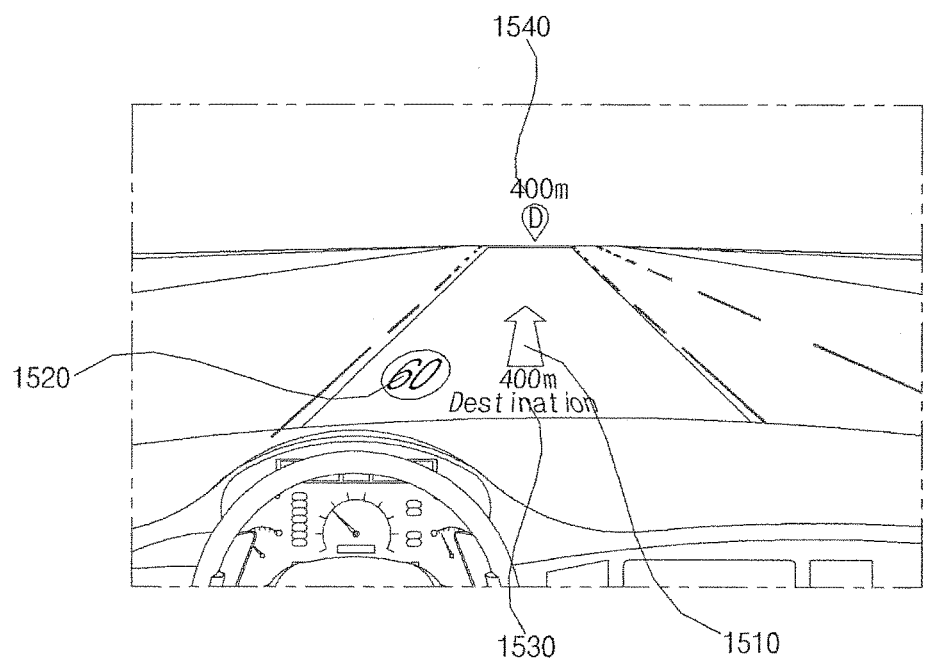
FIGS. 15A to 15C are views for explaining operation of displaying an image when a destination is preset according to an embodiment of the present invention.
Figure 15B:
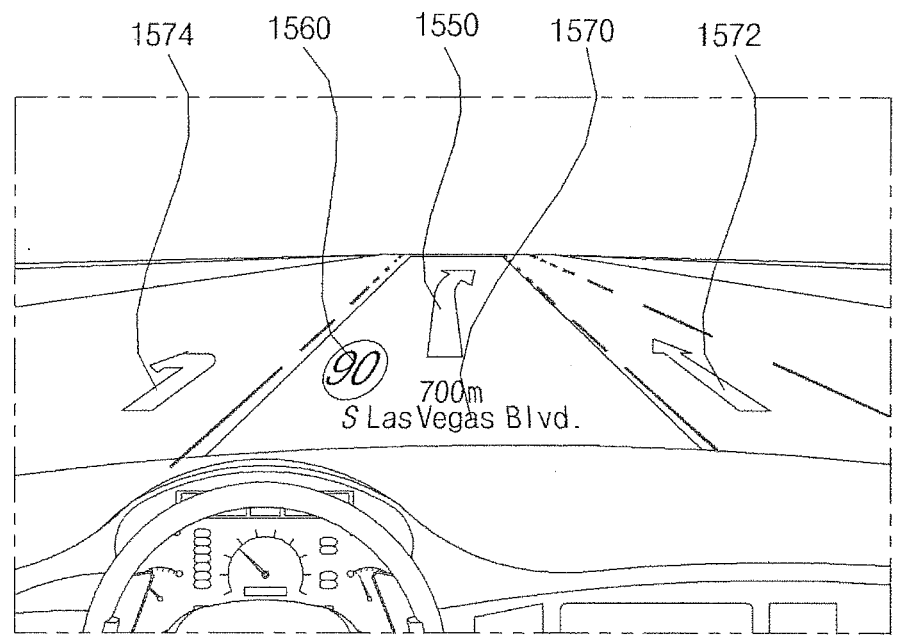
Figure 15C:
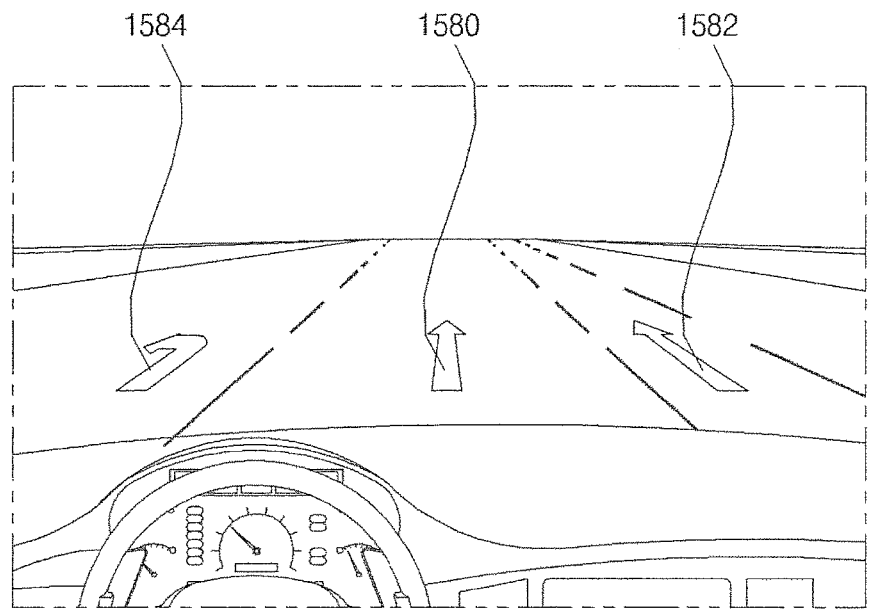

FIGS. 15A to 15C are views for explaining image display operation when a destination is preset according to an embodiment of the present invention.

FIGS. 15A and 15B show a case in which a destination is set and FIG. 15C shows a case in which a destination is not set.

A destination can be set according to user input while the navigation function is being executed. When the destination is set, the processor 470 may control the display 441 to respectively display a first image and a second image in a first region and a second region of the windshield in different shapes or different colors. Here, the first region may be a region of the windshield, which corresponds to the lane in which the vehicle is being driven, and the second region may be a region of the windshield, which corresponds to a lane other than the lane in which the vehicle is being driven.

Referring to FIG. 15A, the processor 470 may control the display 441 to display a TBT image 1520, an image 1520 corresponding to speed limit information and an image 1530 corresponding to destination information in the first region. In this case, the processor 470 may not display an image in the second region.

In this manner, an image corresponding to information is displayed only in the first region corresponding to the lane in which the vehicle is being driven so as to prevent the concentration of the user from being dispersed, thereby promoting safe driving.

The processor 470 may control the display 441 to display an image 1540 corresponding to the destination at a region of the windshield, which corresponds to the destination.

Referring to FIG. 15B, the processor 470 may control the display 441 to display a TBT image 1550, an image 1560 corresponding to speed limit information and an image 1570 corresponding to destination information in the first region. Here, the processor 470 may control the display 441 to display images 1572 and 1574 corresponding to lane information in the second region.

The processor 470 may control the display 441 to respectively display images corresponding to different pieces of information in the first region and the second region.

When a destination is not set, the processor 470 may display images corresponding to the same information in the same form in the first region and the second region, as shown in FIG. 15C.

Figure 16:
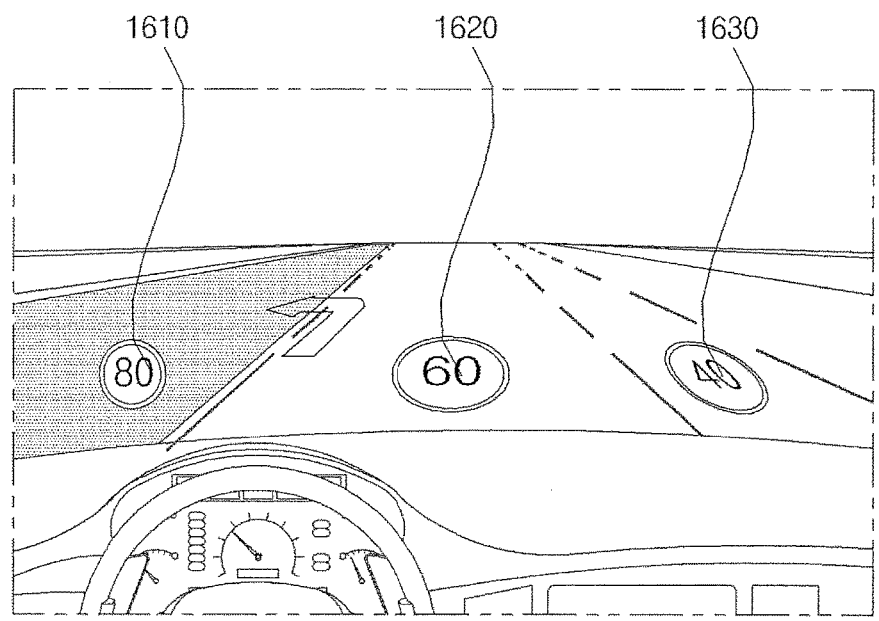
FIG. 16 is a view for explaining operation of displaying an image in a region of the windshield, which corresponds to a lane to be changed to according to an embodiment of the present invention.

FIG. 16 is a view for explaining operation of displaying an image in a region of the windshield, which corresponds to a lane to be changed to, according to an embodiment of the present invention.

Referring to FIG. 16, the processor 470 may control the display 441 to display images 1610, 1620 and 1630 corresponding to information.

The processor 470 may respectively display a first image and a second image in a first region and a second region of the windshield in different shapes or different colors. Here, the first region may be a region of the windshield, which corresponds to a lane to be changed to. For example, the first region may be a region of the windshield, which meets a line connecting the eyes of the user and the lane to be changed to. The second region may be a region of the windshield, which corresponds to a lane other than the lane to be changed to. For example, the second region may be a region of the windshield, which meets a line connecting the eyes of the user and a lane other than the lane to be changed to.

For example, the processor 470 can control the display 441 to display the first image 1610 at a predetermined angle to the plane corresponding to the lane in which the vehicle is being driven. In this case, the processor 470 can control the display 441 to display the second image 1620 on the same plane as that corresponding to a lane other than the lane in which the vehicle is being driven.

Figure 17A:
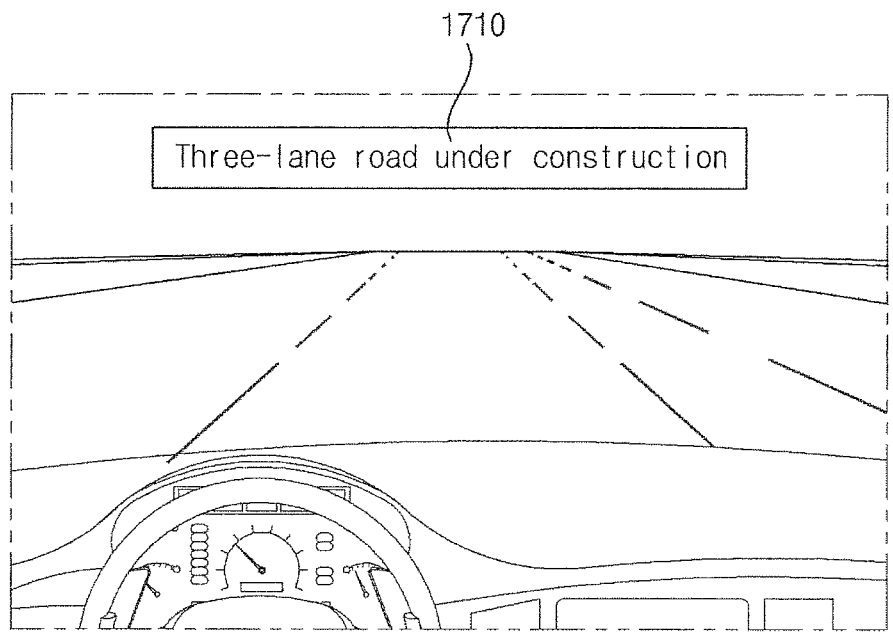
FIGS. 17A to 17C are views for explaining operation of changing a route on the basis of traffic information received from the driver assistance apparatus according to an embodiment of the present invention.
Figure 17B:
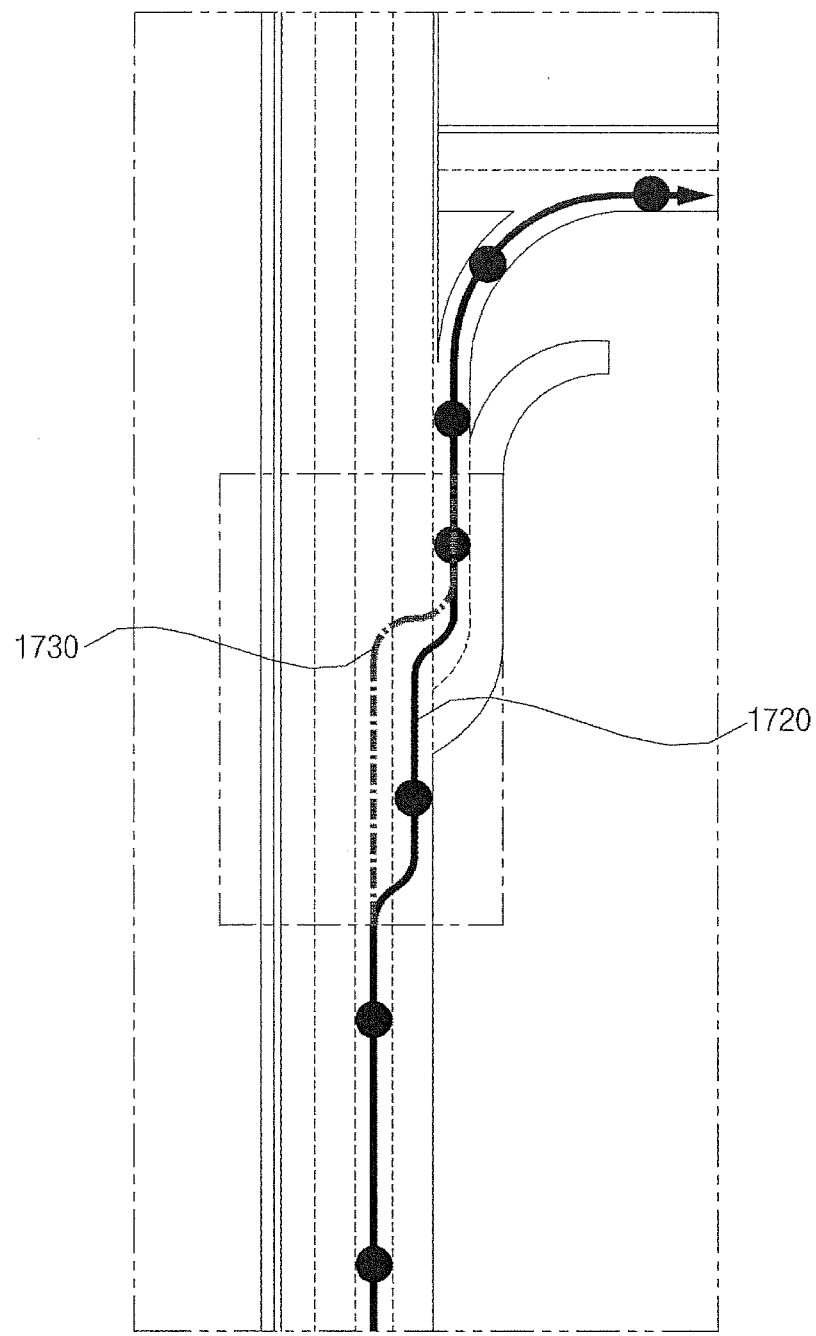
Figure 17C:
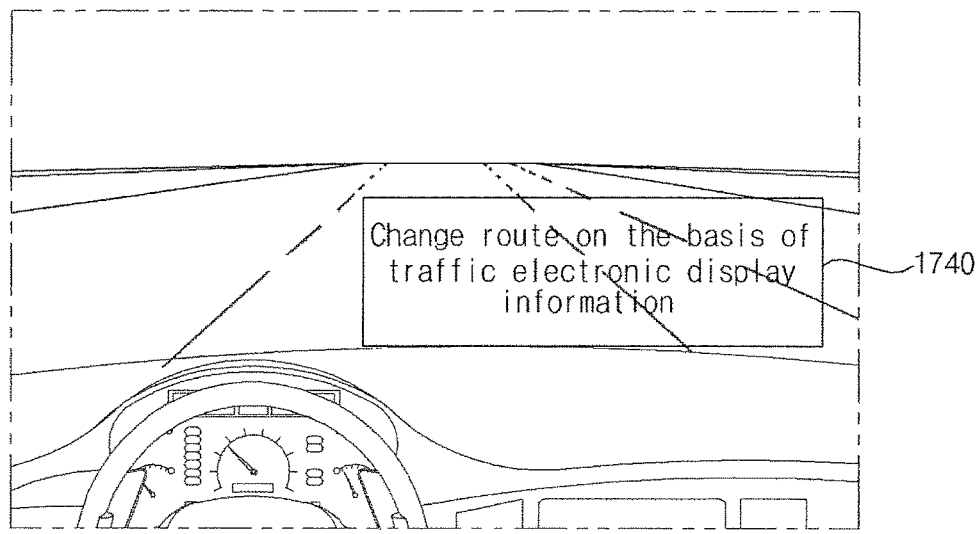

FIGS. 17A to 17C are views for explaining operation of changing a route on the basis of traffic information received from the driver assistance apparatus according to an embodiment of the present invention.

Referring to FIG. 17A, the driver assistance apparatus 100 may acquire a front view image or an around view image of the vehicle. The front view image or around view image of the vehicle may include an image of a traffic light, a road sign, a traffic electronic signboard or a road surface.

The vehicle deriving assistance device 100 may detect traffic information from the image of a traffic light, a road sign, a traffic electronic signboard or a road surface. Here, the traffic information may include traffic accident information, construction information, road congestion information and extra lane information.

The processor 470 may receive the traffic information from the driver assistance apparatus 100 through the interface 480.

FIG. 17A shows that a traffic electronic signboard 1710 displays construction information. In this case, the driver assistance apparatus 100 detects the construction information from the traffic electronic signboard image and the processor 470 receives the construction information.

Referring to FIG. 17B, the processor 470 may change the current route on the basis of the received traffic information. For example, the processor 470 can change the current route to a route that takes a minimum time on the basis of traffic accident information, construction information, road congestion information or extra lane information.

In FIG. 17B, when construction is underway on the current route 1720, the processor 470 changes the current route 1720 to a route 1730 on which construction is not underway.

In addition, the processor 470 may control the display 441 to match a TBT image to a point corresponding to the lane in which the vehicle is being driven and to display the TBT image on the changed route.

When the route is changed on the basis of traffic information received from the driver assistance apparatus 100, the processor 470 may control the display 441 to display a route change event 1740, as shown in FIG. 17C.

Figure 18A:
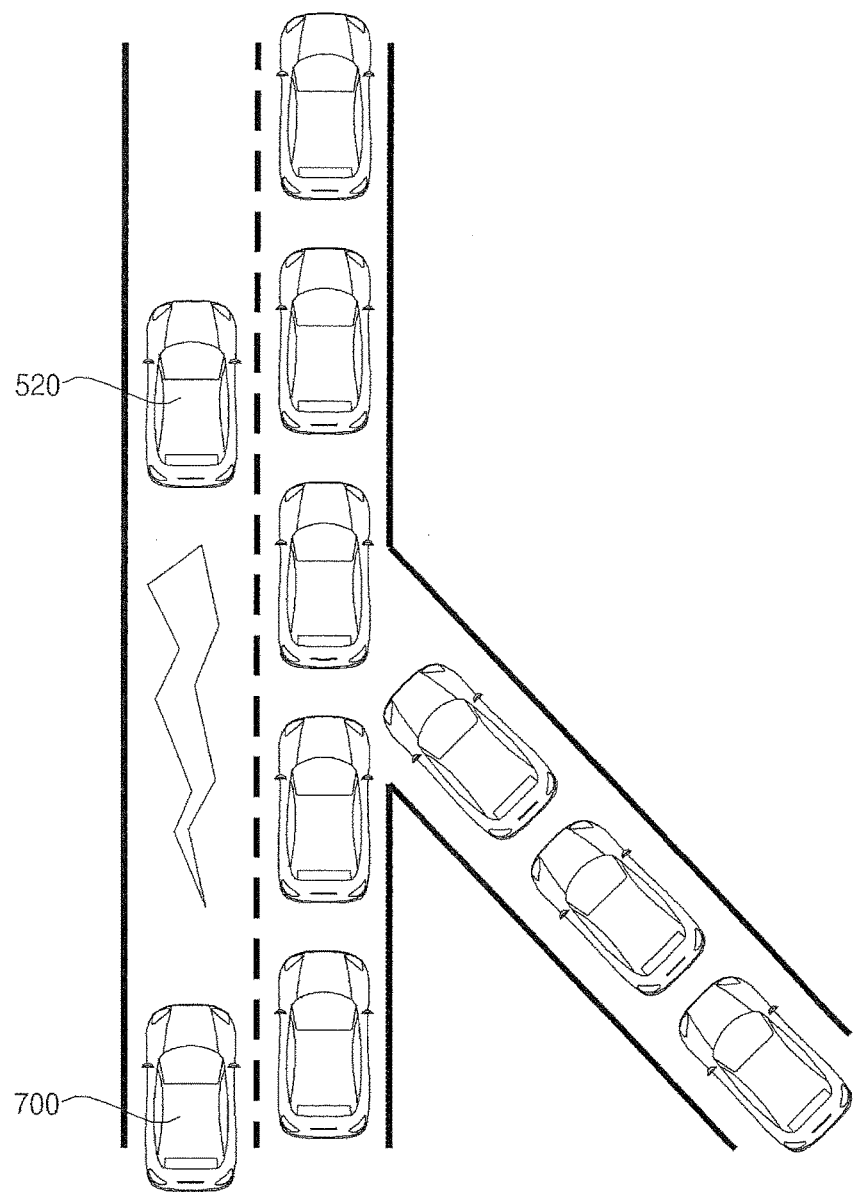
FIGS. 18A to 18C are views for explaining operation of changing a route on the basis of traffic information received from other vehicles according to an embodiment of the present invention.
Figure 18B:
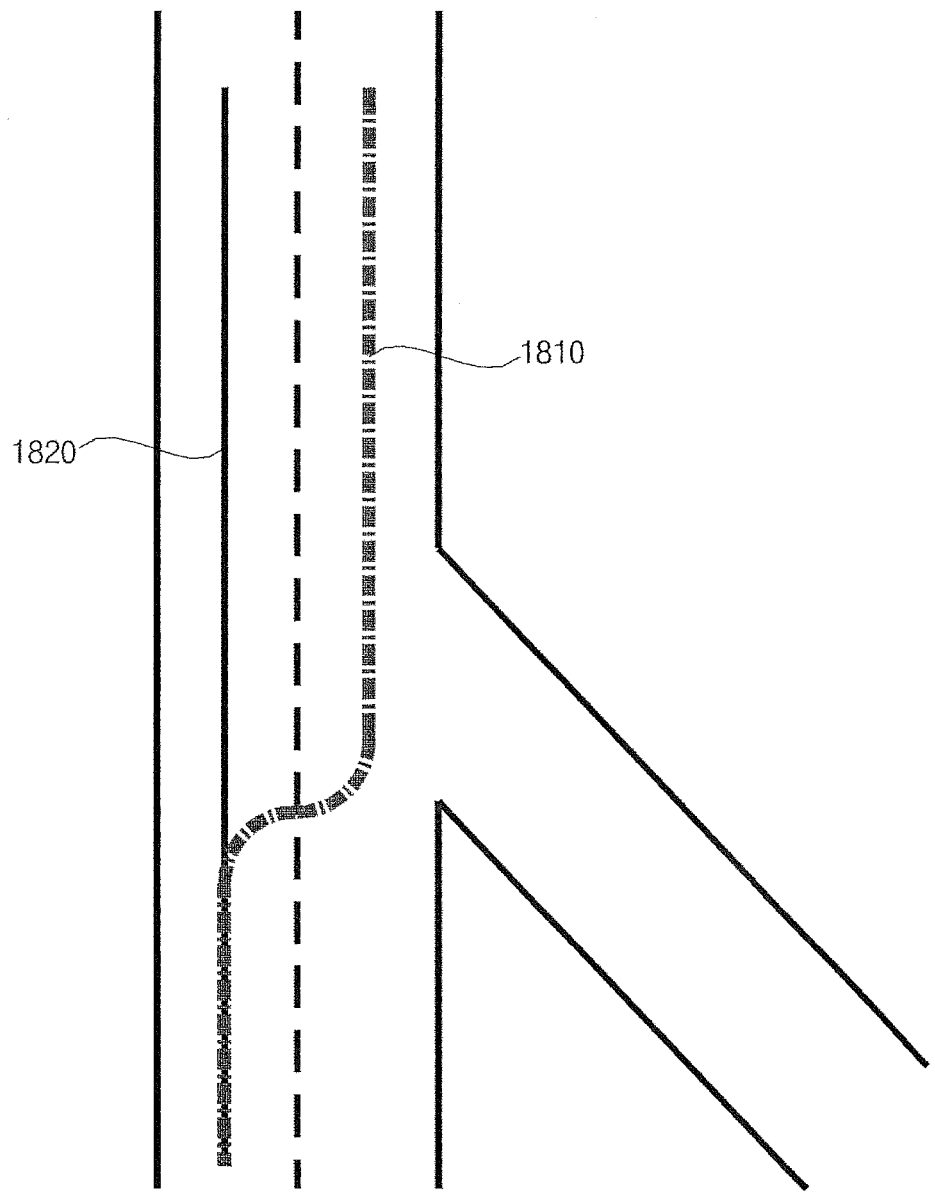
Figure 18C:
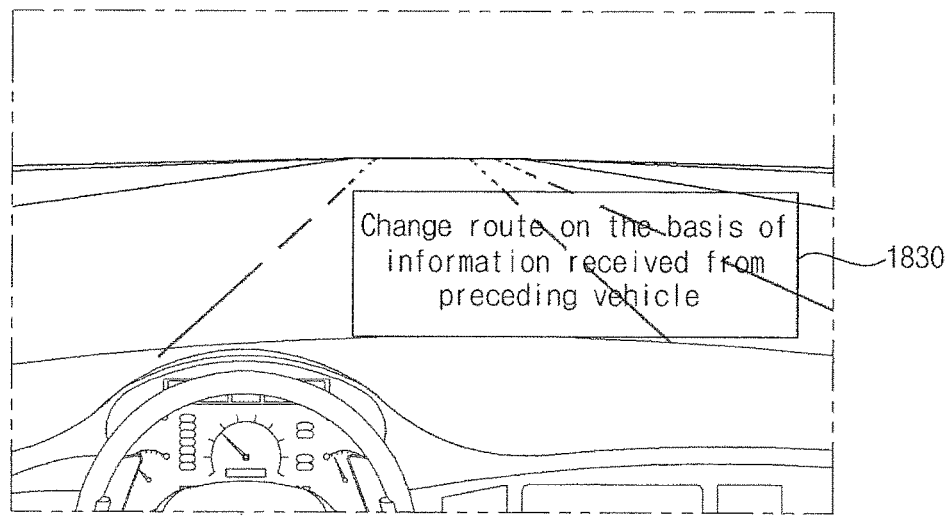

FIGS. 18A to 18C are views for explaining operation of changing a route on the basis of traffic information received from other vehicles according to an embodiment of the present invention.

Referring to FIG. 18A, the processor 470 may receive traffic information from the other vehicle 520 through the communication unit 410. Here, the traffic information may include traffic accident, information, construction information, road congestion information and extra lane information. The other vehicle 520 may be a preceding vehicle. The other vehicle 520 can acquire traffic information through various sensors (e.g. a camera) while being driven.

FIG. 18A shows that the other vehicle 520 acquires road congestion information. The processor 470 receives the road congestion information.

Referring to FIG. 18B, the processor 470 may change the current route on the basis of the received traffic information. For example, the processor 470 can change the current route to a route that takes a minimum time on the basis of traffic accident information, construction information, road congestion information or extra lane information.

In FIG. 18B, when the current route 1810 is congested, the processor 470 changes the current route to a route 1820 that is not congested.

In addition, the processor 470 may control the display 441 to match a TBT image to a point corresponding to the lane in which the vehicle is being driven and to display the TBT image on the changed route.

When the route is changed on the basis of traffic information received from the other vehicle 520, the processor 470 may control the display 441 to display a route change event 1830, as shown in FIG. 18C.

Figure 19A:
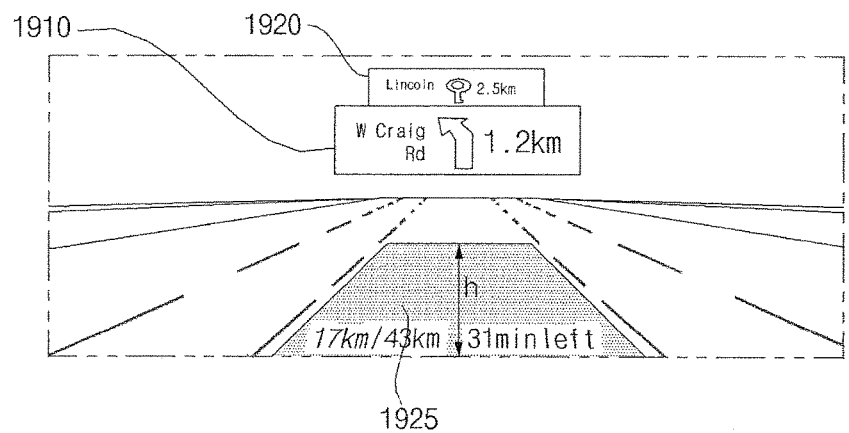
FIGS. 19A and 19B are views for explaining operation of displaying a TBT image according to an embodiment of the present invention.
Figure 19B:
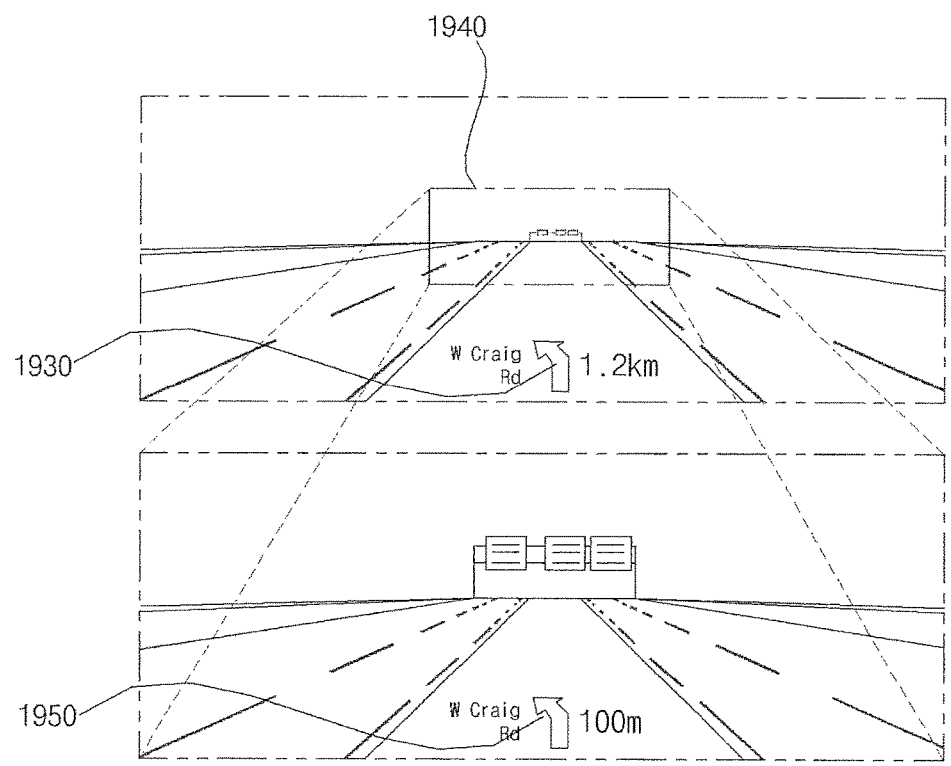

FIGS. 19A and 19B are views for explaining operation of displaying a TBT image according to an embodiment of the present invention.

Referring to FIG. 19A, the processor 470 may control the display 441 to display a plurality of TBT images. The processor 470 may control the display 441 to display the plurality of TBT images in three dimensions.

For example, the processor 470 can display a first TBT image 1910 in a region of the windshield. Here, the first TBT image 1910 can indicate direction information at a first change point closest to the current position of the vehicle 700 on the route.

While the first TBT image 1910 is displayed, the processor 470 may display a second TBT image 1920 around the first TBT image 1910. Here, the processor 470 may display the second TBT image 1920 smaller than the first TBT image 1910. In this case, perspective is applied to the second TBT image 1920 and thus the second TBT image 1920 appears farther from the current position of the vehicle than the first TBT image 1910. That is, the first and second TBT images 1910 and 1920 are displayed in three dimensions. The second TBT image 1920 can indicate direction information at a second change point second-closest to the current position of the vehicle 700 on the route.

As the vehicle 700 is driven, the vehicle 700 gradually approaches the first and second change points. In this case, the processor 470 can control the display 441 to gradually change the sizes, colors or transparency of the first and second TBT images 1910 and 1920.

Accordingly, it is possible to provide more intuitive road guidance to the user and to enable the user to recognize a vehicle direction change point without seeing numerical information by displaying TBT images.

In addition, when a destination is set, the processor 470 may control the display 441 to display an image 1925 corresponding to a total distance from the departure point to the destination, a distance between the current position and the destination and estimated time taken to arrive at the destination in a region of the windshield. In this case, the processor 470 may display a graph image in a region of the windshield, which corresponds to the lane in which the vehicle is being driven. The graph image may be matched to the region of the windshield, which corresponds to the lane in which the vehicle is being driven. The processor 470 may control the display 441 to change the height h of the graph image in response to the remaining distance to the destination. For example, the processor 470 can change the height h of the graph image in such a manner that the height h decreases as the remaining distance to the destination decreases.

Referring to FIG. 19B, the processor 470 may control the display 441 to change the sizes of TBT images 1930 and 1940.

The processor 470 may display the TBT image 1930 indicating direction information at a change point. When the vehicle 700 is a first distance from the change point, the processor 470 can display the TBT image 1930 in a first size. When the vehicle 700 becomes spaced apart from the change point by a second distance as the vehicle 700 moves, the processor 470 can display the TBT image 1950 in a second size.

The second size may be greater than the first size. In this manner, a TBT image can be displayed in different sizes according to distance variation so as to enable the user to intuitively recognize approach to a change point.

The screen illustrated in the lower part of FIG. 19B is a screen displayed when the vehicle 700 arrives at a point 1940 in the screen shown in the upper part of FIG. 19B.

Figure 20A:
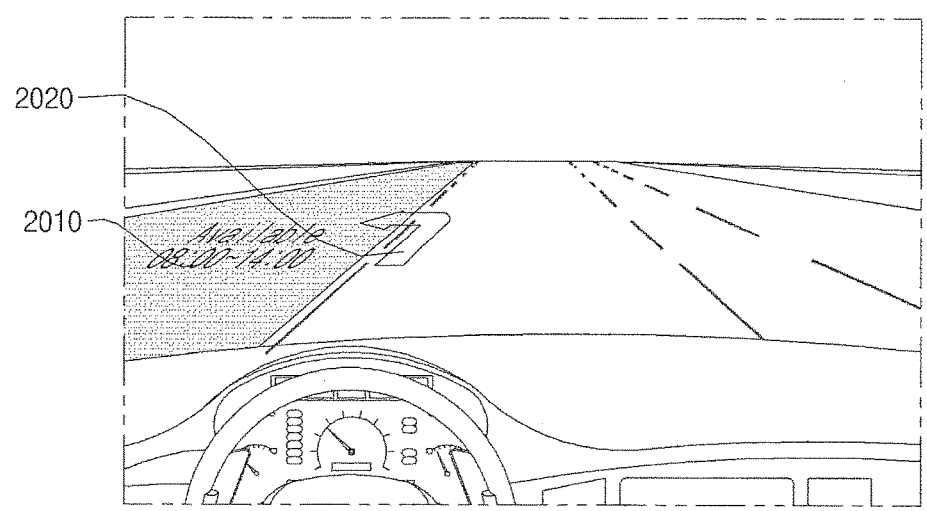
FIGS. 20A and 20B are views for explaining operation of displaying an image corresponding to high occupancy vehicle lane information according to an embodiment of the present invention.
Figure 20B:
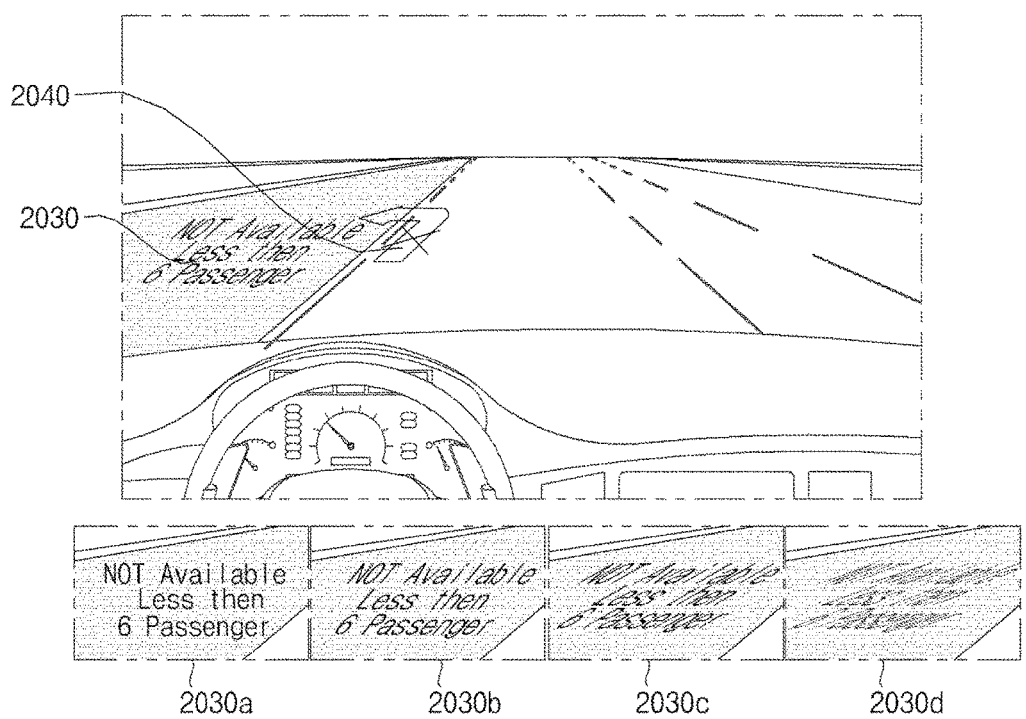

FIGS. 20A and 20B are views for explaining operation of displaying an image corresponding to high occupancy vehicle lane information according to an embodiment of the present invention.

Referring to FIG. 20A, the processor 470 may display an image 2010 corresponding to high occupancy vehicle lane information in a region of the windshield, which corresponds to a high occupancy vehicle lane. Here, the region of the windshield may be a part of the windshield, which meets a line connecting the eyes of the user and the high occupancy vehicle lane.

The high occupancy vehicle lane information may be acquired on the basis of the map data stored in the memory 430. Alternatively, the processor 470 may receive the high occupancy vehicle lane information from the driver assistance apparatus 100 through the interface 480. The driver assistance apparatus 100 may detect the high occupancy vehicle lane information from images of road surfaces and traffic signs, which are included in a front view image or an around view image of the vehicle.

The high occupancy vehicle lane information may include information on high occupancy vehicle lane operation time.

The processor 470 may control the display 441 to display whether the vehicle can enter the high occupancy vehicle lane on the basis of the information on high occupancy vehicle lane operation time. In this case, the processor 470 may display whether the vehicle can enter the high occupancy vehicle lane as a TBT image 2020.

If the vehicle can enter the high occupancy vehicle lane, the processor 470 can display a region of the windshield, which corresponds to the high occupancy vehicle lane, in a first color. Here, the first color is preferably green as a color indicating that the vehicle can enter the high occupancy vehicle lane to the user.

Referring to FIG. 20B, the processor 470 may receive passenger information from the internal camera 195c through the interface 480. The passenger information may be information on the number of passengers.

The processor 470 may control the display 441 to display whether the vehicle can enter the high occupancy vehicle lane on the basis of the received passenger information. In this case, the processor 470 may display whether the vehicle can enter the high occupancy vehicle lane as a TBT image 2040.

If the number of passengers is small and thus the vehicle cannot enter the high occupancy vehicle lane, the processor 470 can display a region of the windshield, which corresponds to the high occupancy vehicle lane, in a second color. Here, the second color is preferably red as a color indicating that the vehicle cannot enter the high occupancy vehicle lane to the user.

The high occupancy vehicle lane information may include information on a minimum number of passengers, which is necessary to use the high occupancy vehicle lane.

In addition, the processor 470 may control the display 441 to display an image 2030 corresponding to the high occupancy vehicle lane information at a predetermined angle to the plane corresponding to the high occupancy vehicle lane. Here, the processor 470 may display the image 2030 in such a manner that the predetermined angle between the image 2030 and the plane including the high occupancy vehicle lane is changed (2030a, 2030b, 2030c and 2030d) over time.

The present invention may be implemented as code that can be written to a computer-readable recording medium and can thus be read by a computer. The computer-readable recording medium may be any type of recording device in which data can be stored in a computer-readable medium. Examples of the computer-readable recording medium include a HDD (Hard Disc Drive), an SSD (Solid State Disc), an SDD (Silicon Disc Drive), a ROM, a RAM, a CD-ROM, a magnetic tape, a floppy disk, optical data storage, and a carrier wave, e.g., data transmission over the Internet. The computer may include the processors 170 and 470 or the controller 770. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus for a vehicle, comprising:
a display configured to display a screen in at least one region of a windshield of the vehicle; and
at least one processor configured to:
acquire information regarding a first lane of a road in which the vehicle is travelling;
acquire information regarding a route for the vehicle; and
based on the vehicle being located within a predetermined distance from at least one change point along the route that corresponds to the first lane of the road, control the display to display at least one turn-by-turn (TBT) image in the at least one region of the windshield,
wherein the at least one processor is further configured to control the display to further display at least one image corresponding to information related to travel conditions of the vehicle by:
displaying, in a first region of the windshield that is at a first position corresponding to a driver's view of the first lane in which the vehicle is travelling, a first image at a first angle relative to a first plane that includes the first lane, wherein the first image is related to the first lane;
displaying, in a second region of the windshield that is at a second position corresponding to the driver's view of a second lane other than the first lane in which the vehicle is travelling, a second image on a second plane that includes the second lane, wherein the second image is related to the second lane; and
changing, by applying animation effects, the first angle at which the first image is displayed depending on a distance between the vehicle and a predetermined location.

2. The display apparatus for a vehicle of claim 1, further comprising an interface configured to receive the information regarding the first lane in which the vehicle is travelling,
wherein the information regarding the first lane in which the vehicle is travelling is based on an image of a view ahead of the vehicle or an image of a view around the vehicle, and
wherein the at least one processor is configured to determine the first lane of the road in which the vehicle is travelling based on the received information.

3. The display apparatus for a vehicle of claim 1, wherein the at least one processor is further configured to:
control the display to display, on the screen in the region of the windshield, a lane image corresponding to the first lane in which the vehicle is travelling; and
display the at least one TBT image on the screen in the region of the windshield.

4. The display apparatus for a vehicle of claim 1, wherein the at least one processor is configured to:
determine a region of the windshield corresponding to a driver's view of the lane in which the vehicle is travelling; and
control the display to display the at least one TBT image in the determined region of the windshield corresponding to a driver's view of the lane in which the vehicle is travelling.

5. The display apparatus for a vehicle of claim 4, wherein the at least one processor is configured to:
determine whether travelling the route would benefit from changing to a different lane from the lane in which the vehicle is travelling; and
control the display to display a TBT image corresponding to a lane change based on a determination that the route would benefit from changing to a different lane from the lane in which the vehicle is travelling.

6. The display apparatus for a vehicle of claim 4, wherein the at least one processor is configured to control the display to display the at least one TBT image in the determined region of the windshield corresponding to a driver's view of the lane in which the vehicle is travelling by:
controlling the display to display the first region of the windshield in a first color and a second region of the windshield in a second color that is different from the first color, the second region of the windshield corresponding to a driver's view of a lane other than the lane in which the vehicle is travelling.

7. The display apparatus for a vehicle of claim 4, wherein the at least one processor is further configured to:
determine that the lane in which the vehicle is travelling branches into a plurality of road segments;
based on a determination that the lane in which the vehicle is travelling branches into a plurality of road segments:
determine a first road segment, from among the plurality of road segments, that corresponds to the route for the vehicle; and
control the display to display the first region of the windshield in a first color and a second region of the windshield in a second color different from the first color, the first region of the windshield corresponding to a driver's view of the first road segment, and the second region of the windshield corresponding to a road segment other than the first road segment.

8. The display apparatus for a vehicle of claim 1, wherein the at least one processor is configured to display, via the display, a top view of a map that displays the route for the vehicle and match the information regarding the lane in which the vehicle is travelling to the lane in which the vehicle is being traveled on the route on the map.

9. The display apparatus for a vehicle of claim 1, wherein the at least one processor is further configured to:
control the display to display the first image in a first shape or in a first color; and
control the display to display the second image in a second shape that is different from the first shape or in a second color that is different from the first color.

10. The display apparatus for a vehicle of claim 9, wherein the at least one processor is configured to:
determine that a destination is preset; and
control the display to display the first image and the second image in different shapes or different colors based on a determination that the destination is preset.

11. The display apparatus for a vehicle of claim 1, wherein the at least one processor is configured to control the display to change the first angle over a period of time.

12. The display apparatus for a vehicle of claim 1, wherein the at least one processor is configured to control the display to display, according to a predetermined priority, the first image or the second image at the first angle to the first plane that includes the first lane in which the vehicle is travelling or at the second angle to the second plane that includes the second lane other than the first lane in which the vehicle is travelling.

13. The display apparatus for a vehicle of claim 1, wherein the first image corresponds to first information related to the travel conditions of the vehicle and the second image corresponds to second information, different from the first information, related to the travel conditions of the vehicle.

14. The display apparatus for a vehicle of claim 2, wherein the image of a view ahead of the vehicle or the image of a view around the vehicle comprises an image of a traffic light, a road sign, a traffic electronic signboard, or a road surface,
wherein the at least one processor is further configured to:
detect traffic information from the image of the traffic light, the road sign, the traffic electronic signboard, or the road surface;
determine a changed route based on the traffic information detected from the image of the traffic light, the road sign, the traffic electronic signboard, or the road surface;
determine a turn-by-turn (TBT) image for the changed route;
determine a lane of a road on the changed route in which the vehicle is travelling;
determine that the vehicle has reached a point along the changed route that corresponds to the TBT image and the lane of the road; and
based on a determination that the vehicle has reached the point along the changed route that corresponds to the TBT image and the lane of the road, control the display to display the TBT image.

15. The display apparatus for a vehicle of claim 14, wherein the at least one processor is further configured to control the display to display, on a map, an event of changing the route to the changed route.

16. The display apparatus for a vehicle of claim 14, wherein the traffic information comprises at least one of traffic accident information, construction information, road congestion information, or extra lane information.

17. The display apparatus for a vehicle of claim 14, further comprising:
a communication unit configured to exchange data with at least one of a mobile terminal, an external server, or another vehicle,
wherein the at least one processor is configured to determine the changed route based on the traffic information detected from the image of the traffic light, the road sign, the traffic electronic signboard, or the road surface by:
determining the changed route based on the traffic information received from the at least one of the mobile terminal, the external server, or the other vehicle.

18. The display apparatus for a vehicle of claim 1, wherein the at least one processor is further configured to:
determine a plurality of TBT images for the route;
determine, from among a plurality of change points along the route, a change point that is closest to a current position of the vehicle that corresponds to a first TBT image from among the plurality of TBT images, the change point indicating a point at which the route of the vehicle can be changed; and control the display to display the first TBT image.

19. The display apparatus for a vehicle of claim 18, wherein the at least one processor is further configured to:
determine that the vehicle approaches the change point; and
control the display to change a size, a color, or a transparency of the first TBT image based on a determination that the vehicle approaches the change point.

20. The display apparatus for a vehicle of claim 2, wherein the interface is configured to obtain passenger information acquired by an internal camera of the vehicle, wherein the at least one processor is further configured to:
determine, based on the passenger information, whether the vehicle is permitted to enter a high-occupancy vehicle lane that is detected from the image of a view ahead of the vehicle or the image of a view around the vehicle; and
control the display to display whether the vehicle is permitted to enter the high-occupancy vehicle lane.

21. A vehicle comprising:
a plurality of wheels;
a power source configured to power a rotation of at least one of the plurality of wheels; and
a display apparatus comprising:
a display that is configured to display a screen in at least one region of a windshield of the vehicle; and
at least one processor configured to:
acquire information regarding a first lane of a road in which the vehicle is travelling;
acquire information regarding route for the vehicle; and
based on the vehicle being located within a predetermined distance from at least one change point along the route that corresponds to the first lane of the road, control the display to display at least one turn-by-turn (TBT) image in the at least one region of the windshield,
wherein the at least one processor is further configured to control the display to further display at least one image corresponding to information related to travel conditions of the vehicle by:
displaying, in a first region of the windshield that is at a first position corresponding to a driver's view of the first lane in which the vehicle is travelling, a first image at a first angle relative to a first plane that includes the first lane, wherein the first image is related to the first lane;
displaying, in a second region of the windshield that is at a second position corresponding to the driver's view of a second lane other than the first lane in which the vehicle is travelling, a second image on a second plane that includes the second lane, wherein the second image is related to the second lane; and
changing, by applying animation effects, the first angle at which the first image is displayed depending on a distance between the vehicle and a predetermined location.

22. The display apparatus for a vehicle of claim 1, wherein the at least one processor is further configured to:
display, via the display, a top view of a map that displays the route for the vehicle;
match the at least one TBT image to the at least one point corresponding to the lane in which the vehicle is being traveled on the route on the map; and
display, via the display, the at least one TBT image indicating the at least one point corresponding to the lane in which the vehicle is being traveled on the route on the map.

23. The display apparatus for a vehicle of claim 1, wherein the at least one processor is further configured to:
control the display to display a first TBT image that indicates a direction at a first change point among the at least one change point that is closest to a position of the vehicle on the route;
control the display to display a second TBT image which is smaller than the first TBT image and that is displayed around a periphery the first TBT image, wherein the second TBT image indicates a direction at a second change point among the at least one change point that is second-closest to the position of the vehicle on the route; and
apply perspective to the second TBT image to display the second TBT image to appear farther from the position of the vehicle as compared with the first TBT image.

* * * * *